US012783095B2

(12) United States Patent
Kim et al.

(10) Patent No.: US 12,783,095 B2
(45) Date of Patent: Nov. 3, 2026

(54) ELECTRONIC DEVICE

(71) Applicant: Samsung Display Co., Ltd., Yongin-si (KR)

(72) Inventors: Hyungbae Kim, Yongin-si (KR); Sanghyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/071,391

(22) Filed: Mar. 5, 2025

(65) Prior Publication Data

US 2025/0291446 A1 Sep. 18, 2025

(30) Foreign Application Priority Data

Mar. 14, 2024 (KR) ........................ 10-2024-0035795

(51) Int. Cl.
*G06F 3/044* (2006.01)
*G06F 3/041* (2006.01)

(52) U.S. Cl.
CPC ........ *G06F 3/0445* (2019.05); *G06F 3/04162* (2019.05); *G06F 2203/04104* (2013.01); *G06F 2203/04111* (2013.01); *G06F 2203/04114* (2019.05)

(58) Field of Classification Search
CPC ............... G06F 3/0445; G06F 3/04162; G06F 2203/04104; G06F 3/0442; G06F 2203/04111; G06F 2203/04114; G06F 2203/04112; G06F 3/0446; G06F 3/04166; G06F 3/046; H10K 59/40; H10K 59/873
See application file for complete search history.

(56) References Cited

U.S. PATENT DOCUMENTS

| | | | | |
|---|---|---|---|---|
| 8,674,967 | B2 | 3/2014 | Fukushima et al. | |
| 11,625,118 | B2 | 4/2023 | Kim et al. | |
| 2022/0147212 | A1* | 5/2022 | Kim | G06F 3/03545 |
| 2024/0361855 | A1* | 10/2024 | Cho | G06F 3/0412 |
| 2026/0093350 | A1* | 4/2026 | Lee | G06F 3/0383 |

FOREIGN PATENT DOCUMENTS

| | | | |
|---|---|---|---|
| KR | 10-2021-0055218 | A | 5/2021 |
| KR | 10-2022-0062191 | A | 5/2022 |
| KR | 10-2453868 | B1 | 10/2022 |

* cited by examiner

*Primary Examiner* — Temesghen Ghebretinsae
*Assistant Examiner* — Ivelisse Martinez Quiles
(74) *Attorney, Agent, or Firm* — Womble Bond Dickinson (US) LLP

(57) ABSTRACT

An electronic device includes: a display layer; a sensor layer above an upper surface of the display layer; and a plurality of pen sensing electrodes under the upper surface of the display layer. The sensor layer includes: a plurality of first electrodes along a first direction; a plurality of second electrodes along a second direction crossing the first direction, the plurality of second electrodes crossing the plurality of first electrodes; and a plurality of third electrodes along the first direction, and overlapping with the plurality of first electrodes.

31 Claims, 32 Drawing Sheets

ELECTRONIC DEVICE

CROSS-REFERENCE TO RELATED APPLICATION

The present application claims priority to and the benefit of Korean Patent Application No. 10-2024-0035795, filed on Mar. 14, 2024, in the Korean Intellectual Property Office, the entire disclosure of which is incorporated by reference herein.

BACKGROUND

Aspects of embodiments of the present disclosure relate to an electronic device for sensing an input by a pen.

Multimedia electronic devices, such as televisions, mobile phones, tablet computers, notebook computers, car navigation units, game machines, and the like, include a display device for displaying an image. The electronic devices may include a sensor layer (e.g., an input sensor) capable of providing a touch-based input method that enables a user to intuitively and conveniently input information or instructions in an easy and simple manner, in addition to other input methods, such as a button, a keyboard, a mouse, or the like. The sensor layer may sense the user's touch or pressure. Recently, users who are accustomed to inputting information using writing instruments or pens for more accurate touch inputs in specific application programs (e.g., application programs for sketching or drawing) have been increasingly demanding the use of pens.

The above information disclosed in this Background section is for enhancement of understanding of the background of the present disclosure, and therefore, it may contain information that does not constitute prior art.

SUMMARY

Embodiments of the present disclosure may be directed to an electronic device for sensing an input by a pen.

According to one or more embodiments of the present disclosure, an electronic device includes: a display layer; a sensor layer above an upper surface of the display layer; and a plurality of pen sensing electrodes under the upper surface of the display layer. The sensor layer includes: a plurality of first electrodes along a first direction; a plurality of second electrodes along a second direction crossing the first direction, the plurality of second electrodes crossing the plurality of first electrodes; and a plurality of third electrodes along the first direction, and overlapping with the plurality of first electrodes.

In an embodiment, each of the plurality of pen sensing electrodes may extend in the first direction, and the plurality of pen sensing electrodes may be located along the second direction.

In an embodiment, the electronic device may further include a plurality of auxiliary electrodes adjacent to the plurality of pen sensing electrodes.

In an embodiment, the plurality of pen sensing electrodes and the plurality of auxiliary electrodes may be located at the same layer as each other.

In an embodiment, the plurality of pen sensing electrodes may overlap with the plurality of auxiliary electrodes in a plan view.

In an embodiment, the plurality of pen sensing electrodes may include a first pen sensing electrode, a second pen sensing electrode, and a third pen sensing electrode that are sequentially located along the second direction. A routing direction of the first pen sensing electrode may be the same as a routing direction of the third pen sensing electrode, and a routing direction of the second pen sensing electrode may be different from the routing direction of the first pen sensing electrode.

In an embodiment, the plurality of pen sensing electrodes may include a first pen sensing electrode and a second pen sensing electrode. The first pen sensing electrode may include a first electrode portion, a second electrode portion, and a first bridge portion connecting the first electrode portion and the second electrode portion to each other. The second pen sensing electrode may include a third electrode portion, a fourth electrode portion, and a second bridge portion connecting the third electrode portion and the fourth electrode portion to each other. The first electrode portion and the third electrode portion may be spaced from each other in the first direction, the first electrode portion and the fourth electrode portion may be spaced from each other in the second direction, the third electrode portion and the second electrode portion may be spaced from each other in the second direction, and the fourth electrode portion and the second electrode portion may be spaced from each other in the first direction.

In an embodiment, a number of the plurality of pen sensing electrodes may be greater than or equal to a number of the plurality of second electrodes.

In an embodiment, the plurality of pen sensing electrodes may be aligned with the plurality of second electrodes in a plan view.

In an embodiment, the display layer may include a base layer, a circuit layer on the base layer, a light emitting element layer on the circuit layer, and an encapsulation layer on the light emitting element layer, and the upper surface of the display layer may be an upper surface of the encapsulation layer.

In an embodiment, the plurality of pen sensing electrodes may be located on a lower surface of the base layer.

In an embodiment, the lower surface of the base layer may have a depressed shape corresponding to the location of the plurality of pen sensing electrodes.

In an embodiment, the base layer may include a first sub-base layer, and a second sub-base layer on the first sub-base layer. The plurality of pen sensing electrodes may be located between the first sub-base layer and the second sub-base layer.

In an embodiment, the plurality of pen sensing electrodes may be located in the circuit layer.

In an embodiment, the electronic device may further include a plurality of trace lines electrically connected with the plurality of pen sensing electrodes in a one-to-one correspondence, and routing directions of the plurality of trace lines may be the same as each other.

In an embodiment, each of the plurality of first electrodes, the plurality of second electrodes, and the plurality of third electrodes may have a mesh structure having a plurality of openings, and the plurality of pen sensing electrodes may have a solid structure that does not have a plurality of openings.

In an embodiment, the sensor layer may further include a plurality of trace lines electrically connected to the plurality of first electrodes, the plurality of second electrodes, and the plurality of third electrodes. The sensor layer may include a sensing area in which the plurality of first electrodes, the plurality of second electrodes, and the plurality of third electrodes are located, and a peripheral area adjacent to the sensing area. The peripheral area may include a trace area in which the plurality of trace lines are located, and an edge area adjacent to the trace area. The plurality of pen sensing electrodes may overlap with the sensing area.

In an embodiment, the plurality of pen sensing electrodes may overlap with the trace area.

In an embodiment, the plurality of pen sensing electrodes may overlap with the trace area and the edge area.

In an embodiment, the electronic device may further include a sensor driver configured to drive the sensor layer, and selectively operate in a first mode to sense a touch input and in a second mode to sense a pen input. The second mode may include a pen sensing driving mode, and in the pen sensing driving mode, the sensor driver may be configured to receive a first reception signal based on a first induced current flowing through each of the plurality of first electrodes, and receive a second reception signal based on a second induced current flowing through each of the plurality of pen sensing electrodes.

In an embodiment, in the pen sensing driving mode, the sensor driver may be configured to additionally receive a third reception signal based on a third induced current flowing through each of the plurality of second electrodes.

In an embodiment, the plurality of third electrodes may be configured to be grounded in the first mode, the second mode may further include a charging driving mode, and the plurality of first electrodes and the plurality of second electrodes may be configured to be floated in the charging driving mode.

According to one or more embodiments of the present disclosure, an electronic device includes: a display layer; a plurality of first electrodes along a first direction above an upper surface of the display layer; a plurality of second electrodes along a second direction crossing the first direction above the upper surface of the display layer; a plurality of pen sensing electrodes along the second direction under the upper surface of the display layer; and a sensor driver configured to drive the plurality of first electrodes, the plurality of second electrodes, and the plurality of pen sensing electrodes, and selectively operate in a first mode to sense a touch input and in a second mode to sense a pen input. The second mode includes a pen sensing driving mode, and in the pen sensing driving mode, the sensor driver is configured to receive a first reception signal based on a first induced current flowing through each of the plurality of first electrodes, and receive a second reception signal based on a second induced current flowing through each of the plurality of pen sensing electrodes.

In an embodiment, in the pen sensing driving mode, the sensor driver may be configured to additionally receive a third reception signal based on a third induced current flowing through each of the plurality of second electrodes.

In an embodiment, the electronic device may further include a plurality of third electrodes on the upper surface of the display layer along the first direction, and the plurality of third electrodes may be configured to be grounded in the first mode. In the pen sensing driving mode, the first reception signal may be a signal based on the first induced current and an auxiliary induced current flowing from the plurality of third electrodes toward the plurality of first electrodes. The second mode may further include a charging driving mode, and the plurality of first electrodes and the plurality of second electrodes may be configured to be floated in the charging driving mode.

In an embodiment, the electronic device may further include a plurality of auxiliary electrodes adjacent to the plurality of pen sensing electrodes, and the plurality of pen sensing electrodes and the plurality of auxiliary electrodes may be located at the same layer as each other, or the plurality of pen sensing electrodes may overlap with the plurality of auxiliary electrodes in a plan view.

In an embodiment, the plurality of pen sensing electrodes may include a first pen sensing electrode, a second pen sensing electrode, and a third pen sensing electrode that are sequentially located along the second direction. A routing direction of the first pen sensing electrode may be the same as a routing direction of the third pen sensing electrode, and a routing direction of the second pen sensing electrode may be different from the routing direction of the first pen sensing electrode.

In an embodiment, the plurality of pen sensing electrodes may include a first pen sensing electrode and a second pen sensing electrode. The first pen sensing electrode may include a first electrode portion, a second electrode portion, and a first bridge portion connecting the first electrode portion and the second electrode portion to each other. The second pen sensing electrode may include a third electrode portion, a fourth electrode portion, and a second bridge portion connecting the third electrode portion and the fourth electrode portion to each other. The first electrode portion and the third electrode portion may be spaced from each other in the first direction, the first electrode portion and the fourth electrode portion may be spaced from each other in the second direction, the third electrode portion and the second electrode portion may be spaced from each other in the second direction, and the fourth electrode portion and the second electrode portion may be spaced from each other in the first direction.

According to one or more embodiments of the present disclosure, an electronic device includes: a display layer; a plurality of first electrodes above an upper surface of the display layer along a first direction; a plurality of second electrodes above the upper surface of the display layer along a second direction crossing the first direction; a plurality of third electrodes above the upper surface of the display layer along the first direction, and overlapping with the plurality of first electrodes; a plurality of pen sensing electrodes under the upper surface of the display layer along the second direction; and a sensor driver configured to calculate coordinates for a first input that causes a change in a capacitance by utilizing the plurality of first electrodes and the plurality of second electrodes, and calculate coordinates for a second input that emits a magnetic field by utilizing the plurality of first electrodes and the plurality of pen sensing electrodes.

In an embodiment, the plurality of third electrodes may be configured to be grounded when the sensor driver operates in a first mode to sense the coordinates for the first input, and the plurality of first electrodes and the plurality of second electrodes may be configured to be floated when the sensor driver operates in a charging driving mode to charge an input device configured to provide the second input.

In an embodiment, the electronic device is one of a television, a mobile phone, a tablet computer, a notebook computer, a car navigation, or a game machine.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1A:
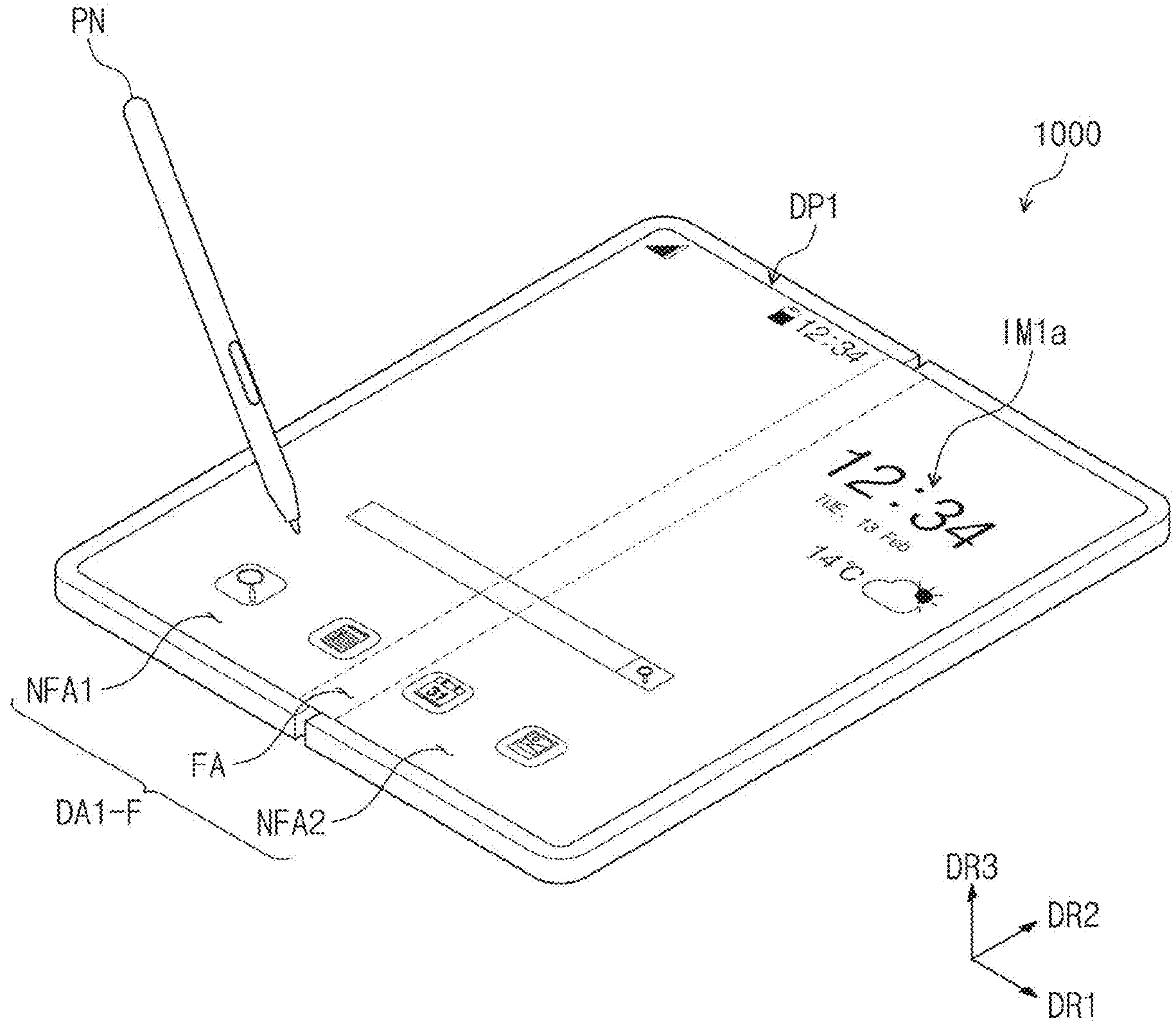
FIG. 1A is a perspective view of an electronic device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms “first,” “second,” “third,” etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being “on,” “connected to,” or “coupled to” another element or layer, it can be directly on, connected to, or coupled to the other element or layer, or one or more intervening elements or layers may be present. Similarly, when a layer, an area, or an element is referred to as being “electrically connected” to another layer, area, or element, it may be directly electrically connected to the other layer, area, or element, and/or may be indirectly electrically connected with one or more intervening layers, areas, or elements therebetween. In addition, it will also be understood that when an element or layer is referred to as being “between” two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms “a” and “an” are intended to include the plural forms as well, unless the context clearly indicates otherwise. It will be further understood that the terms “comprises,” “comprising,” “includes,” “including,” “has,” “have,” and “having,” when used in this specification, specify the presence of the stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. For example, the expression “A and/or B” denotes A, B, or A and B. Expressions such as “at least one of,” when preceding a list of elements, modify the entire list of elements and do not modify the individual elements of the list. For example, the expression “at least one of a, b, or c,” “at least one of a, b, and c,” and “at least one selected from the group consisting of a, b, and c” indicates only a, only b, only c, both a and b, both a and c, both b and c, all of a, b, and c, or variations thereof.

As used herein, the term “substantially,” “about,” and similar terms are used as terms of approximation and not as terms of degree, and are intended to account for the inherent variations in measured or calculated values that would be recognized by those of ordinary skill in the art. Further, the use of “may” when describing embodiments of the present disclosure refers to “one or more embodiments of the present disclosure.” As used herein, the terms “use,” “using,” and “used” may be considered synonymous with the terms “utilize,” “utilizing,” and “utilized,” respectively.

As used herein, the terms “part” and “unit” may refer to a software component or a hardware component that performs a specific function. The hardware component may include, for example, a field-programmable gate array (FPGA) or an application-specific integrated circuit (ASIC). The software component may refer to executable code and/or data used by executable code in an addressable storage medium. Thus, the software components may be, for example, object-oriented software components, class components, and/or working components, and may include processes, functions, properties, procedures, subroutines, program code segments, drivers, firmware, micro-codes, circuits, data, databases, data structures, tables, arrays, variables, and/or the like.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
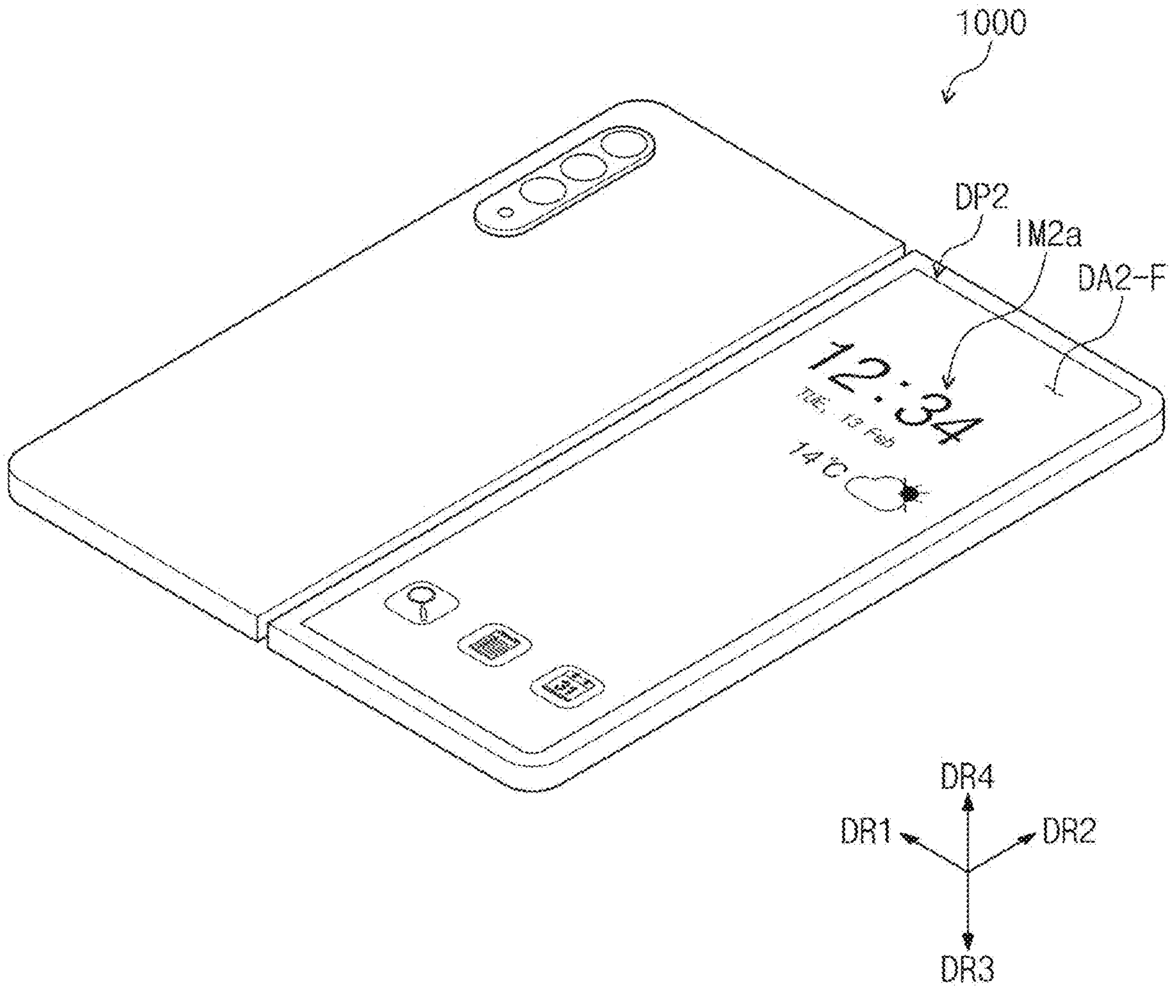
FIG. 1B is a rear perspective view of the electronic device according to an embodiment of the present disclosure.

FIG. 1A is a perspective view of an electronic device 1000 according to an embodiment of the present disclosure. FIG. 1B is a rear perspective view of the electronic device 1000 according to an embodiment of the present disclosure.

Referring to FIGS. 1A and 1B, the electronic device 1000 may be a device that is activated depending on an electrical signal. For example, the electronic device 1000 may display an image, and may sense an input (e.g., an external input) applied from the outside. The external input may be a user input. The user input may include various suitable kinds of external inputs, such as a part of a user’s body, a pen PN, light, heat, or pressure.

The electronic device 1000 may include a first display panel DP1 and a second display panel DP2. The first display panel DP1 and the second display panel DP2 may be separate panels that are separated or spaced apart from each other. The first display panel DP1 may be referred to as a main display panel, and the second display panel DP2 may be referred to as an auxiliary display panel or an external display panel.

The first display panel DP1 may include a first display part DA1-F, and the second display panel DP2 may include a second display part DA2-F. The second display panel DP2 may have a smaller area than that of the first display panel DP1. The first display part DA1-F and the second display part DA2-F may have areas corresponding to the sizes of the first display panel DP1 and the second display panel DP2, respectively, and the first display part DA1-F may have a larger area than that of the second display part DA2-F.

In an unfolded state of the electronic device 1000, the first display part DA1-F may have a plane that is parallel to or substantially parallel to a first direction DR1 and a second direction DR2. The thickness direction of the electronic device 1000 may be parallel to or substantially parallel to a third direction DR3 that crosses the first direction DR1 and the second direction DR2. Accordingly, front surfaces (e.g., upper surfaces) and rear surfaces (e.g., lower surfaces) of the members constituting the electronic device 1000 may be defined based on the third direction DR3.

The first display panel DP1 or the first display part DA1-F may include a folding area FA that may be folded and unfolded, and a plurality of non-folding areas NFA1 and NFA2 spaced apart from each other with the folding area FA therebetween. The second display panel DP2 may overlap with one of the plurality of non-folding areas NFA1 or NFA2. For example, the second display panel DP2 may overlap with the first non-folding area NFA1.

The display direction of a first image IM1*a* displayed on a portion of the first display panel DP1, for example, such as on the first non-folding area NFA1, may be opposite to the display direction of a second image IM2*a* displayed on the second display panel DP2. For example, the first image IM1*a* may be displayed in the third direction DR3, and the second image IM2*a* may be displayed in a fourth direction DR4 opposite to the third direction DR3.

In an embodiment of the present disclosure, the folding area FA may be bent about a folding axis extending in a direction parallel to or substantially parallel to long sides of the electronic device 1000, for example, such as in a direction parallel to or substantially parallel to the second direction DR2. The folding area FA has a suitable curvature (e.g., a certain or predetermined curvature) and a suitable radius of curvature (e.g., a certain or predetermined radius of curvature) in a folded state of the electronic device 1000. The electronic device 1000 may be folded in an in-folding manner, such that the first non-folding area NFA1 and the second non-folding area NFA 2 face each other and the first display part DA1-F is not exposed to the outside.

In an embodiment of the present disclosure, the electronic device 1000 may be folded in an out-folding manner, such that the first display part DA1-F is exposed to the outside. In an embodiment of the present disclosure, the electronic device 1000 may be folded in an in-folding manner and/or an out-folding manner from the unfolded state. However, the present disclosure is not limited thereto.

Although FIG. 1A illustrates an example in which one folding area FA is defined (e.g., is provided or included) in the electronic device 1000, the present disclosure is not limited thereto. For example, a plurality of folding axes and a plurality of folding areas corresponding thereto may be defined in the electronic device 1000, and the electronic device 1000 may be folded about the plurality of folding axes in an in-folding manner and/or out-folding manner from the unfolded state.

According to an embodiment of the present disclosure, at least one of the first display panel DP1 or the second display panel DP2 may sense an input by the pen PN, even without including or using a digitizer. Because the digitizer for sensing the pen PN may be omitted, an increase in the thickness and the weight of the electronic device 1000 and a decrease in the flexibility of the electronic device 1000 depending on the addition of a digitizer may not occur. Accordingly, not only the first display panel DP1, but also the second display panel DP2 may be designed to sense the pen PN.

Figure 2:
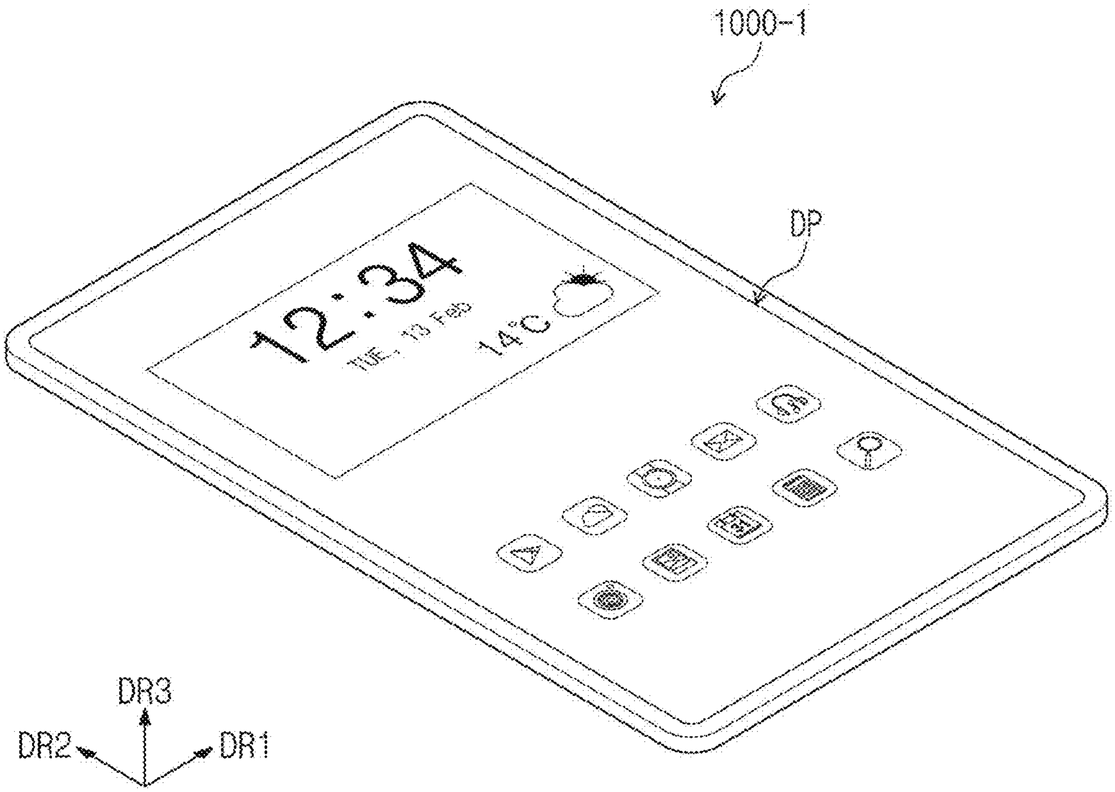
FIG. 2 is a perspective view of an electronic device according to an embodiment of the present disclosure.
Figure 3:
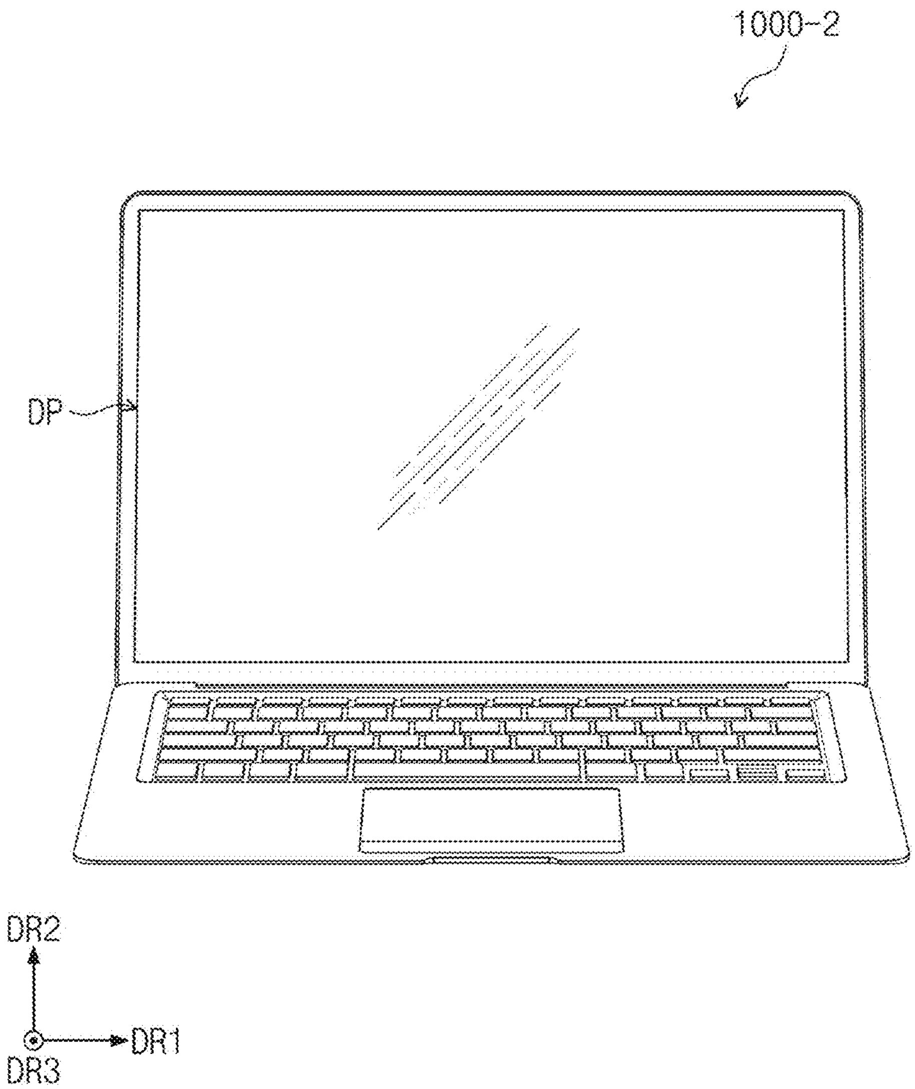
FIG. 3 is a perspective view of an electronic device according to an embodiment of the present disclosure.

FIG. 2 is a perspective view of an electronic device 1000-1 according to an embodiment of the present disclosure. FIG. 3 is a perspective view of an electronic device 1000-2 according to an embodiment of the present disclosure.

FIG. 2 illustrates an example in which the electronic device 1000-1 is a mobile phone, and the electronic device 1000-1 may include a display panel DP. FIG. 3 illustrates an example in which the electronic device 1000-2 is a notebook computer, and the electronic device 1000-2 may include the display panel DP. Although FIG. 3 is a perspective view of the electronic device 1000-2, the coordinate axes illustrated in FIG. 3 are displayed based on the display panel DP within the electronic device 1000-2.

In an embodiment of the present disclosure, the display panel DP may sense an input (e.g., an external input) applied from the outside. The external input may be a user input. The user input may include various suitable kinds of external inputs, such as a part of the user's body, the pen PN (e.g., refer to FIG. 1A), light, heat, or pressure.

According to an embodiment of the present disclosure, the display panel DP may sense an input by the pen PN even without including or using a digitizer. Because the digitizer for sensing the pen PN may be omitted, an increase in the thickness and the weight of the electronic device 1000-1 or 1000-2 depending on the addition of a digitizer may not occur.

Although the foldable electronic device 1000 is illustrated in FIG. 1A and the bar-kind of electronic device 1000-1 is illustrated in FIG. 2, the present disclosure is not limited thereto. For example, the following description of the embodiments may be applied to various suitable kinds of electronic devices, such as a curved electronic device, a rollable electronic device, a slidable electronic device, and/or a stretchable electronic device.

Figure 4:
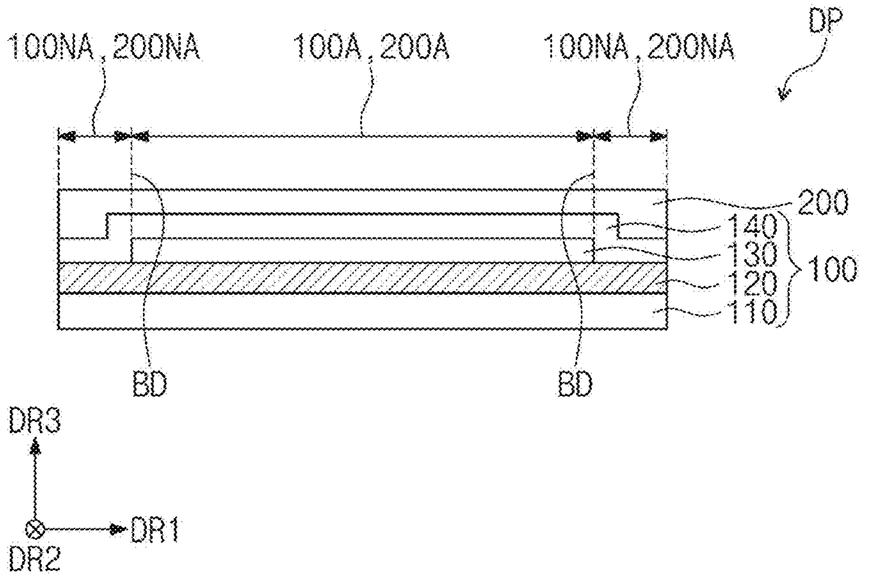
FIG. 4 is a schematic sectional view of a display panel according to an embodiment of the present disclosure.

FIG. 4 is a schematic sectional view of a display panel according to an embodiment of the present disclosure.

Referring to FIG. 4, the display panel DP may include a display layer 100 and a sensor layer 200.

The display layer 100 may be a component that substantially generates an image. A display area 100A and a non-display area 100NA adjacent to the display area 100A may be defined in the display layer 100. An image may be displayed on the display area 100A.

The display layer 100 may be an emissive display layer. For example, the display layer 100 may be an organic light emitting display layer, an inorganic light emitting display layer, an organic-inorganic light emitting display layer, a quantum-dot display layer, a micro-LED display layer, or a nano-LED display layer. The display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may have a multi-layered structure or a single-layer structure. The base layer 110 may be a glass substrate, a metal substrate, a silicon substrate, or a polymer substrate, but the present disclosure is not particularly limited thereto.

The circuit layer 120 may be disposed on the base layer 110. The circuit layer 120 may include an insulating layer, a semiconductor pattern, a conductive pattern, and a signal line. An insulating layer, a semiconductor layer, and a conductive layer may be formed on the base layer 110 by a suitable process, such as coating or deposition, and may be selectively subjected to patterning by performing a photolithography process a plurality of times.

The light emitting element layer 130 may be disposed on the circuit layer 120. The light emitting element layer 130 may include light emitting elements. For example, the light emitting element layer 130 may include an organic luminescent material, an inorganic luminescent material, an organic-inorganic luminescent material, a quantum dot, a quantum rod, a micro LED, or a nano LED.

The encapsulation layer 140 may be disposed on the light emitting element layer 130. The encapsulation layer 140 may protect the light emitting element layer 130 from foreign matter, such as moisture, oxygen, and dust particles.

The sensor layer 200 may be disposed on the display layer 100. A sensing area 200A and a peripheral area 200NA adjacent to the sensing area 200A may be defined in the sensor layer 200. The sensing area 200A may overlap with the display area 100A, and the peripheral area 200NA may overlap with the non-display area 100NA.

In an embodiment of the present disclosure, a boundary BD between the display area 100A and the non-display area 100NA may overlap with a boundary BD between the sensing area 200A and the peripheral area 200NA. However, the present disclosure is not particularly limited thereto. For example, the sensing area 200A may have a larger area than that of the display area 100A. As another example, the display area 100A may have a larger area than that of the sensing area 200A.

The sensor layer 200 may sense an external input applied from the outside. The sensor layer 200 may be an integrated sensor that is continuously formed in a process of manufacturing the display layer 100. As another example, the sensor layer 200 may be an external sensor that is attached to the display layer 100. The sensor layer 200 may be referred to as a sensor, an input sensing layer, an input sensing panel, or an electronic device for sensing input coordinates.

According to an embodiment of the present disclosure, the sensor layer 200 may sense both an input by a passive input or a passive input means, such as a part of the user's body, and an input by an input device that generates a magnetic field having a suitable resonant frequency (e.g., a certain or predetermined resonant frequency). The input device may be referred to as a pen, an input pen, a magnetic pen, a stylus pen, or an electromagnetic resonance pen.

Figure 5:
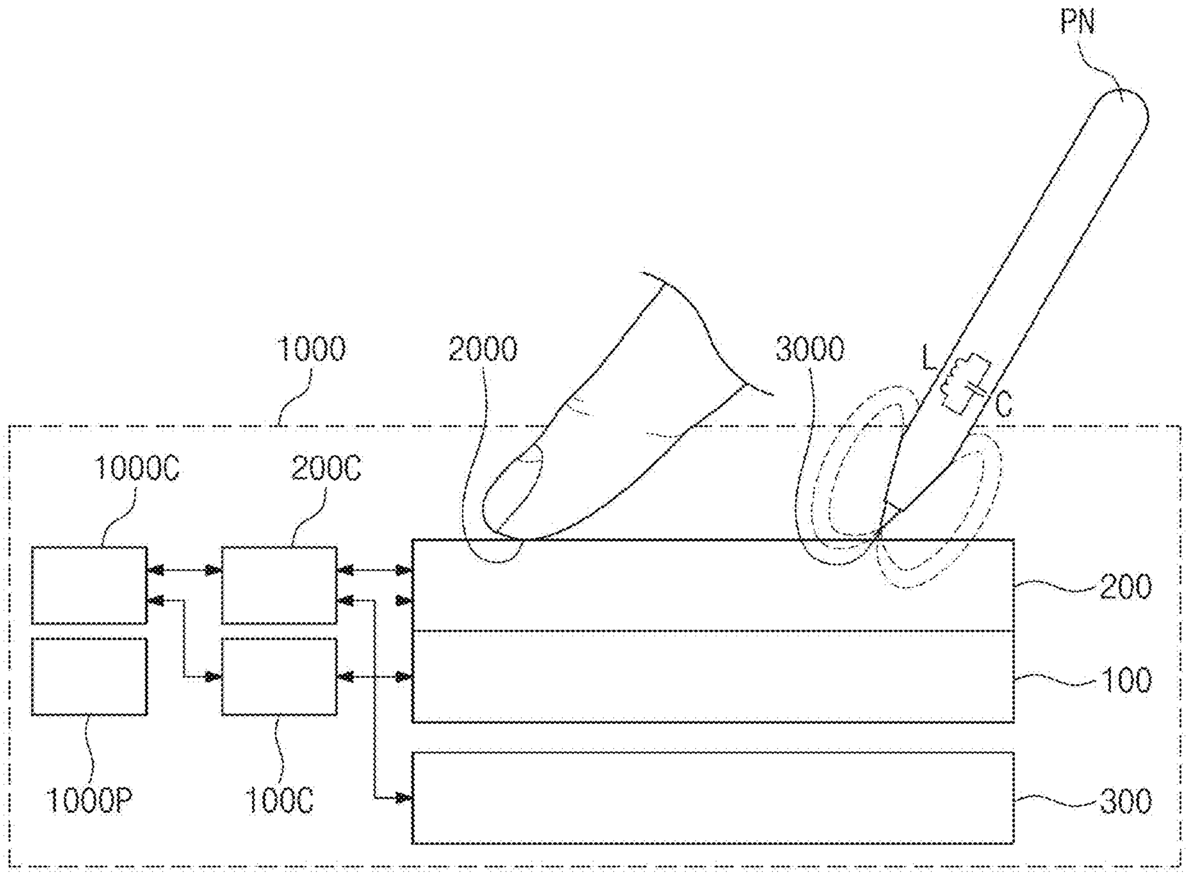
FIG. 5 is a view illustrating an operation of an electronic device according to an embodiment of the present disclosure.

FIG. 5 is a view illustrating an operation of the electronic device 1000 according to an embodiment of the present disclosure.

Referring to FIG. 5, the electronic device 1000 may include the display layer 100, the sensor layer 200, a lower sensor layer 300, a display driver 100C, a sensor driver 200C, a main driver 1000C, and a power circuit 1000P.

The sensor layer 200 may be disposed on the upper surface of the display layer 100, and the lower sensor layer 300 may be disposed under the upper surface of the display layer 100. For example, the lower sensor layer 300 may be spaced apart from the sensor layer 200, and may be included in or disposed under the display layer 100. The position of the lower sensor layer 300 will be described in more detail below with reference to FIGS. 11A to 11C.

The sensor layer 200 may sense a first input 2000 or a second input 3000 applied from the outside. The lower sensor layer 300 may sense the second input 3000 applied from the outside. Each of the first input 2000 and the second input 3000 may be an input by an input means capable of providing a change in a capacitance of the sensor layer 200, or an input by an input means capable of causing an induced current in the sensor layer 200 and the lower sensor layer 300. For example, the first input 2000 may be an input by a passive input or a passive input means, such as a part of the user's body. The second input 3000 may be an input by the pen PN or an input by an RFIC tag. For example, the pen PN may be a pen of a passive kind or a pen of an active kind.

In an embodiment of the present disclosure, the pen PN may be a device that generates a magnetic field having a suitable resonant frequency (e.g., a certain or predetermined resonant frequency). The pen PN may transmit an output signal based on an electromagnetic resonance scheme. The pen PN may be referred to as an input device, an input pen, a magnetic pen, a stylus pen, or an electromagnetic resonance pen.

The pen PN may include an RLC resonance circuit, and the RLC resonance circuit may include an inductor L and a capacitor C. In an embodiment of the present disclosure, the RLC resonance circuit may be a variable resonance circuit that varies the resonant frequency. In this case, the inductor L may be a variable inductor, and/or the capacitor C may be a variable capacitor. However, the present disclosure is not particularly limited thereto.

The inductor L generates a current by a magnetic field formed in the electronic device 1000, for example, such as by the sensor layer 200 or a coil included in the electronic device 1000. However, the present disclosure is not particularly limited thereto. For example, when the pen PN operates as an active kind, the pen PN may generate a current even though a magnetic field is not provided to the pen PN from the outside. The generated current is transferred to the capacitor C. The capacitor C charges the current input from the inductor L, and discharges the charged current to the inductor L. Thereafter, the inductor L may emit a magnetic field having a resonant frequency. An induced current may flow in the sensor layer 200 and the lower sensor layer 300 by the magnetic field emitted from the pen PN. The induced current may be transferred to the sensor driver 200C as a reception signal (e.g., a sensing signal or a signal).

The main driver 1000C may control the overall operations of the electronic device 1000. For example, the main driver 1000C may control operations of the display driver 100C and the sensor driver 200C. The main driver 1000C may include at least one microprocessor, and may further include a graphics controller. The main driver 1000C may be referred to as an application processor, a central processing unit, or a main processor.

The display driver 100C may drive the display layer 100. The display driver 100C may receive image data and a control signal from the main driver 1000C. The control signal may include various suitable signals. For example, the control signal may include an input vertical synchronization signal, an input horizontal synchronization signal, a main clock, and a data enable signal.

The sensor driver 200C may drive the sensor layer 200 and the lower sensor layer 300. The sensor driver 200C may receive a control signal from the main driver 1000C. The control signal may include a clock signal of the sensor driver 200C. In addition, the control signal may further include a mode determination signal for determining a driving mode of the sensor driver 200C, the sensor layer 200, and the lower sensor layer 300.

The sensor driver 200C may be implemented with an integrated circuit (IC), and may be electrically connected with the sensor layer 200. For example, the sensor driver 200C may be directly mounted on a suitable area (e.g., a certain or predetermined area) of the display panel. As another example, the sensor driver 200C may be mounted on a separate printed circuit board using a chip on film (COF) method, and may be electrically connected with the sensor layer 200 and the lower sensor layer 300.

The sensor driver 200C, the sensor layer 200, and the lower sensor layer 300 may selectively operate in a first mode or a second mode. For example, the first mode may be a mode for sensing a touch input, for example, such as the first input 2000. The second mode may be a mode for sensing an input by the pen PN, for example, such as the second input 3000. The first mode may be referred to as a touch sensing mode, and the second mode may be referred to as a pen sensing mode.

Switching between the first mode and the second mode may be performed in various suitable ways. For example, the sensor driver 200C, the sensor layer 200, and the lower sensor layer 300 may be driven in the first mode and the second mode in a time-division manner, and may sense the first input 2000 and the second input 3000. As another example, the switching between the first mode and the second mode may be performed by the user's selection or the user's specific action (e.g., the user's input), or by activating or deactivating a specific application, such that one of the first mode or the second mode may be activated or deactivated, or the driving mode may be switched from one mode to the other mode. In another example, while the sensor driver 200C, the sensor layer 200, and the lower sensor layer 300 alternately operate in the first mode and the second mode, when the first input 2000 is sensed, the sensor driver 200C, the sensor layer 200, and the lower sensor layer 300 may remain in the first mode, and when the second input 3000 is sensed, the sensor driver 200C, the sensor layer 200, and the lower sensor layer 300 may remain in the second mode.

The sensor driver 200C may calculate coordinate information of an input based on signals received from the sensor layer 200 and the lower sensor layer 300, and may provide a coordinate signal having the coordinate information to the main driver 1000C. The main driver 1000C executes an operation corresponding to the input, based on the coordinate signal. For example, the main driver 1000C may operate the display driver 100C, such that a new application image is displayed on the display layer 100.

The power circuit 1000P may include a power management integrated circuit (PMIC). The power circuit 1000P may generate a plurality of driving voltages for driving the display layer 100, the sensor layer 200, the display driver 100C, and the sensor driver 200C. For example, the plurality of driving voltages may include a gate high-voltage, a gate low-voltage, a first driving voltage (e.g., an ELVSS voltage), a second driving voltage (e.g., an ELVDD voltage), an initialization voltage, and the like, but the present disclosure is not particularly limited thereof.

Figure 6A:
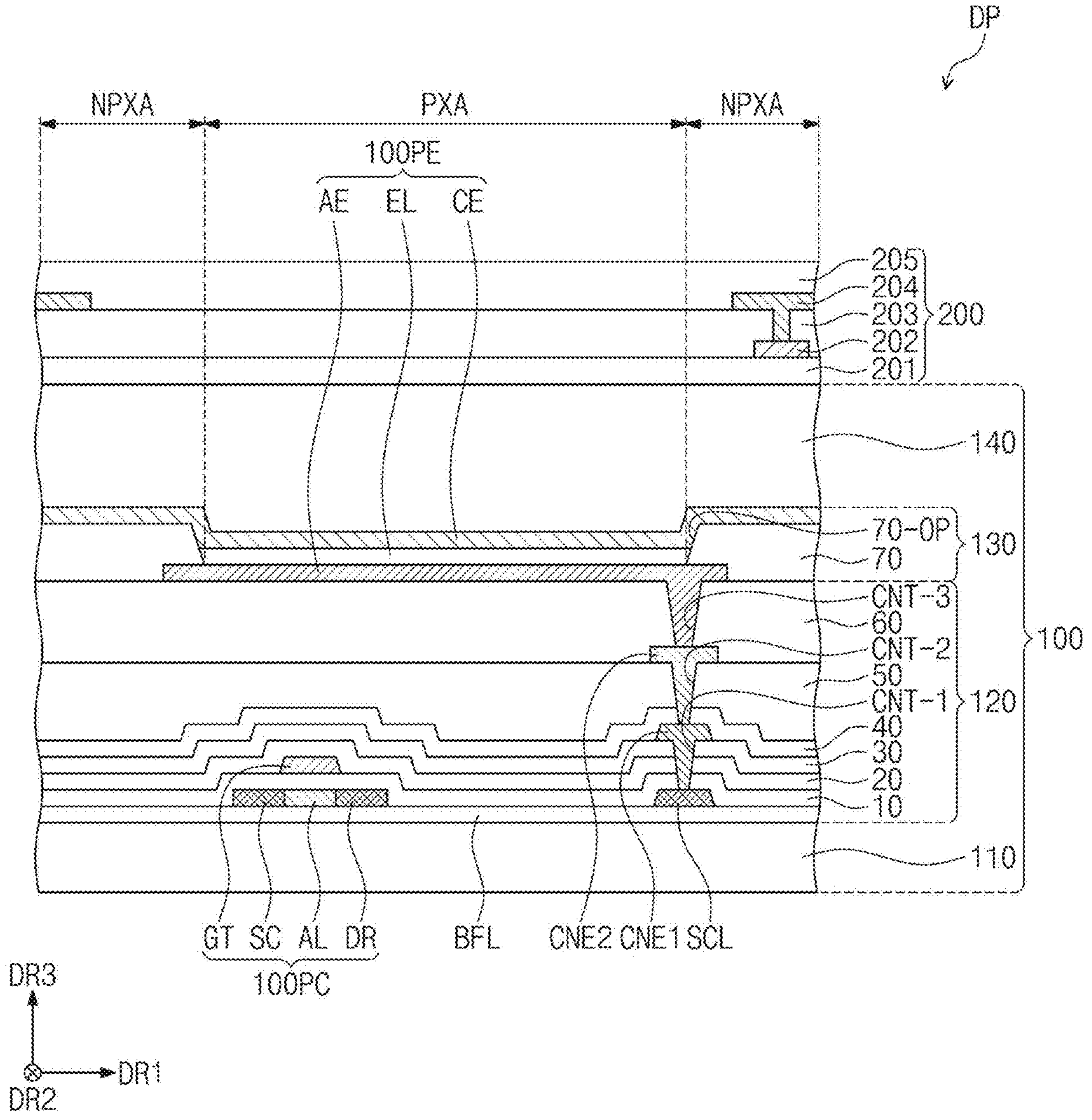
FIG. 6A is a sectional view of the display panel according to an embodiment of the present disclosure.

FIG. 6A is a sectional view of the display panel DP according to an embodiment of the present disclosure.

Referring to FIG. 6A, at least one buffer layer BFL may be formed on the upper surface of the base layer 110. The buffer layer BFL may improve a coupling force between the base layer 110 and a semiconductor pattern. The buffer layer BFL may be formed of multiple layers. As another example, the display layer 100 may further include a barrier layer. The buffer layer BFL may include at least one of silicon oxide, silicon nitride, or silicon oxy nitride. For example, the buffer layer BFL may include a structure in which silicon oxide layers and silicon nitride layers are alternately stacked one above another.

The semiconductor pattern SC, AL, DR, and SCL may be disposed on the buffer layer BFL. The semiconductor pattern SC, AL, DR, and SCL may include poly silicon. However, the present disclosure is not limited thereto, and the semiconductor pattern SC, AL, DR, and SCL may include amorphous silicon, a low-temperature polycrystalline silicon, or an oxide semiconductor.

FIG. 6A illustrates a portion (e.g., only a portion) of the semiconductor pattern SC, AL, DR, and SCL, and the semiconductor pattern may be additionally disposed in other areas in other views. The semiconductor pattern SC, AL, DR, and SCL may be arranged over the pixels according to a suitable rule (e.g., a specific or predetermined rule). The semiconductor pattern SC, AL, DR, and SCL may have different electrical properties depending on whether doping is performed or not. The semiconductor pattern SC, AL, DR, and SCL may include first areas SC, DR, and SCL having a high conductivity, and a second area AL having a low conductivity. The first areas SC, DR, and SCL may be doped with an N-type dopant or a P-type dopant. A P-type transistor may include a doped area that is doped with a P-type dopant, and an N-type transistor may include a doped area that is doped with an N-type dopant. The second area AL may be a non-doped area, or may be an area that is more lightly doped than those of the first areas SC, DR, and SCL.

The first areas SC, DR, and SCL may have a higher conductivity than that of the second area AL, and may substantially serve as electrodes or signal lines. The second area AL may substantially correspond to an active area AL (e.g., a channel) of a transistor 100PC. In other words, one portion AL of the semiconductor pattern SC, AL, DR, and SCL may be the active area AL of the transistor 100PC, another portion SC or DR of the semiconductor pattern SC, AL, DR, and SCL may be a source area SC or a drain area DR of the transistor 100PC, and another portion SCL of the semiconductor pattern SC, AL, DR, and SCL may be a connecting electrode or a connecting signal line SCL.

Each of the pixels may have an equivalent circuit including a plurality of transistors, one capacitor, and at least one light emitting element. However, the present disclosure is not particularly limited thereto, and the equivalent circuit of the pixel may be variously modified as needed or desired. In FIG. 6A, one transistor 100PC and one light emitting element 100PE that are included in the pixel are illustrated as a representative example.

The source area SC, the active area AL, and the drain area DR of the transistor 100PC may be formed from the semiconductor pattern SC, AL, DR, and SCL. The source area SC and the drain area DR may extend from the active area AL in opposite directions from each other on the section (e.g., in a cross-sectional view). In FIG. 6A, a portion of the connecting signal line SCL formed from the semiconductor pattern SC, AL, DR, and SCL is show. In another view, the connecting signal line SCL may be connected to the drain area DR of the transistor 100PC when viewed from above the plane (e.g., in a plan view).

A first insulating layer 10 may be disposed on the buffer layer BFL. The first insulating layer 10 may commonly overlap with the plurality of pixels, and may cover the semiconductor pattern SC, AL, DR, and SCL. The first insulating layer 10 may be an inorganic layer and/or an organic layer, and may have a single-layer structure or a multi-layered structure. The first insulating layer 10 may include at least one of aluminum oxide, titanium oxide, silicon oxide, silicon nitride, silicon oxy nitride, zirconium oxide, or hafnium oxide. In an embodiment, the first insulating layer 10 may be a single silicon oxide layer. Not only the first insulating layer 10, but also insulating layers of the circuit layer 120 described in more detail below, may be inorganic layers and/or organic layers, and may have a single-layer structure or a multi-layered structure. The inorganic layers may include at least one of the aforementioned inorganic materials, but the present disclosure is not limited thereto.

A gate GT of the transistor 100PC is disposed on the first insulating layer 10. The gate GT may be a portion of a metal pattern. The gate GT overlaps with the active area AL. The gate GT may function as a mask in a process of doping or reducing the semiconductor pattern SC, AL, DR, and SCL.

A second insulating layer 20 may be disposed on the first insulating layer 10, and may cover the gate GT. The second insulating layer 20 may commonly overlap with the pixels. The second insulating layer 20 may be an inorganic layer and/or an organic layer, and may have a single-layer structure or a multi-layered structure. The second insulating layer 20 may include at least one of silicon oxide, silicon nitride, or silicon oxy nitride. In an embodiment, the second insulating layer 20 may have a multi-layered structure including a silicon oxide layer and a silicon nitride layer.

A third insulating layer 30 may be disposed on the second insulating layer 20. The third insulating layer 30 may have a single-layer structure or a multi-layered structure. For example, the third insulating layer 30 may have a multi-layered structure including a silicon oxide layer and a silicon nitride layer.

A first connecting electrode CNE1 may be disposed on the third insulating layer 30. The first connecting electrode CNE1 may be connected to the connecting signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connecting electrode CNE2 may be disposed on the fifth insulating layer 50. The second connecting electrode CNE2 may be connected to the first connecting electrode CNE1 through a contact hole CNT-2 penetrating the fourth insulating layer 40 and the fifth insulating layer 50.

A sixth insulating layer 60 may be disposed on the fifth insulating layer 50, and may cover the second connecting electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic luminescent material, an inorganic luminescent material, an organic-inorganic luminescent material, a quantum dot, a quantum rod, a micro LED, or a nano LED. Hereinafter, for convenience of illustration, the light emitting element 100PE may be described in more detail in the context of an organic light emitting element. However, the present disclosure is not particularly limited thereto.

The light emitting element 100PE may include a first electrode AE, an emissive layer EL, and a second electrode CE.

The first electrode AE may be disposed on the sixth insulating layer 60. The first electrode AE may be connected to the second connecting electrode CNE2 through a contact hole CNT-3 penetrating the sixth insulating layer 60.

A pixel defining layer 70 may be disposed on the sixth insulating layer 60, and may cover a portion of the first electrode AE. The pixel defining layer 70 may have an opening 70-OP defined therein. The opening 70-OP of the pixel defining layer 70 exposes at least a portion of the first electrode AE.

The first display part DA1-F (e.g., refer to FIG. 1A) may include an emissive area PXA, and a non-emissive area NPXA adjacent to the emissive area PXA. The non-emissive area NPXA may surround (e.g., around a periphery of) the emissive area PXA. In an embodiment, the emissive area PXA is defined to correspond to a partial area of the first electrode AE that is exposed by the opening 70-OP.

The emissive layer EL may be disposed on the first electrode AE. The emissive layer EL may be disposed in an area corresponding to the opening 70-OP. Although FIG. 6A illustrates an example in which the emissive layer EL is disposed in the opening 70-OP, the present disclosure is not particularly limited thereto. For example, the emissive layer EL may extend to cover the side surface of the pixel defining layer 70 that defines the opening 70-Op, and a portion of the upper surface of the pixel defining layer 70.

In an embodiment of the present disclosure, the emissive layer EML may be separately formed for each of the pixels. When the emissive layer EL is separately formed for each of the pixels, the emissive layers EL may each emit at least one of a blue light, a red light, or a green light. However, the present disclosure is not limited thereto, and the emissive layer EL may have a one-body shape to be commonly included in the plurality of pixels. In this case, the emissive layer EL may provide a blue light or a white light.

The second electrode CE may be disposed on the emissive layer EL. The second electrode CE may have a one-body shape, and may be commonly included in the plurality of pixels.

In an embodiment of the present disclosure, a hole control layer may be disposed between the first electrode AE and the emissive layer EL. The hole control layer may be commonly disposed in the emissive area PXA and the non-emissive area NPXA. The hole control layer may include a hole transport layer, and may further selectively include a hole injection layer. An electron control layer may be disposed between the emissive layer EL and the second electrode CE. The electron control layer may include an electron transport layer, and may further selectively include an electron injection layer. The hole control layer and the electron control layer may be commonly formed in the plurality of pixels using an open mask or an ink-jet process.

The encapsulation layer 140 may be disposed on the light emitting element layer 130. The encapsulation layer 140 may include an inorganic layer, an organic layer, and an inorganic layer that are sequentially stacked one above another. However, the layers constituting the encapsulation layer 140 are not particularly limited thereto. The inorganic layers may protect the light emitting element layer 130 from moisture and oxygen, and the organic layer may protect the light emitting element layer 130 from foreign matter such as dust particles. The inorganic layers may include a silicon nitride layer, a silicon oxy nitride layer, a silicon oxide layer, a titanium oxide layer, or an aluminum oxide layer. The organic layer may include an acrylic organic layer, but the present disclosure is not limited thereto.

The sensor layer 200 may include a base layer 201, a first conductive layer 202, an intermediate insulating layer 203, a second conductive layer 204, and a cover insulating layer 205.

The base layer 201 may be an inorganic layer including at least one of silicon nitride, silicon oxy nitride, or silicon oxide. As another example, the base layer 201 may be an organic layer including an epoxy resin, an acrylic resin, or an imide-based resin. The base layer 201 may have a single-layer structure or may have a multi-layered structure stacked in the third direction DR3. In an embodiment of the present disclosure, the sensor layer 200 may not include the base layer 201.

Each of the first conductive layer 202 and the second conductive layer 204 may have a single-layer structure or may have a multi-layered structure stacked in the third direction DR3.

Each of the first conductive layer 202 and the second conductive layer 204 that have the single-layer structure may include a metal layer or a transparent conductive layer. The metal layer may include molybdenum, silver, titanium, copper, aluminum, or a suitable alloy thereof. The transparent conductive layer may include a transparent conductive oxide, such as indium tin oxide (ITO), indium zinc oxide (IZO), zinc oxide (ZnO), indium zinc tin oxide (IZTO), or the like. In addition, the transparent conductive layer may include a conductive polymer, such as poly(3,4-ethylenedioxythiophene) (PEDOT), a metal nano wire, or graphene.

Each of the first conductive layer 202 and the second conductive layer 204 that have the multi-layered structure may include a plurality of metal layers. The meal layers may have, for example, a three-layered structure of titanium/aluminum/titanium. The conductive layer having the multi-layered structure may include at least one metal layer and at least one transparent conductive layer.

In an embodiment of the present disclosure, a thickness of the first conductive layer 202 may be greater than or equal to a thickness of the second conductive layer 204. When the thickness of the first conductive layer 202 is greater than the thickness of the second conductive layer 204, a resistance of a component (e.g., an electrode, a sensing pattern, or a bridge pattern) included in the first conductive layer 202 may be decreased. In addition, because the first conductive layer 202 may be disposed under the second conductive layer 204, a probability that the components included in the first conductive layer 202 will be visually recognized due to a reflection of external light may be lower than that of the second conductive layer 204, even though the thickness of first conductive layer 202 is increased.

At least one of the intermediate insulating layer 203 or the cover insulating layer 205 may include an inorganic film. The inorganic film may include at least one of aluminum oxide, titanium oxide, silicon oxide, silicon nitride, silicon oxy nitride, zirconium oxide, or hafnium oxide.

At least one of the intermediate insulating layer 203 or the cover insulating layer 205 may include an organic film. The organic film may include at least one of an acrylic resin, a methacrylic resin, a polyisoprene resin, a vinyl resin, an epoxy resin, a urethane-based resin, a cellulosic resin, a siloxane-based resin, a polyimide resin, a polyamide resin, or a perylene-based resin.

While the sensor layer 200 has been described as including the first conductive layer 202 and the second conductive layer 204, or in other words, a total of two conductive layers, the present disclosure is not particularly limited thereto. For example, the sensor layer 200 may include three or more conductive layers.

Figure 6B:
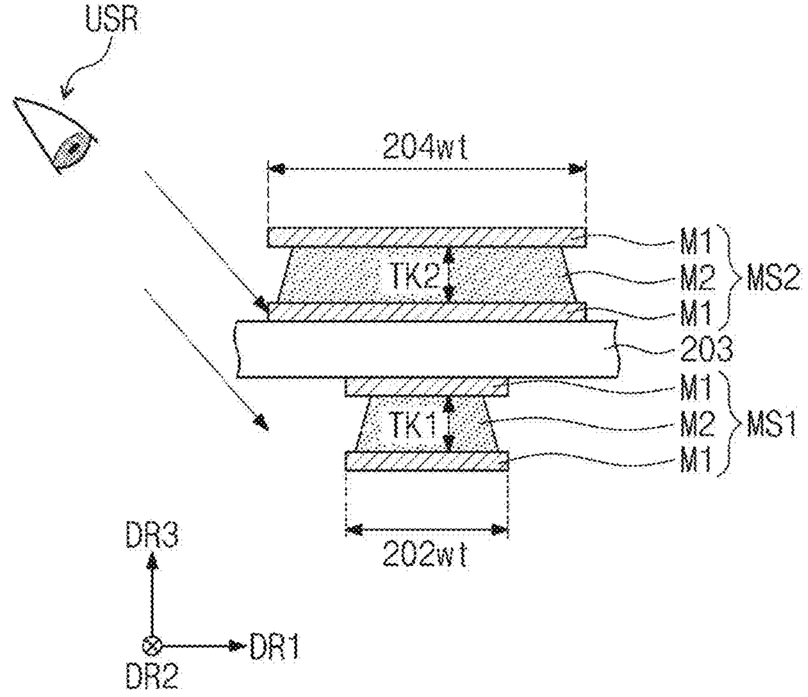
FIG. 6B is a sectional view of a sensor layer according to an embodiment of the present disclosure.

FIG. 6B is a sectional view of the sensor layer 200 according to an embodiment of the present disclosure.

Referring to FIGS. 6A and 6B, a second width 204*wt* of a second mesh line MS2 included in the second conductive layer 204 may be greater than or equal to a first width 202*wt* of a first mesh line MS1 included in the first conductive layer 202. When a user USR looks at (e.g., views) the first mesh line MS1 and the second mesh line MS2 from the side, a probability that the first mesh line MS1 will be visually recognized by the user USR may be decreased because the first mesh line MS1 has a smaller width than that of the second mesh line MS2.

Each of the first mesh line MS1 and the second mesh line MS2 may include first metal layers M1, and a second metal layer M2 disposed between the first metal layers M1. For example, the first metal layers M1 may include titanium (Ti), and the second metal layer M2 may include aluminum (Al). However, the present disclosure is not particularly limited thereto.

In an embodiment of the present disclosure, a first thickness TK1 of the second metal layer M2 of the first mesh line MS1 and a second thickness TK2 of the second metal layer M2 of the second mesh line MS2 may be the same or substantially the same as each other, but the present disclosure is not particularly limited thereto. For example, the first thickness TK1 may be greater than the second thickness TK2. As another example, the second thickness TK2 may be greater than the first thickness TK1. Because the first mesh line MS1 may be disposed under the second mesh line MS2, a probability that the first mesh line MS1 will be visually recognized due to a reflection of external light may be lower than that of the second mesh line MS2, even though the thickness of the first mesh line MS1 is increased. In an embodiment of the present disclosure, each of the first thickness TK1 and the second thickness TK2 may be 1000 angstroms or more, for example, such as 6000 angstroms.

Figure 7A:
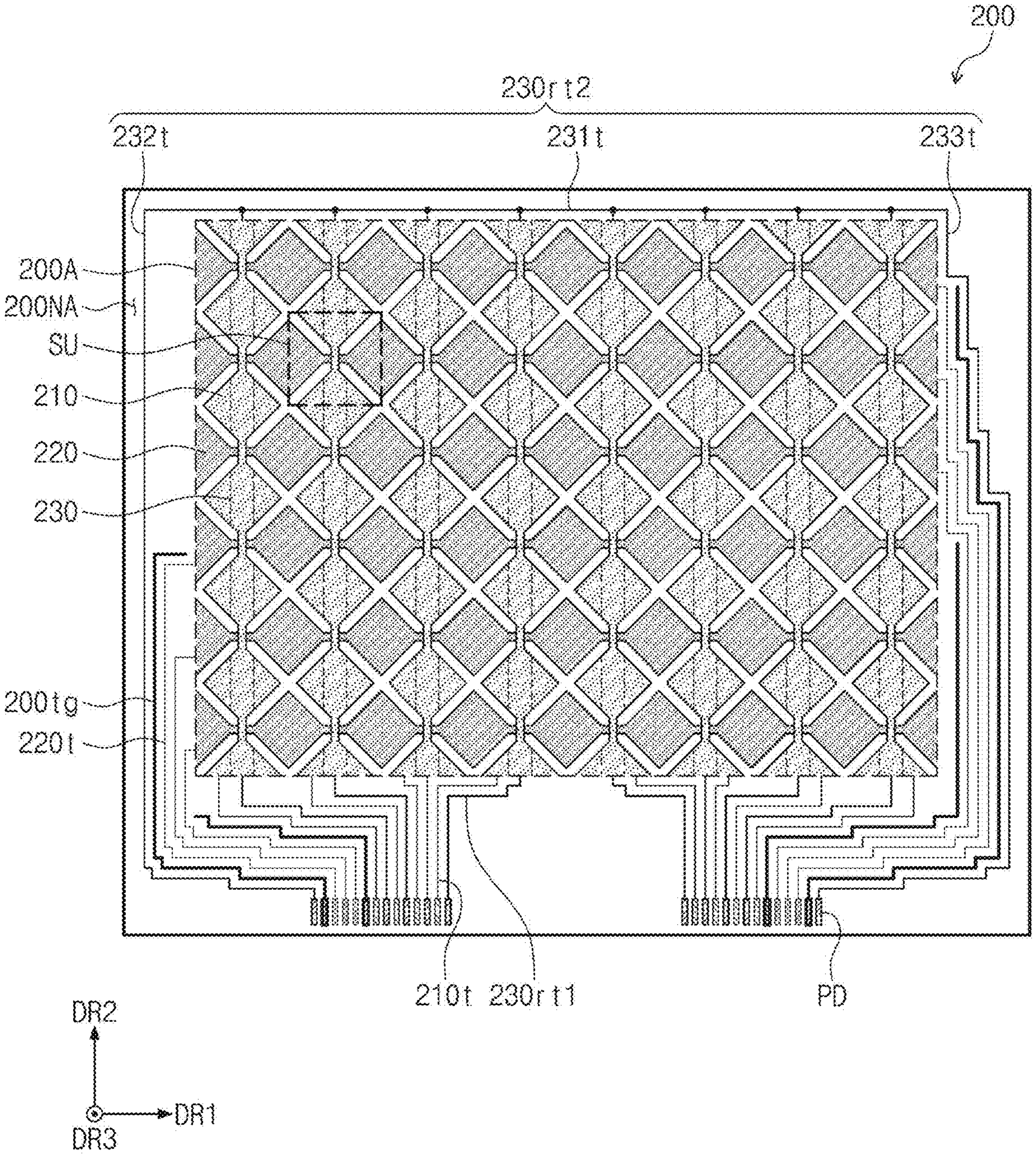
FIG. 7A is a plan view of the sensor layer according to an embodiment of the present disclosure.

FIG. 7A is a plan view of the sensor layer 200 according to an embodiment of the present disclosure.

Referring to FIG. 7A, a sensing area 200A and a peripheral area 200NA adjacent to the sensing area 200A may be defined in the sensor layer 200. The sensor layer 200 may include a plurality of first electrodes 210, a plurality of second electrodes 220, and a plurality of third electrodes 230 disposed in the sensing area 200A.

Each of the first electrodes 210 may cross the second electrodes 220. Each of the first electrodes 210 may extend in the second direction DR2. The first electrodes 210 may be arranged along the first direction DR1 so as to be spaced apart from one another. Each of the second electrodes 220 may extend in the first direction DR1. The second electrodes 220 may be arranged along the second direction DR2 so as to be spaced apart from one another. A sensing unit (e.g., a unit sensing area or region) SU of the sensor layer 200 may be an area where one first electrode 210 and one second electrode 220 cross each other.

In FIG. 7A, eight first electrodes 210 and six second electrodes 220 are illustrated as a representative example, and in this case, 48 sensing units SU are illustrated. However, the number of first electrodes 210 and the number of second electrodes 220 are not particularly limited thereto. According to an embodiment of the present disclosure, the width of the sensing area 200A in the first direction DR1 may be greater than or equal to the width of the sensing area 200A in the second direction DR2. Accordingly, the number of first electrodes 210 arranged along the first direction DR1 may be greater than the number of second electrodes 220 arranged along the second direction DR2.

Each of the third electrodes 230 may extend in the second direction DR2. The third electrodes 230 may be arranged along the first direction DR1 so as to be spaced apart from one another. One third electrode 230 may overlap with one first electrode 210. The expression "A overlaps with B" as used herein may mean a portion of A overlaps with a portion of B, the entirety of A overlaps with a portion of B, the entirety of B overlaps with a portion of A, or the entirety of A overlaps with the entirety of B.

According to an embodiment of the present disclosure, a capacitance (e.g., a coupling capacitance) between one first electrode 210 and one third electrode 230 may be adjusted by adjusting an overlapping area between the one first electrode 210 and the one third electrode 230.

The sensor layer 200 may further include a plurality of first trace lines 210*t* and a plurality of second trace lines 220*t* disposed in the peripheral area 200NA. The first trace lines 210*t* and the second trace lines 220*t* may be disposed to overlap with the non-display area 100NA of the display layer 100 (e.g., refer to FIG. 4). The first trace lines 210*t* may be electrically connected to the first electrodes 210 in a one-to-one correspondence. The second trace lines 220*t* may be electrically connected to the second electrodes 220 in a one-to-one correspondence.

The sensor layer 200 may further include a plurality of first auxiliary trace lines 230*rt*1 and a second auxiliary trace line 230*rt*2.

In an embodiment of the present disclosure, at least one of the third electrodes 230, at least one of the first auxiliary trace lines 230*rt*1, and the second auxiliary trace line 230*rt*2 may form one loop. A magnetic field may be formed by a current path defined by the one loop. The magnetic field may be used to charge an external input device, for example, such as a pen. Accordingly, the first auxiliary trace lines 230*rt*1 may be referred to as first loop trace lines, and the second auxiliary trace line 230*rt*2 may be referred to as a second loop trace line. The third electrodes 230 may be referred to as charging electrodes, loop electrodes, or first auxiliary electrodes.

The first auxiliary trace lines 230*rt*1 may be connected to the third electrodes 230 in a one-to-one correspondence. In other words, the number of first auxiliary trace lines 230*rt*1 may correspond to the number of third electrodes 230. In FIG. 7A, eight first auxiliary trace lines 230*rt*1 and eight third electrodes 230 are illustrated as a representative example.

In an embodiment of the present disclosure, one first auxiliary trace line 230*rt*1 may be electrically connected with a plurality of the third electrodes 230. The plurality of third electrodes 230 connected to the one first auxiliary trace line 230*rt*1 may be referred to as one electrode group. As the number of parallel-connected third electrodes 230 included in one electrode group is increased, a resistance of the one electrode group may be lowered, and thus, a power efficiency and a sensing sensitivity may be improved. On the other hand, as the number of third electrodes 230 included in one electrode group is decreased, a coil pattern formed using the one electrode group may be implemented in more various desired forms.

The second auxiliary trace line 230*rt*2 may be electrically connected with the third electrodes 230. In an embodiment of the present disclosure, the second auxiliary trace line 230*rt*2 may be electrically connected with all of the third electrodes 230.

The second auxiliary trace line 230*rt*2 may include a first line portion 231*t* that extends in the first direction DR1 and that is electrically connected to the third electrodes 230, a second line portion 232*t* extending from a first end of the first line portion 231*t* in the second direction DR2, and a third line portion 233*t* extending from a second end of the first line portion 231*t* in the second direction DR2.

In an embodiment of the present disclosure, each of a resistance of the second line portion 232*t* and a resistance of the third line portion 233*t* may be the same or substantially the same as a resistance of one third electrode 230 among the third electrodes 230. To adjust the resistance of the second line portion 232*t* and the resistance of the third line portion 233*t*, the widths of the second line portion 232*t* and the third line portion 233*t* in the first direction DR1 may be adjusted. However, the present disclosure is not limited thereto, and the first to third line portions 231*t*, 232*t*, and 233*t* may have the same or substantially the same widths as each other.

In an embodiment of the present disclosure, the second auxiliary trace line 230*rt*2 may be provided in a form that surrounds (e.g., around a periphery of) the area where the first trace lines 210*t*, the second trace lines 220*t*, and the first auxiliary trace lines 230*rt*1 are disposed. The second line portion 232*t* and the third line portion 233*t* may serve as the third electrodes 230, and the same effect as placing the third electrodes 230 in the peripheral area 200NA may be obtained. For example, one of the second line portion 232*t* or the third line portion 233*t* and one of the third electrodes 230 may form a coil. Accordingly, a pen located in an area adjacent to the peripheral area 200NA may also be sufficiently charged by a current loop including the second line portion 232*t* or the third line portion 233*t*.

The sensor layer 200 may further include a plurality of guard lines 200*tg* disposed in the peripheral area 200NA. Depending on an operation mode of the sensor layer 200, the guard lines 200*tg* may be grounded or floated, or a suitable signal (e.g., a certain or predetermined signal) may be provided to the guard lines 200*tg*. For example, when the sensor layer 200 operates in a mutual-capacitance detection mode or a pen sensing driving mode, the guard lines 200*tg* may be grounded. When the sensor layer 200 operates in a self-capacitance detection mode, a signal that is the same as the signal provided to adjacent trace lines may be provided to the guard lines 200*tg*. Accordingly, a parasitic capacitance that may be formed between the trace lines may be reduced or eliminated by the guard lines 200*tg*. When the sensor layer 200 operates in a pen charging driving mode, the guard lines 200*tg* may be floated.

The sensor layer 200 may further include a plurality of pads PD disposed in the peripheral area 200NA. Although FIG. 7A illustrates an example in which the pads PD are arranged in one row along the first direction DR1, the present disclosure is not particularly limited thereto. For example, the pads PD may be arranged in a plurality of rows. The pads PD may be electrically connected to the first trace lines 210*t*, the second trace lines 220*t*, the first auxiliary trace lines 230*rt*1, opposite ends of the second auxiliary trace line 230*rt*2, and the guard lines 200*tg* in a one-to-one correspondence.

Figure 7B:
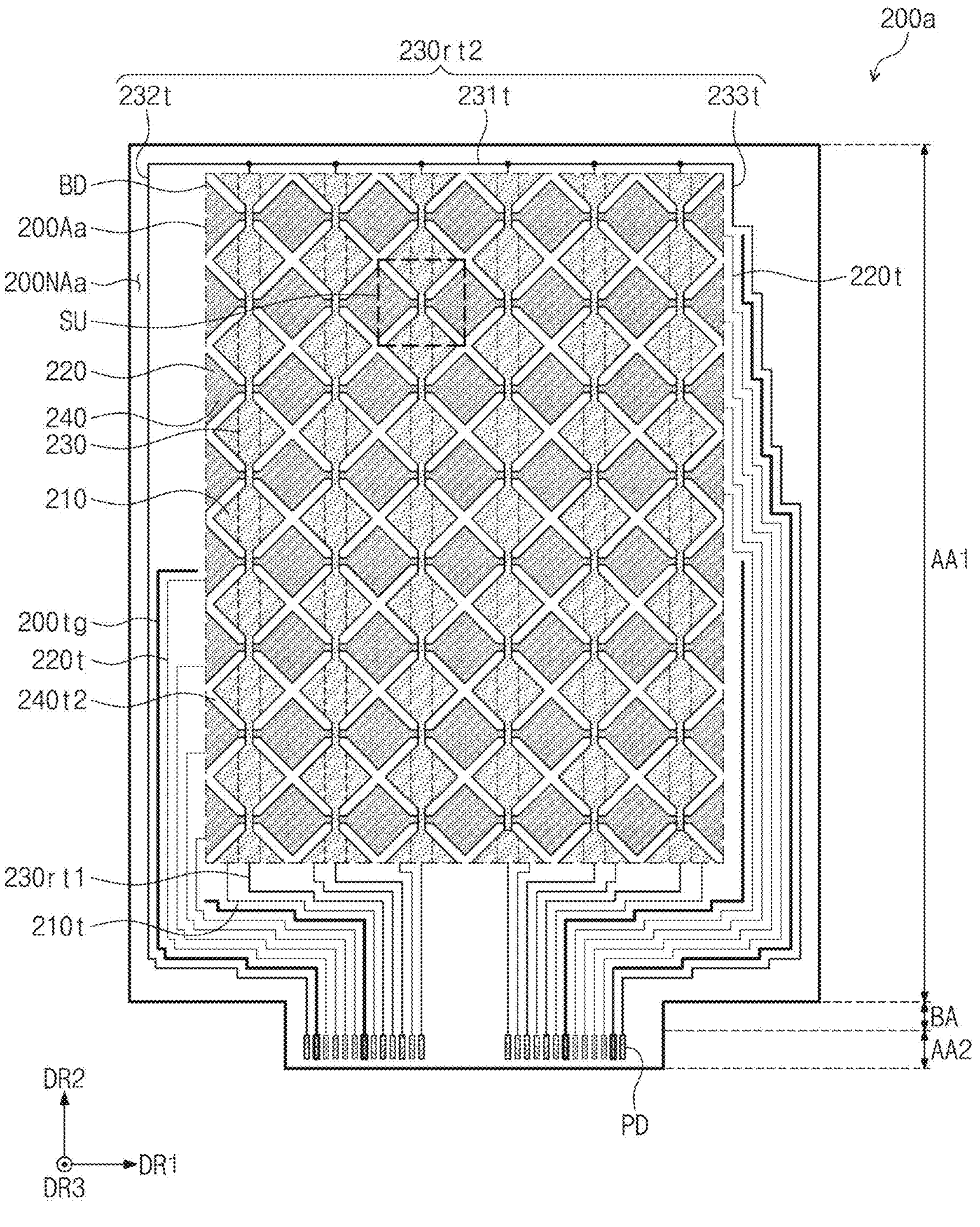
FIG. 7B is a plan view of the sensor layer according to an embodiment of the present disclosure.

FIG. 7B is a plan view of a sensor layer 200*a* according to an embodiment of the present disclosure. In FIG. 7B, the components that are the same or substantially the same as those described above with reference to FIG. 7A may be denoted with the same reference symbols, and thus, redundant description thereof may not be repeated.

Referring to FIGS. 4 and 7B, the display panel DP includes the sensor layer 200*a*. The display panel DP may include a first area AA1, a bending area BA, and a second area AA2. The bending area BA may be disposed between the first area AA1 and the second area AA2 that are spaced apart from each other in the second direction DR2. The width of the bending area BA and the width (e.g., a length) of the second area AA2 that are parallel to or substantially parallel to the first direction DR1 may be smaller than the width (e.g., a length) of the first area AA1 that is parallel to or substantially parallel to the first direction DR1. An area having a smaller length in the direction of a bending axis may be more easily bent.

FIG. 7B is a plan view in an unfolded state before the display panel DP is assembled with other components, or in other words, before the display panel DP is modularized. A portion of the display panel DP may be bent and modularized. For example, the bending area BA may be bent so that the second area AA2 is disposed under the first area AA1.

A sensing area 200Aa and a peripheral area 200NAa adjacent to the sensing area 200Aa may be defined in the sensor layer 200*a*. In FIG. 7B, six first electrodes 210 and eight second electrodes 220 disposed in the sensing area 200Aa are illustrated as a representative example, and thus, 48 sensing units SU are shown. However, the number of first electrodes 210 and the number of second electrodes 220 are not particularly limited thereto.

According to an embodiment of the present disclosure, the width of the sensing area 200Aa in the first direction DR1 may be smaller than or equal to the width of the sensing area 200Aa in the second direction DR2. Accordingly, the number of first electrodes 210 arranged along the first direction DR1 may be smaller than the number of second electrodes 220 arranged along the second direction DR2.

Figure 8A:
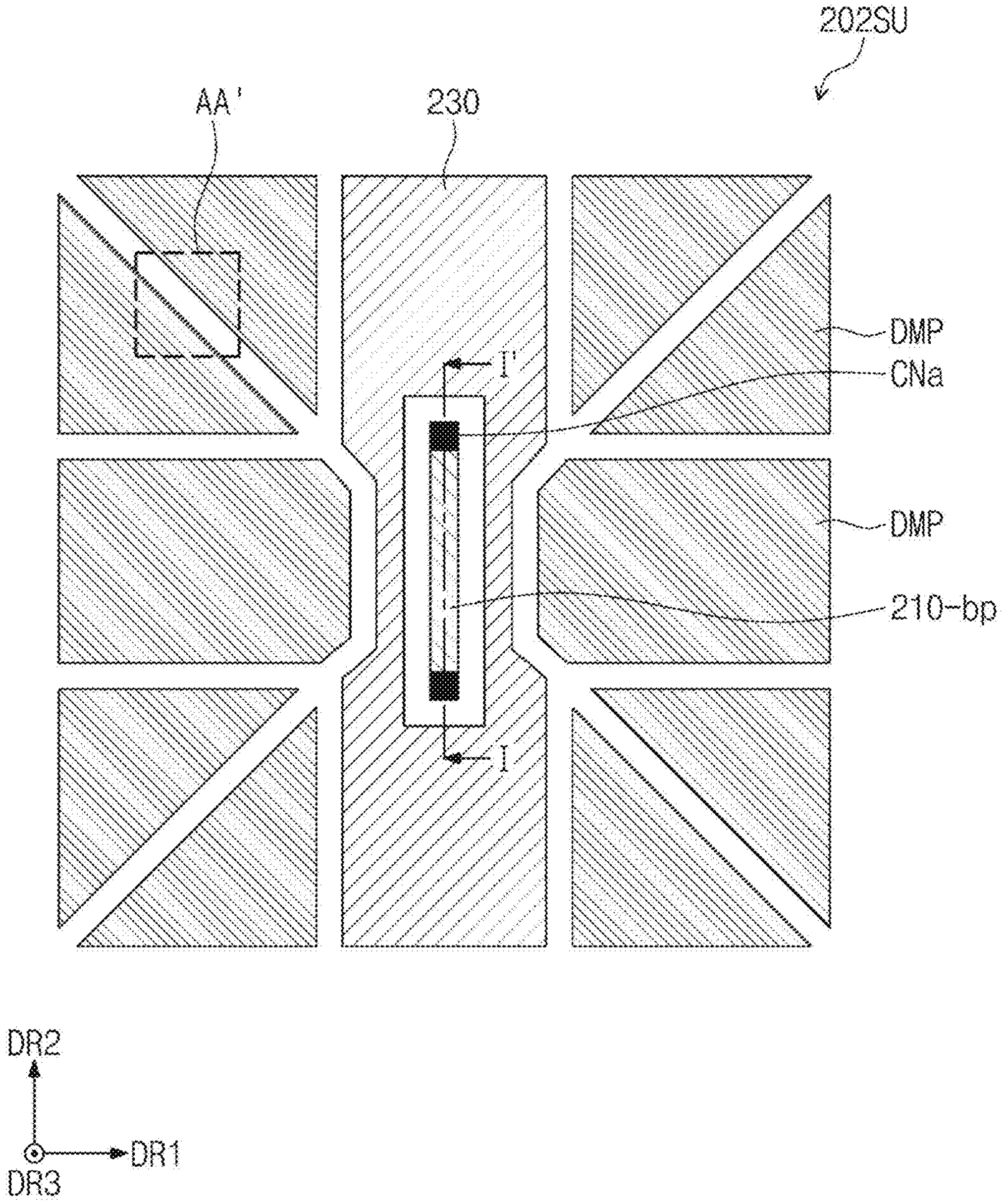
FIG. 8A is a plan view illustrating a first conductive layer of a sensing unit according to an embodiment of the present disclosure.
Figure 8B:
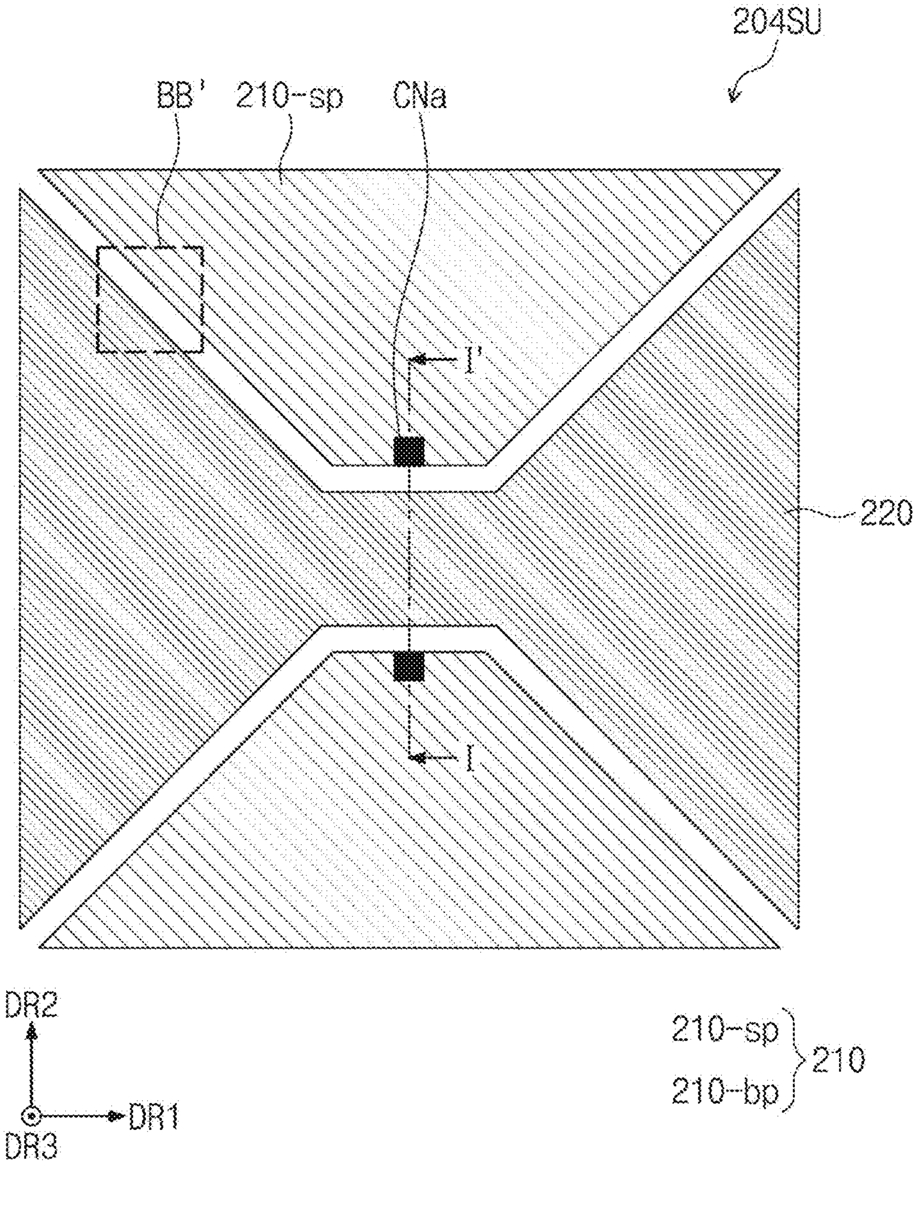
FIG. 8B is a plan view illustrating a second conductive layer of the sensing unit according to an embodiment of the present disclosure.
Figure 9:
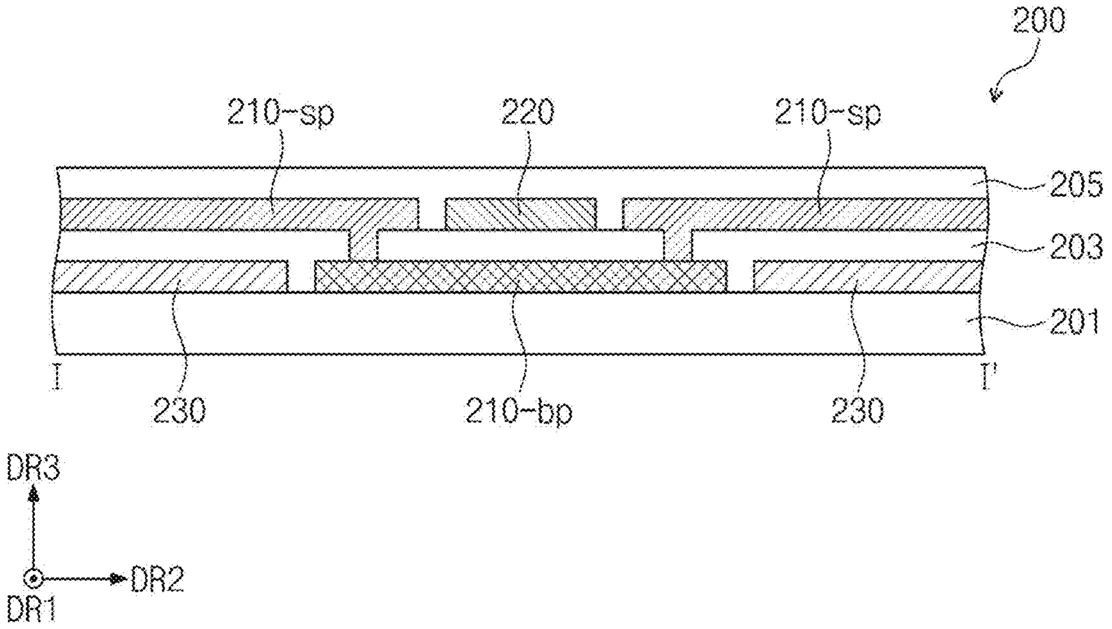
FIG. 9 is a sectional view of a sensor layer taken along the line I-I' illustrated in FIGS. 8A and 8B according to an embodiment of the present disclosure.

FIG. 8A is a plan view illustrating a first conductive layer 202SU of the sensing unit SU according to an embodiment of the present disclosure. FIG. 8B is a plan view illustrating a second conductive layer 204SU of the sensing unit SU according to an embodiment of the present disclosure. FIG. 9 is a sectional view of the sensor layer 200 taken along the line I-I' illustrated in FIGS. 8A and 8B according to an embodiment of the present disclosure.

Referring to FIGS. 8A, 8B, and 9, the first electrode 210 may include first sensing patterns 210-*sp* and a first bridge pattern 210-*bp*. The first sensing patterns 210-*sp* and the first bridge pattern 210-*bp* may be electrically connected with each other through a first contact CNa. The second electrode 220 may be disposed at (e.g., in or on) the same layer as that of the first sensing patterns 210-*sp*. For example, the first sensing patterns 210-*sp* may be spaced apart from each other with the second electrode 220 therebetween. The first bridge pattern 210-*bp* may be disposed at (e.g., in or on) a layer different from the layer at (e.g., in or on) which the second electrode 220 is disposed. The first bridge pattern 210-*bp* may be insulated from the second electrode 220, and may cross the second electrode 220.

The third electrode 230 may be disposed at (e.g., in or on) the same layer as that of the first bridge pattern 210-*bp*. An opening may be defined in the third electrode 230 to surround (e.g., around a periphery of) the first bridge pattern 210-*bp*. The third electrode 230 may overlap with the first sensing patterns 210-*sp*. Accordingly, a coupling capacitor may be defined between the first electrode 210 and the third electrode 230.

In an embodiment of the present disclosure, the first conductive layer 202SU may include the first bridge pattern 210-*bp* and the third electrode 230. The second conductive layer 204SU may include the first sensing patterns 210-*sp* and the second electrode 220.

In an embodiment of the present disclosure, the first conductive layer 202SU may further include dummy patterns DMP. Because the dummy patterns DMP are disposed in empty spaces, a probability that specific patterns will be visually recognized due to a reflection of external light may be reduced. In other words, the electronic device 1000 (e.g., refer to FIG. 1A) in which visibility depending on a reflection of external light is improved may be provided. Each of the dummy patterns DMP may be electrically floated or electrically grounded. In an embodiment of the present disclosure, the dummy patterns DMP may be omitted as needed or desired.

Referring to FIGS. 8A and 8B, in the second conductive layer 204SU in one sensing unit SU, the area occupied by the components included in the first electrode 210 and the second electrode 220 may be greater than the area occupied by the components included in the third electrode 230. A change in a capacitance by the first input 2000 (e.g., refer to FIG. 4) may be increased as the distance is decreased. Accordingly, a component for sensing the first input 2000 (e.g., refer to FIG. 4) may be disposed in a relatively larger area in a layer adjacent to the surface of the electronic device 1000 (e.g., refer to FIG. 1A). Thus, a touch performance may be improved.

According to an embodiment of the present disclosure, the sensor layer 200 may not include auxiliary electrodes (hereinafter, referred to as the pen sensing electrodes) overlapping with the second electrodes 220. The pen sensing electrodes may be included in the above-described lower sensor layer 300 (e.g., refer to FIG. 5).

A coupling capacitance between the first electrode 210 and the pen sensing electrode may cause a noise in a specific state. When the ground of the electronic device 1000 (e.g., refer to FIG. 1A) is not in common with the ground of an object that provides an input, it may cause a low ground mass (LGM) state in which the electronic device 1000 does not have a sufficient ground state. The low ground mass state may correspond to a state in which a touch by a water droplet occurs, or a state in which a touch is controlled while the electronic device 1000 is placed on a table. In this case, charges that may have to escape to the ground may be reintroduced into the second electrode 220 through the coupling capacitor between the first electrode 210 and the pen sensing electrode, and the coupling capacitor between the pen sensing electrode and the second electrode 220. The reintroduced charges may cause a deterioration in a touch performance.

According to an embodiment of the present disclosure, because the pen sensing electrodes are spaced apart from the first to third electrodes 210, 220, and 230, the coupling capacitance between the pen sensing electrodes and each of the first to third electrodes 210, 220, and 230 may be decreased. Accordingly, a phenomenon in which the charges that may have to escape to the ground are reintroduced into the second electrode 220 via the pen sensing electrodes may be reduced or eliminated. Thus, the touch performance of the electronic device 1000 may be improved.

In addition, because the pen sensing electrodes are not included in the sensor layer 200, a degree of freedom in the design of the first electrodes 210, the second electrodes 220, and the third electrodes 230 may be improved. For example, a gap between the first electrode 210 and the second electrode 220 may be increased. When the capacitance between the first electrode 210 and the second electrode 220 is decreased due to the increase in the gap between the first electrode 210 and the second electrode 220, temperature characteristics of the sensor layer 200 may be improved. For example, the capacitance may have a value that varies depending on the temperature. In other words, when the temperature characteristics are improved, the dielectric constant may vary depending on the temperature, and a probability of an occurrence of a ghost touch recognized as a touch even though a touch action does not occur may be decreased. As another example, the areas of the first electrode 210 and the second electrode 220 may be increased. In this case, a sensitivity to an external touch may be improved.

Figure 10A:
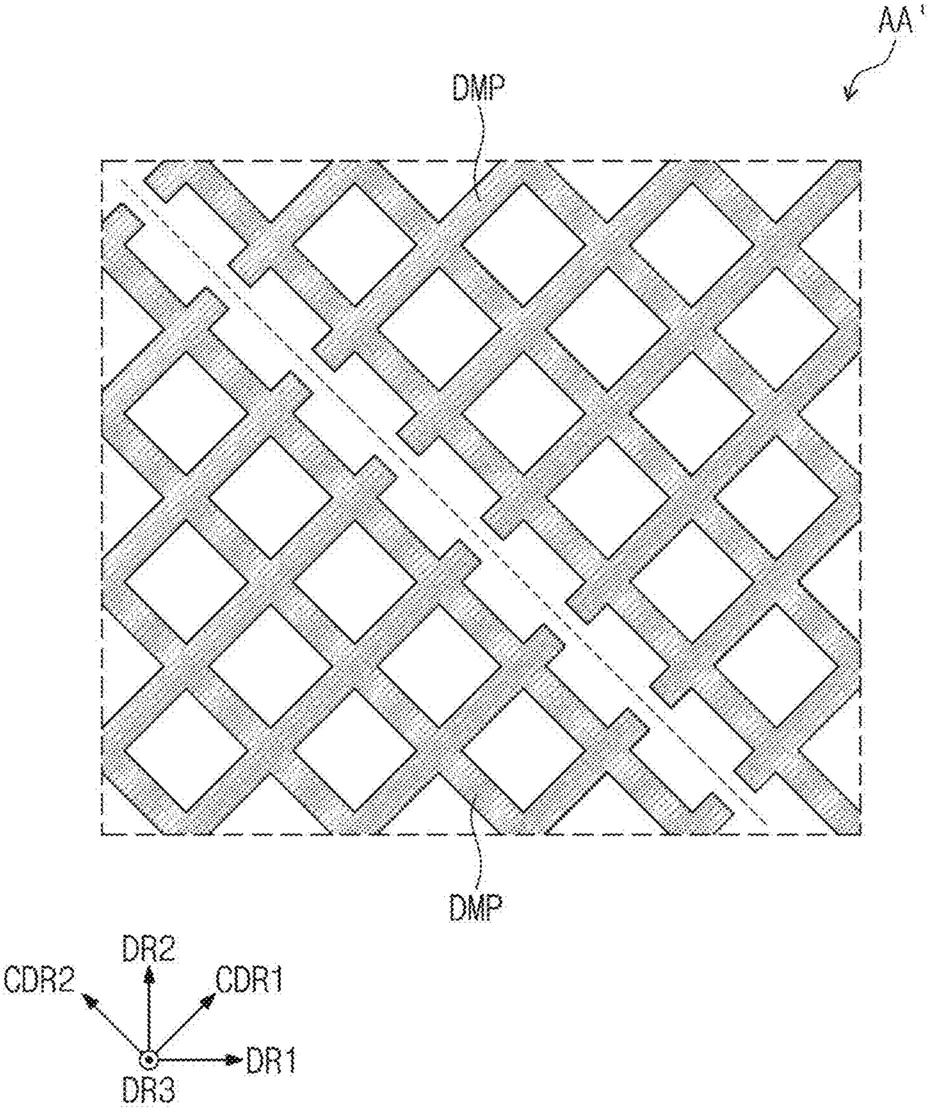
FIG. 10A is an enlarged plan view of the area AA' illustrated in FIG. 8A.
Figure 10B:
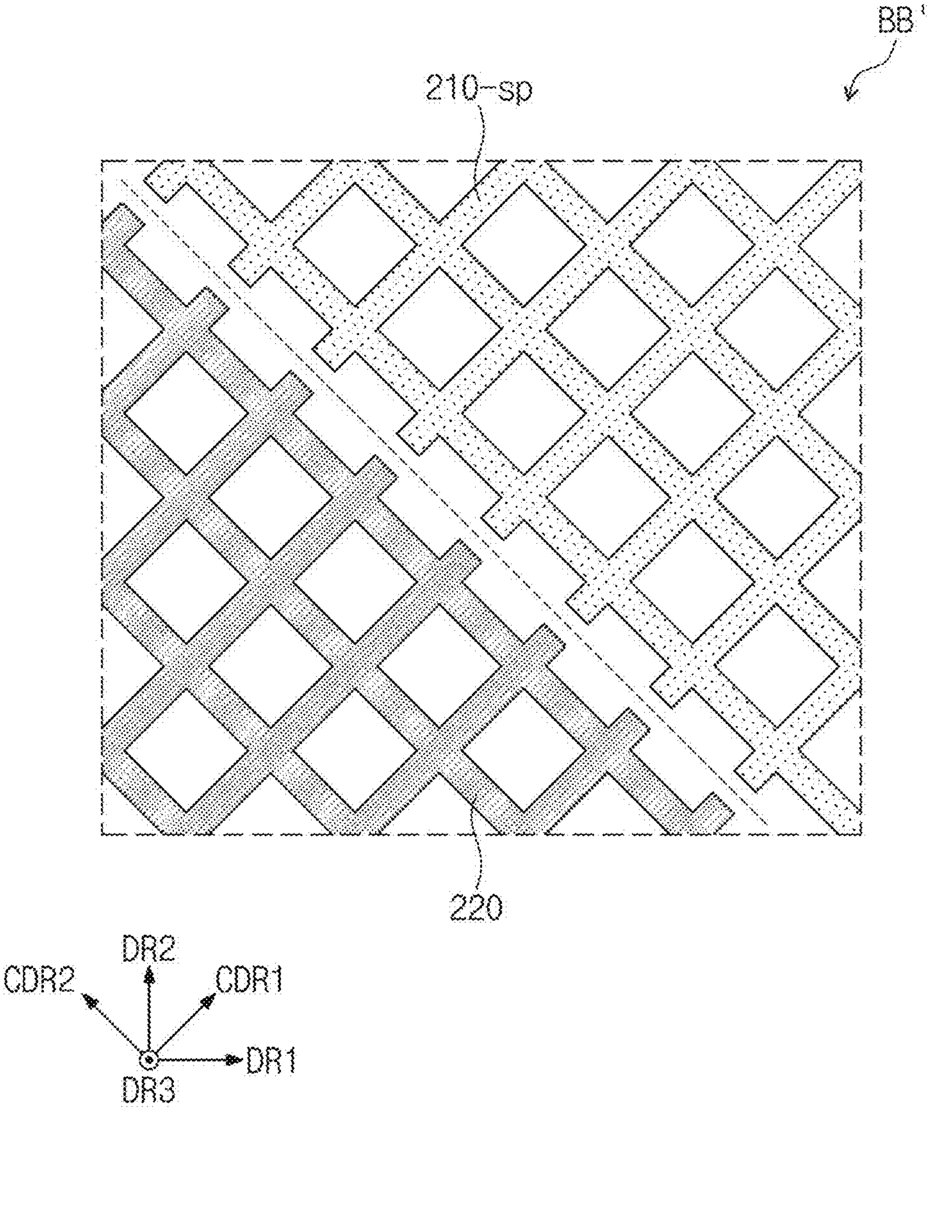
FIG. 10B is an enlarged plan view of the area BB' illustrated in FIG. 8B.

FIG. 10A is an enlarged plan view of the area AA' illustrated in FIG. 8A. FIG. 10B is an enlarged plan view of the area BB' illustrated in FIG. 8B.

Referring to FIGS. 8A, 8B, 10A, and 10B, each of the first electrodes 210, the second electrodes 220, the third electrodes 230, and the dummy patterns DMP may have a mesh structure. The mesh structure may include a plurality of mesh lines. Each of the plurality of mesh lines may have a suitable shape extending in a suitable direction (e.g., a certain or predetermined direction). The plurality of mesh lines may be connected with one another. The mesh lines may have various suitable shapes, such as a straight line, a line having protrusions, and/or an uneven line. Openings where the mesh structure is not disposed may be defined (e.g., may be provided or formed) in each of the first electrodes 210, the second electrodes 220, the third electrodes 230, and the dummy patterns DMP.

FIGS. 10A and 10B illustrate an example in which the mesh structure includes mesh lines extending in a first crossing direction CDR1 that crosses the first direction DR1 and the second direction DR2, and mesh lines extending in a second crossing direction CDR2 that crosses the first crossing direction CDR1. However, the extension directions of the mesh lines constituting the mesh structure are not particularly limited to those illustrated in FIGS. 10A and 10B. For example, the mesh structure may include only mesh lines extending in the first direction DR1 and the second direction DR2, or may include mesh lines extending in the first direction DR1, the second direction DR2, the first crossing direction CDR1, and the second crossing direction CDR2. In other words, the mesh structure may be variously modified as needed or desired.

Figure 11A:
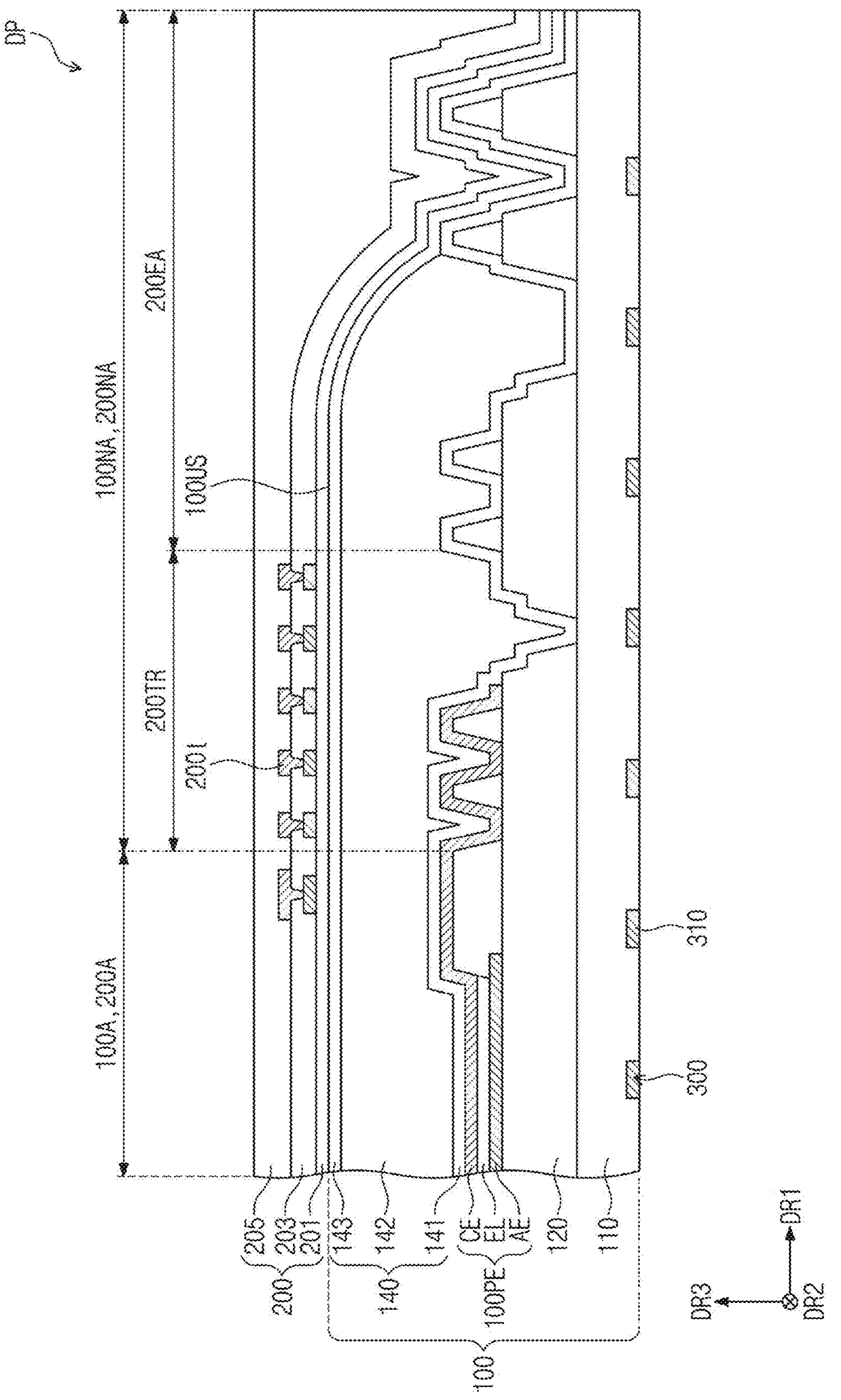
FIG. 11A is a sectional view of the display panel according to an embodiment of the present disclosure.

FIG. 11A is a sectional view of the display panel DP according to an embodiment of the present disclosure.

Referring to FIGS. 6A and 11A, the display layer 100 may include the base layer 110, the circuit layer 120 disposed on the base layer 110, the light emitting element layer 130 disposed on the circuit layer 120, and the encapsulation layer 140 disposed on the light emitting element layer 130.

The encapsulation layer 140 may include a first encapsulation 141, a second encapsulation 142, and a third encapsulation 143. The first encapsulation layer 141 and the third encapsulation layer 143 may be inorganic layers, and the second encapsulation layer 142 may be an organic layer. For example, the second encapsulation layer 142 may be formed of a monomer, and may be a layer that provides a flat or substantially flat surface. The upper surface 100US of the display layer 100 may correspond to the upper surface of the encapsulation layer 140.

The sensor layer 200 may be disposed on the upper surface 100US of the display layer 100. The sensor layer 200 may be used to sense the coordinates for the first input 2000 (e.g., refer to FIG. 5). The lower sensor layer 300 may be disposed under the upper surface 100US of the display layer 100. The lower sensor layer 300, together with the sensor layer 200, may be used to sense the coordinates for the second input 3000 (e.g., refer to FIG. 5).

The lower sensor layer 300 may include a plurality of pen sensing electrodes 310. In an embodiment of the present disclosure, the pen sensing electrodes 310 may be disposed on the lower surface of the base layer 110. For example, the lower surface of the base layer 110 may have a depressed shape corresponding to the arrangement of the pen sensing electrodes 310.

According to an embodiment of the present disclosure, the pen sensing electrodes 310 may not be included in the sensor layer 200. In other words, the pen sensing electrodes 310 may be spaced apart from the first to third electrodes 210, 220, and 230 by a gap that is greater than or equal to the thickness of the intermediate insulating layer 203. Accordingly, a coupling capacitance between the pen sensing electrodes 310 and each of the first to third electrodes 210, 220, and 230 may be decreased. As a result, a phenomenon in which the charges that may have to escape to the ground are reintroduced into the second electrode 220 via the pen sensing electrodes 310 may be reduced or eliminated. Thus, the touch performance of the electronic device 1000 (e.g., refer to FIG. 1A) may be improved.

The peripheral area 200NA of the sensor layer 200 may include a trace area 200TR where a plurality of trace lines 200*t* electrically connected to the first electrodes 210, the second electrodes 220, and the third electrodes 230 are disposed, and an edge area 200EA adjacent to the trace area 200TR. For example, the edge area 200EA may be spaced apart from the sensing area 200A with the trace area 200TR therebetween. The trace lines 200*t* may include the first trace lines 210*t*, the second trace lines 220*t*, the first auxiliary trace lines 230*rt*1, and the second auxiliary trace line 230*rt*2 described above with reference to FIG. 7A.

In an embodiment of the present disclosure, the pen sensing electrodes 310 may overlap with the sensing area 200A. As another example, the pen sensing electrodes 310 may overlap with the sensing area 200A and the trace area 200TR. As another example, the pen sensing electrodes 310 may overlap with the sensing area 200A, the trace area 200TR, and the edge area 200EA.

In an embodiment of the present disclosure, the pen sensing electrodes 310 may be disposed under the upper surface 100US of the display layer 100. Accordingly, an area where the pen sensing electrodes 310 are to be disposed is not limited to the sensing area 200A or the display area 100A. As another example, an area where the pen sensing electrodes 310 are to be disposed may not be limited to the area where the flat or substantially flat surface by the second encapsulation layer 142 is provided. Accordingly, the pen sensing electrodes 310 may extend not only to the sensing area 200A, but also to the trace area 200TR and the edge area 200EA. In this case, the area that is able to be sensed by the pen sensing electrodes 310 may be expanded. Thus, the sensing performance using the pen sensing electrodes 310 may be improved.

Figure 11B:
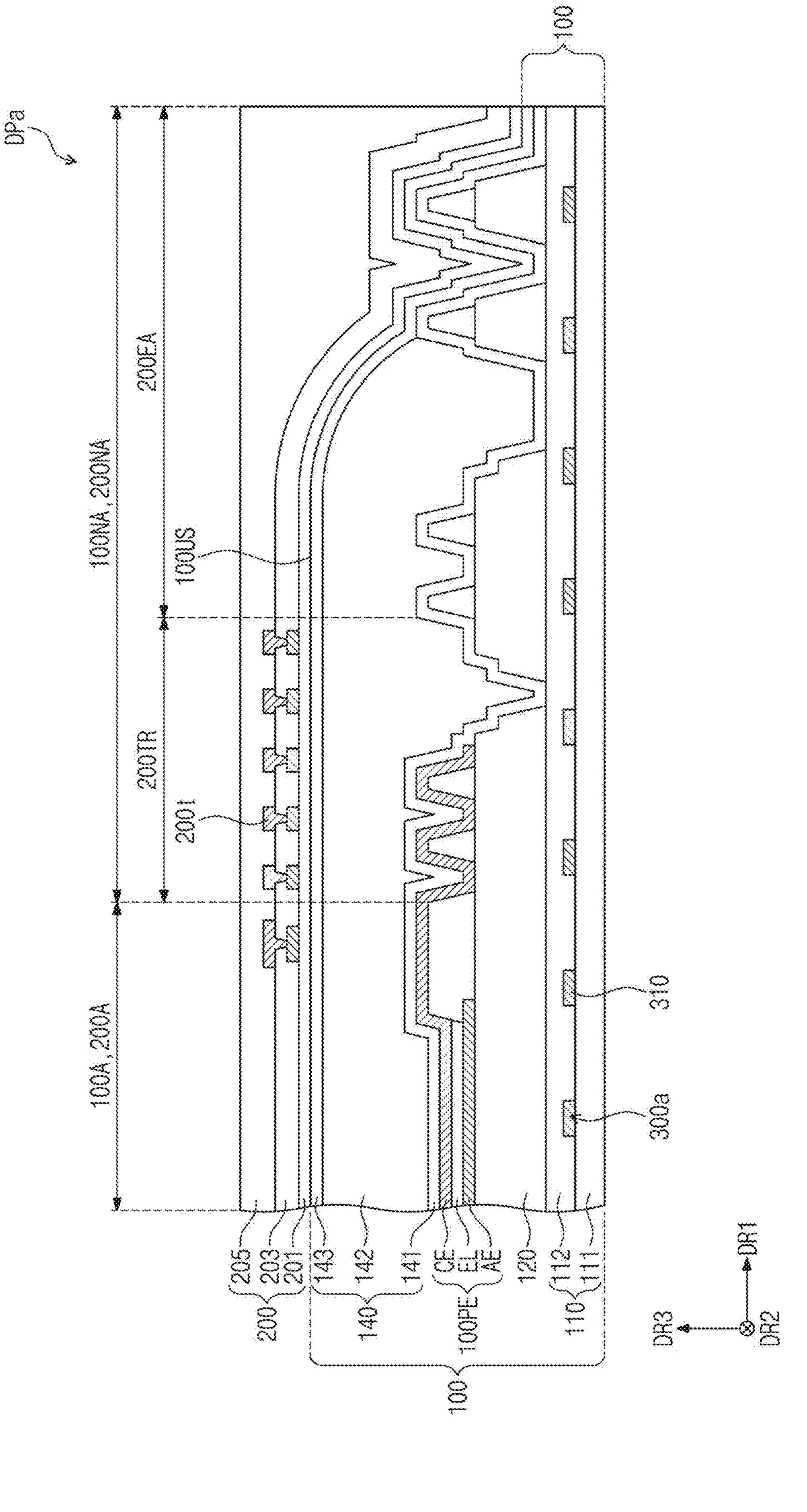
FIG. 11B is a sectional view of the display panel according to an embodiment of the present disclosure.

FIG. 11B is a sectional view of a display panel DPa according to an embodiment of the present disclosure. In FIG. 11B, the components that are the same or substantially the same as those described above with reference to FIG. 11A may be denoted with the same reference symbols, and thus, redundant description thereof may not be repeated.

Referring to FIGS. 6A and 11B, the base layer 110 may include a first sub-base layer 111, and a second sub-base layer 112 disposed on the first sub-base layer 111.

In an embodiment of the present disclosure, a lower sensor layer 300*a* may be disposed between the first sub-base layer 111 and the second sub-base layer 112. In other words, the pen sensing electrodes 310 included in the lower sensor layer 300*a* may be disposed between the first sub-base layer 111 and the second sub-base layer 112.

According to an embodiment of the present disclosure, the pen sensing electrodes 310 may be included in the base layer 110. In other words, the pen sensing electrodes 310 may be spaced apart from the first to third electrodes 210, 220, and 230 by a gap greater than or equal to the thickness of the intermediate insulating layer 203. Accordingly, a coupling capacitance between the pen sensing electrodes 310 and each of the first to third electrodes 210, 220, and 230 may be decreased. As a result, a phenomenon in which the charges that may have to escape to the ground are reintroduced into the second electrode 220 via the pen sensing electrodes 310 may be reduced or eliminated. Thus, the touch performance of the electronic device 1000 (e.g., refer to FIG. 1A) may be improved.

Figure 11C:
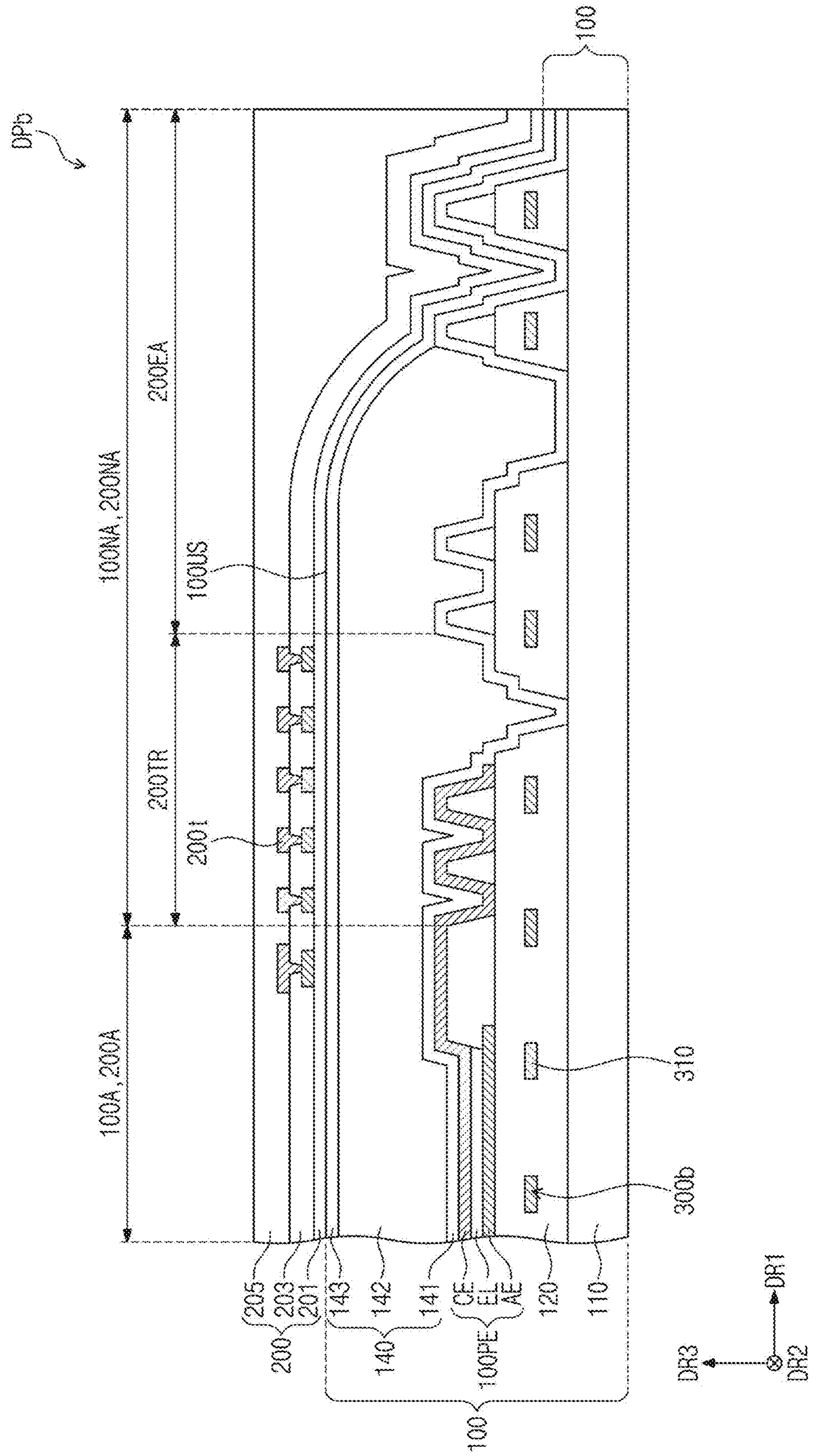
FIG. 11C is a sectional view of the display panel according to an embodiment of the present disclosure.

FIG. 11C is a sectional view of a display panel DPb according to an embodiment of the present disclosure. In FIG. 11C, the components that are the same or substantially the same as those described above with reference to FIG. 11A may be denoted with the same reference symbols, and thus, redundant description thereof may not be repeated.

Referring to FIGS. 6A and 11C, a lower sensor layer 300*b* may be included in the circuit layer 120. However, the present disclosure is not limited thereto, and the lower sensor layer 300*b* may be implemented with or within at least one of the layers disposed under the upper surface 100US of the display layer 100. For example, the lower sensor layer 300*b* may be included in the light emitting element layer 130, or may be included in the encapsulation layer 140.

The pen sensing electrodes 310 included in the lower sensor layer 300*b* may be spaced apart from the first to third electrodes 210, 220, and 230 by a gap greater than or equal to the thickness of the intermediate insulating layer 203. Accordingly, a coupling capacitance between the pen sensing electrodes 310 and each of the first to third electrodes 210, 220, and 230 may be decreased. As a result, a phenomenon in which the charges that may have to escape to the ground are reintroduced into the second electrode 220 via the pen sensing electrodes 310 may be reduced or eliminated. Thus, the touch performance of the electronic device 1000 (e.g., refer to FIG. 1A) may be improved.

As described above with reference to FIGS. 11A, 11B, and 11C, the pen sensing electrodes 310 may be disposed below the light emitting element 100PE where the emissive area PXA (e.g., refer to FIG. 6A) is defined. Accordingly, a degree of freedom in designing the shape of the pen sensing electrodes 310 may be further improved. For example, each of the pen sensing electrodes 310 may have a mesh structure in which a plurality of openings are defined as described above with reference to FIGS. 10A and 10B, or may have a solid structure in which the plurality of openings are not defined.

Figure 12A:
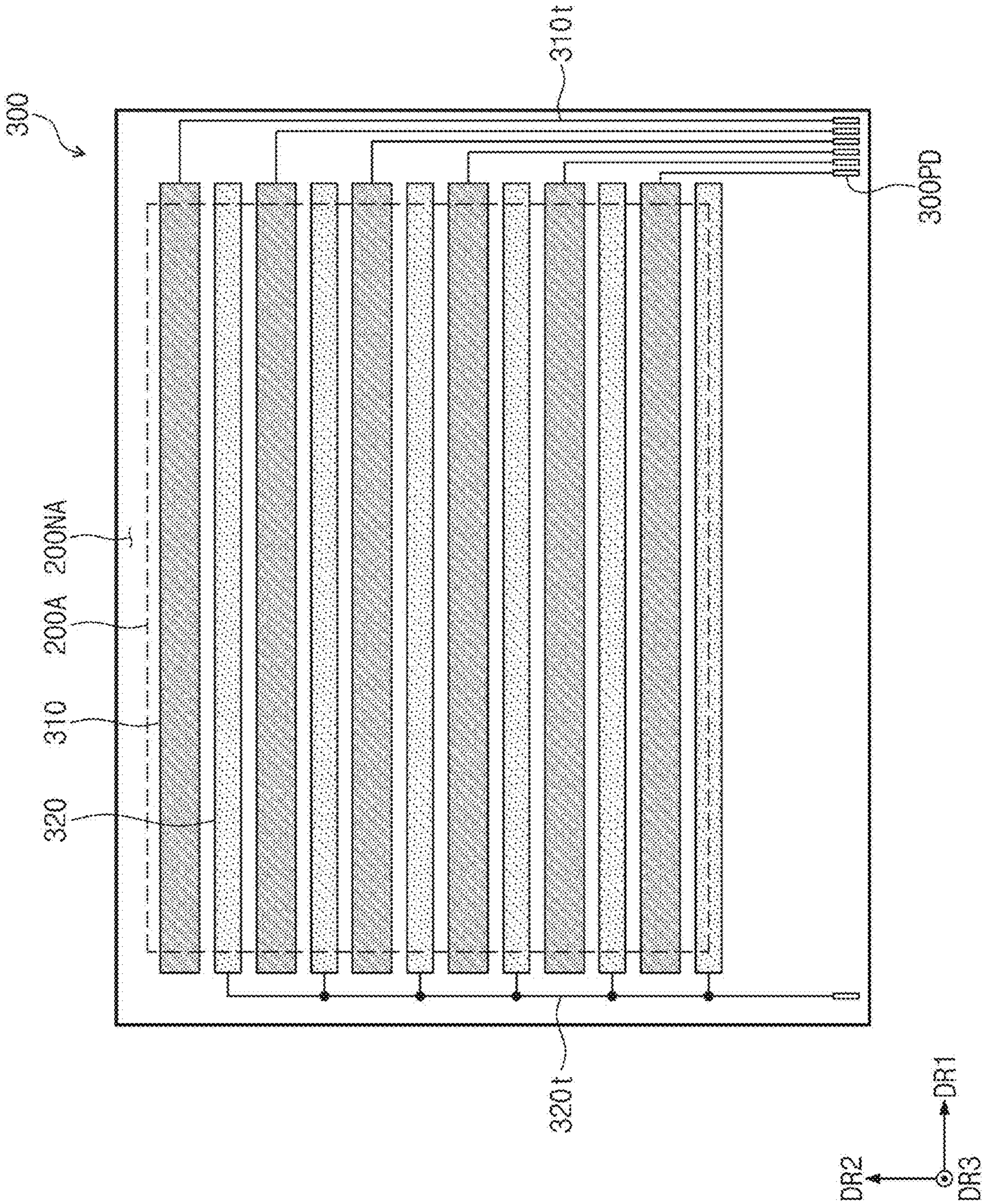
FIG. 12A is a plan view of a lower sensor layer according to an embodiment of the present disclosure.

FIG. 12A is a plan view of the lower sensor layer 300 according to an embodiment of the present disclosure.

Referring to FIGS. 7A, 11A, and 12A, the lower sensor layer 300 may include the plurality of pen sensing electrodes 310. Each of the pen sensing electrodes 310 may extend in a direction crossing the third electrodes 230. For example, each of the third electrodes 230 may extend in the second direction DR2, and each of the pen sensing electrodes 310 may extend in the first direction DR1. The pen sensing electrodes 310 may be arranged along the second direction DR2 so as to be spaced apart from one another.

According to an embodiment of the present disclosure, the lower sensor layer 300 may further include a plurality of auxiliary electrodes 320 disposed adjacent to the pen sensing electrodes 310. Each of the auxiliary electrodes 320 may extend in the first direction DR1. The auxiliary electrodes 320 may be arranged along the second direction DR2 so as to be spaced apart from one another.

In an embodiment of the present disclosure, the pen sensing electrodes 310 and the auxiliary electrodes 320 may be disposed at (e.g., in or on) the same layer as each other. The pen sensing electrodes 310 and the auxiliary electrodes 320 may not overlap with each other when viewed from above the plane (e.g., in a plan view).

The lower sensor layer 300 may include a plurality of trace lines 310*t* electrically connected with the pen sensing electrodes 310, and an auxiliary trace line 320*t* electrically connected to the auxiliary electrodes 320.

In an embodiment of the present disclosure, routing directions of the trace lines 310*t* with respect to the pen sensing electrodes 310 may be the same as each other. FIG. 12A illustrates an example in which the trace lines 310*t* are connected to the right ends of the pen sensing electrodes 310 in a one-to-one correspondence, and the auxiliary trace line 320*t* is connected to the left ends of the auxiliary electrodes 320.

Because the lower sensor layer 300 may be disposed below the upper surface 100US of the display layer 100 according to an embodiment of the present disclosure, a degree of freedom in a space design may be improved. For example, when the space in which the trace lines 200*t* of the sensor layer 200 are disposed is limited to the trace area 200TR, the space in which the trace lines 310*t* of the lower sensor layer 300 are disposed may be utilized up to the edge area 200EA.

Accordingly, the trace lines 310*t* may be disposed only on one side of the pen sensing electrodes 310, without being separately disposed on the left and right sides of the pen sensing electrodes 310. In this case, a coordinate distortion due to a change in the routing directions of the trace lines 310*t* may be prevented or reduced.

Figure 12B:
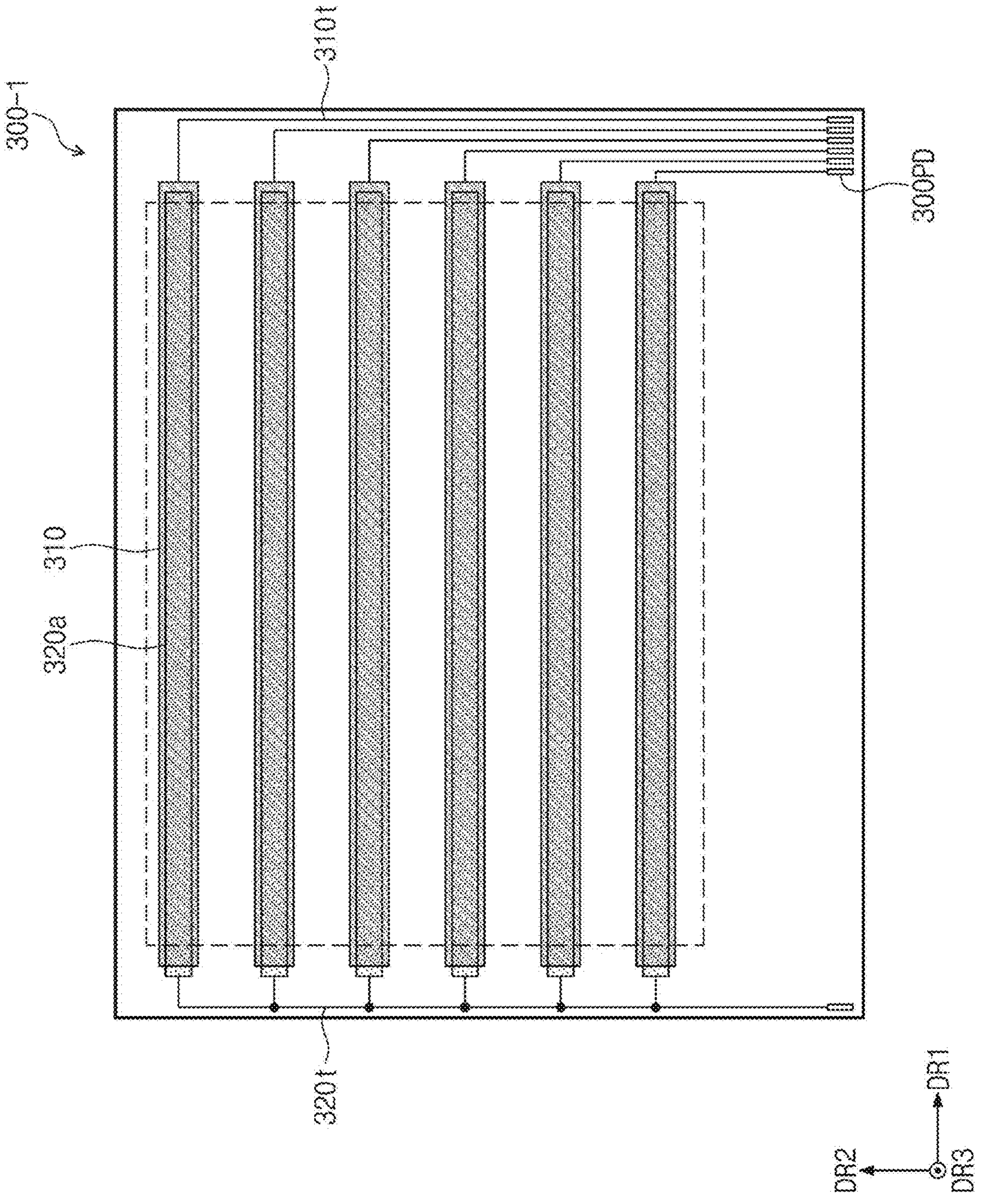
FIG. 12B is a plan view of a lower sensor layer according to an embodiment of the present disclosure.

FIG. 12B is a plan view of a lower sensor layer 300-1 according to an embodiment of the present disclosure. In FIG. 12B, the components that are the same or substantially the same as those described above with reference to FIG. 12A may be denoted with the same reference symbols, and thus, redundant description thereof may not be repeated.

Referring to FIGS. 7A, 11A, and 12B, the lower sensor layer 300-1 may include a plurality of pen sensing electrodes 310 and a plurality of auxiliary electrodes 320*a*. The pen sensing electrodes 310 and the auxiliary electrodes 320*a* may be disposed at (e.g., in or on) different layers from each other, and may be insulated from each other. The pen sensing electrodes 310 and the auxiliary electrodes 320*a* may overlap with each other when viewed from above the plane (e.g., in a plan view).

Figure 13:
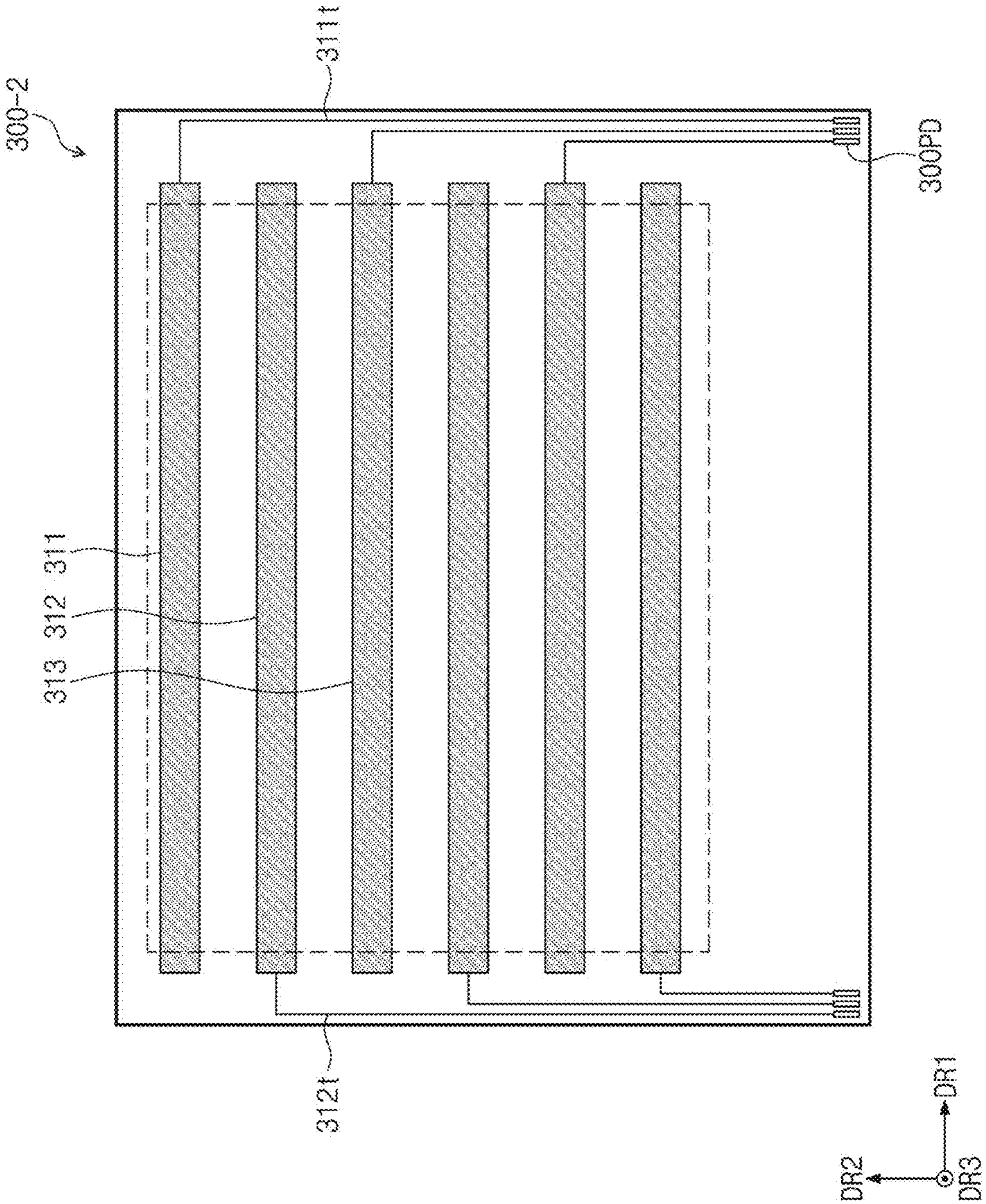
FIG. 13 is a plan view of a lower sensor layer according to an embodiment of the present disclosure.

FIG. 13 is a plan view of a lower sensor layer 300-2 according to an embodiment of the present disclosure.

Referring to FIG. 13, the lower sensor layer 300-2 may include a plurality of pen sensing electrodes 311, 312, and 313. The pen sensing electrodes 311, 312, and 313 may include a first pen sensing electrode 311, a second pen sensing electrode 312, and a third pen sensing electrode 313. The first to third pen sensing electrodes 311, 312, and 313 may be sequentially arranged along the second direction DR2, or along the direction opposite to the second direction DR2.

In an embodiment of the present disclosure, the routing direction of the first pen sensing electrode 311 may be the same as the routing direction of the third pen sensing electrode 313, and the routing direction of the second pen sensing electrode 312 may be different from the routing direction of the first pen sensing electrode 311. For example, the lower sensor layer 300-2 may further include first direction trace lines 311*t* disposed on the right side of the pen sensing electrodes 311, 312, and 313, and second direction trace lines 312*t* disposed on the left side of the pen sensing electrodes 311, 312, and 313.

In an embodiment of the present disclosure, the second pen sensing electrode 312 may function as an auxiliary electrode for the first pen sensing electrode 311. The first pen sensing electrode 311 and the third pen sensing electrode 313 may function as auxiliary electrodes for the second pen sensing electrode 312. Accordingly, the lower sensor layer 300-2 may not include an auxiliary electrode.

Figure 14:
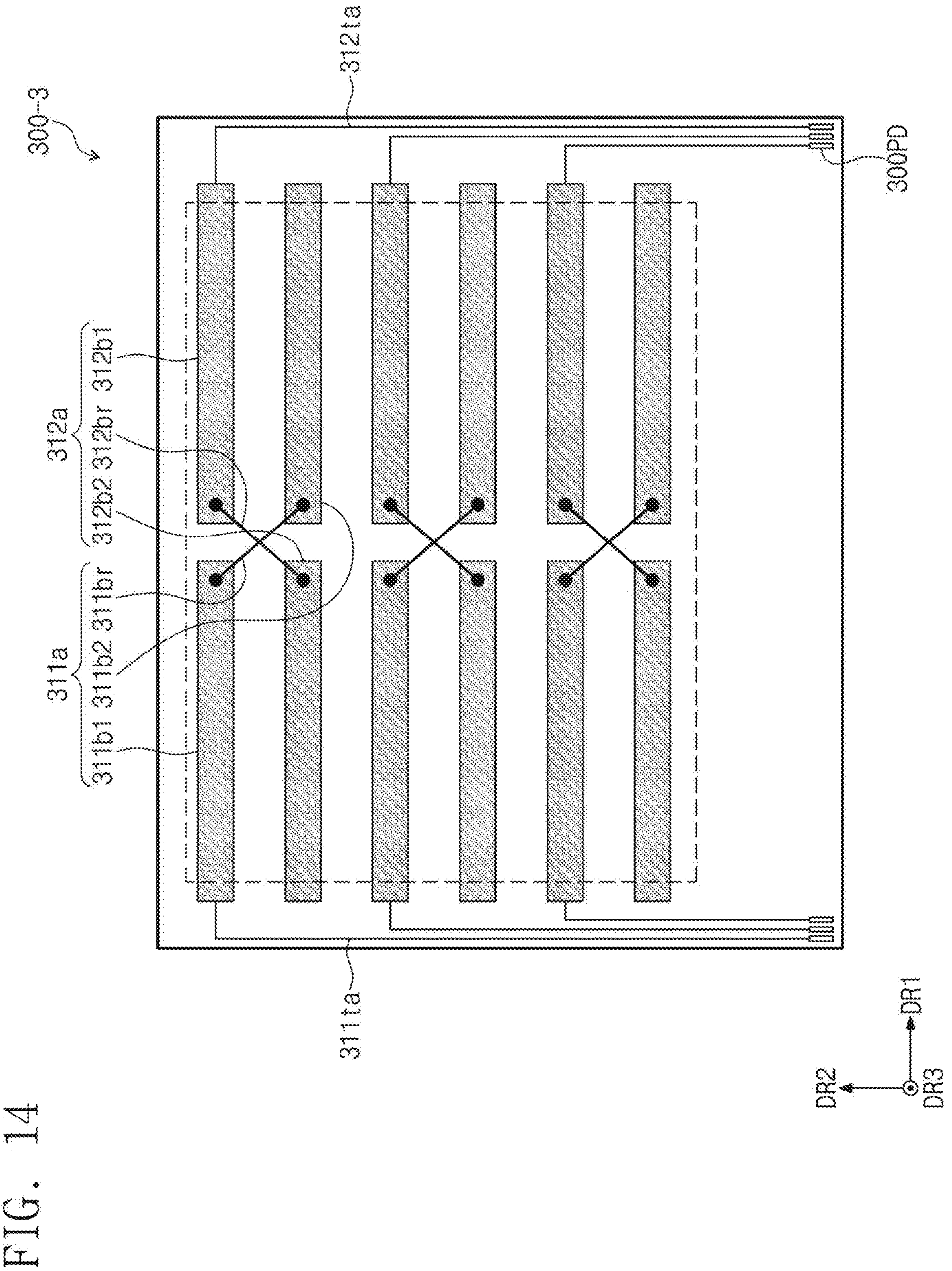
FIG. 14 is a plan view of a lower sensor layer according to an embodiment of the present disclosure.

FIG. 14 is a plan view of a lower sensor layer 300-3 according to an embodiment of the present disclosure.

Referring to FIG. 14, the lower sensor layer 300-3 may include a plurality of pen sensing electrodes 311*a* and 312*a*. The pen sensing electrodes 311*a* and 312*a* may include a first pen sensing electrode 311*a* and a second pen sensing electrode 312*a*.

The first pen sensing electrode 311*a* may include a first electrode portion 311*b*1, a second electrode portion 311*b*2, and a first bridge portion 311*br* connecting the first electrode portion 311*b*1 and the second electrode portion 311*b*2 to each other. The second pen sensing electrode 312*a* may include a third electrode portion 312*b*1, a fourth electrode portion 312*b*2, and a second bridge portion 312*br* connecting the third electrode portion 312*b*1 and the fourth electrode portion 312*b*2 to each other.

When viewed from above the plane (e.g., in a plan view), the first electrode portion 311*b*1 and the third electrode portion 312*b*1 may be spaced apart from each other in the first direction DR1, and the first electrode portion 311*b*1 and the fourth electrode portion 312*b*2 may be spaced apart from each other in the second direction DR2. The third electrode portion 312*b*1 and the second electrode portion 311*b*2 may be spaced apart from each other in the second direction DR2, and the fourth electrode portion 312*b*2 and the second electrode portion 311*b*2 may be spaced apart from each other in the first direction DR1.

The lower sensor layer 300-3 may further include first direction trace lines 311*ta* disposed on the left side of the pen sensing electrodes 311*a* and 312*a*, and second direction trace lines 312*ta* disposed on the right side of the pen sensing electrodes 311*a* and 312*a*. The first electrode portion 311*b*1 may be connected with one corresponding first direction trace line 311*ta*, and the third electrode portion 312*b*1 may be connected with one corresponding second direction trace line 312*ta*.

In an embodiment of the present disclosure, the second pen sensing electrode 312*a* may function as an auxiliary electrode for the first pen sensing electrode 311*a*. For example, the first electrode portion 311*b*1 and the fourth electrode portion 312*b*2 may function as auxiliary electrodes for each other, and the second electrode portion 311*b*2 and the third electrode portion 312*b*1 may function as auxiliary electrodes for each other. Accordingly, the lower sensor layer 300-3 may not include an auxiliary electrode.

Figure 15:
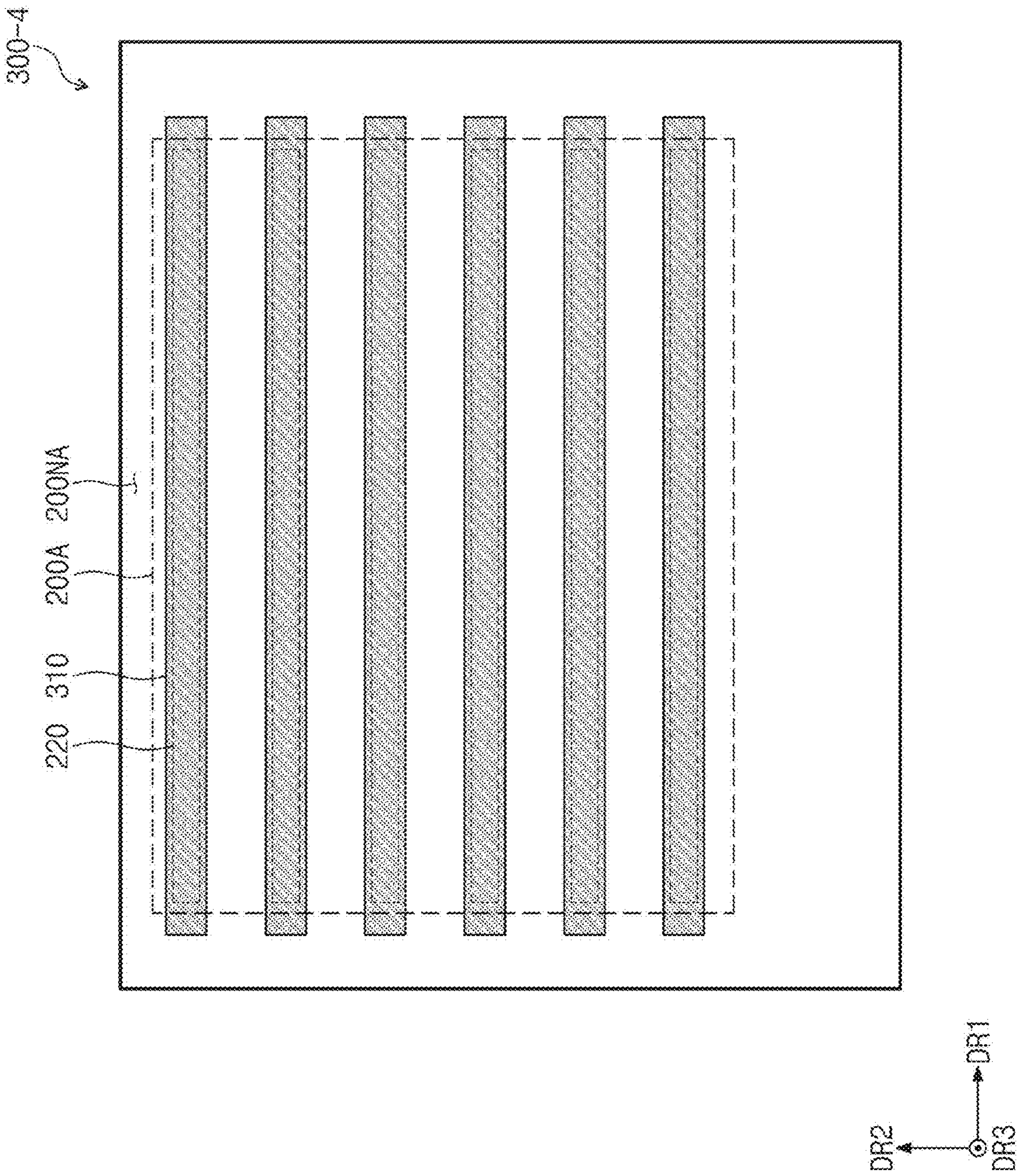
FIG. 15 is a plan view illustrating some components of a sensor layer and some components of a lower sensor layer according to an embodiment of the present disclosure.

FIG. 15 is a plan view illustrating some components of the sensor layer 200 and some components of a lower sensor layer 300-4 according to an embodiment of the present disclosure.

Referring to FIGS. 7A and 15, the plurality of second electrodes 220 may be arranged along the second direction DR2 so as to be spaced apart from one another. In addition, the plurality of pen sensing electrodes 310 may also be arranged along the second direction DR2 so as to be spaced apart from one another.

In an embodiment of the present disclosure, the number of pen sensing electrodes 310 may be greater than or equal to the number of second electrodes 220. For example, the number of pen sensing electrodes 310 may be equal to the number of second electrodes 220. In this case, the positions of the pen sensing electrodes 310 may be aligned with the positions of the second electrodes 220. Accordingly, the pen sensing electrodes 310 and the second electrodes 220 may be aligned with each other when viewed from above the plane (e.g., in a plan view). In an embodiment of the present disclosure, the lengths of the pen sensing electrodes 310 may be greater than or equal to the lengths of the second electrodes 220.

In an embodiment of the present disclosure, in an operation of sensing the coordinates of the second input 3000 (e.g., refer to FIG. 5), the sensor driver 200C may calculate the coordinates based on a signal received from the first electrodes 210 and a signal received from the pen sensing electrodes 310. As another example, because the pen sensing electrodes 310 and the second electrodes 220 are aligned with each other, the sensor driver 200C may calculate the coordinates using a signal received from the first electrodes 210, a signal received from the pen sensing electrodes 310, and a signal received from the second electrodes 220.

Figure 16:
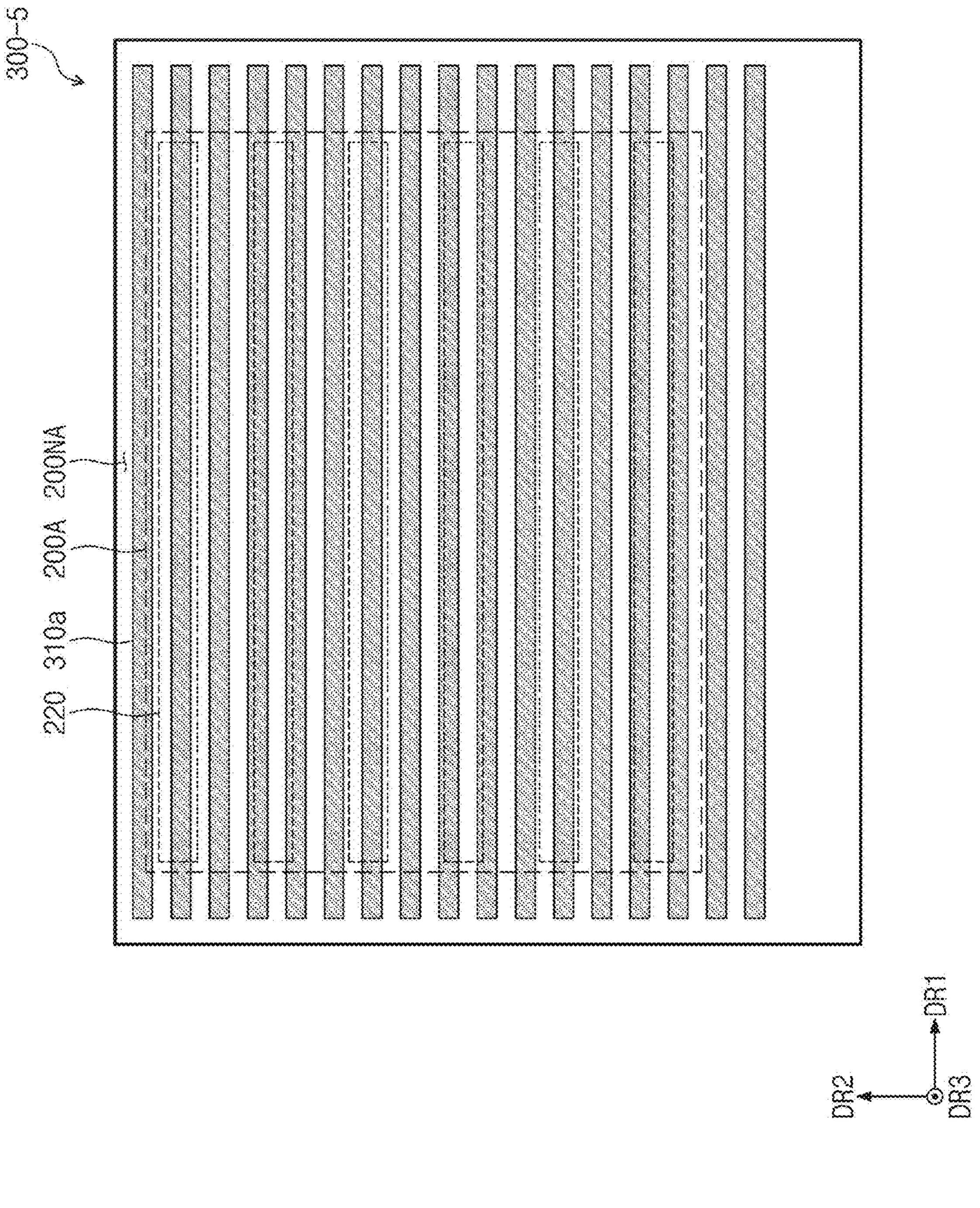
FIG. 16 is a plan view illustrating some components of a sensor layer and some components of a lower sensor layer according to an embodiment of the present disclosure.

FIG. 16 is a plan view illustrating some components of the sensor layer 200 and some components of a lower sensor layer 300-5 according to an embodiment of the present disclosure.

Referring to FIGS. 7A and 16, the plurality of second electrodes 220 may be arranged along the second direction DR2 so as to be spaced apart from one another. In addition, a plurality of pen sensing electrodes 310*a* may also be arranged along the second direction DR2 so as to be spaced apart from one another.

In an embodiment of the present disclosure, the number of pen sensing electrodes 310*a* may be greater than or equal to the number of second electrodes 220. For example, the arrangement of the pen sensing electrodes 310*a* may be designed irrespective of the arrangement of the second electrodes 220.

In an embodiment of the present disclosure, in an operation of sensing the coordinates of the second input 3000 (e.g., refer to FIG. 5), the sensor driver 200C may calculate the coordinates based on a signal received from the first electrodes 210 and a signal received from the pen sensing electrodes 310*a*.

Figure 17:
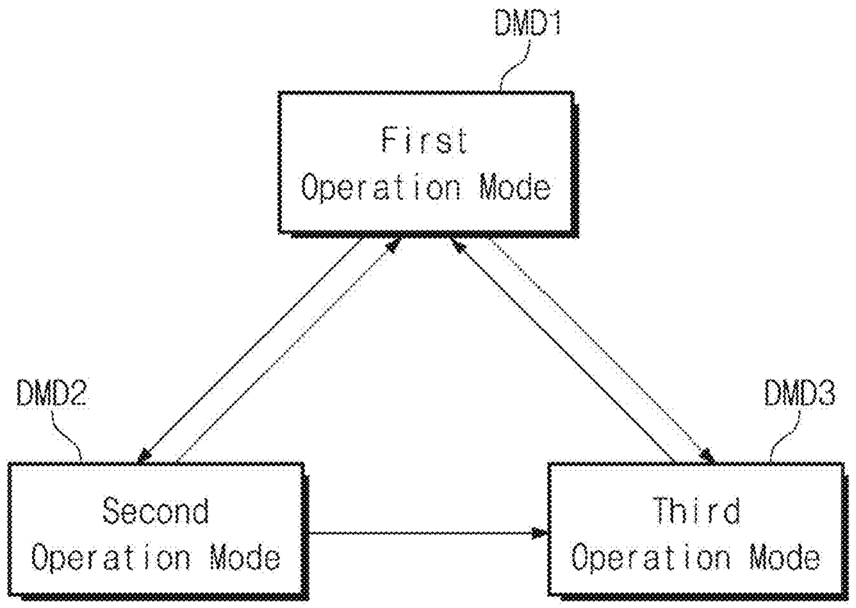
FIG. 17 is a view illustrating an operation of a sensor driver according to an embodiment of the present disclosure.

FIG. 17 is a view illustrating an operation of the sensor driver 200C according to an embodiment of the present disclosure.

Referring to FIGS. 5 and 17, the sensor driver 200C may be selectively driven in one of a first operation mode DMD1, a second operation mode DMD2, and a third operation mode DMD3.

The first operation mode DMD1 may be referred to as a touch and pen standby mode, the second operation mode DMD2 may be referred to as a touch activation and pen standby mode, and the third operation mode DMD3 may be referred to as a pen activation mode. The first operation mode DMD1 may be a mode in which the sensor driver 200C waits for the first input 2000 and the second input 3000. The second operation mode DMD2 may be a mode in which the sensor driver 200C senses the first input 2000, and waits for the second input 3000. The third operation mode DMD3 may be a mode in which the sensor driver 200C senses the second input 3000.

In an embodiment of the present disclosure, the sensor driver 200C may first be driven in the first operation mode DMD1. When the first input 2000 is sensed in the first operation mode DMD1, the sensor driver 200C may be switched (e.g., may be changed) to the second operation mode DMD2. As another example, when the second input 3000 is sensed in the first operation mode DMD1, the sensor driver 200C may be switched (e.g., may be changed) to the third operation mode DMD3.

In an embodiment of the present disclosure, when the second input 3000 is sensed in the second operation mode DMD2, the sensor driver 200C may be switched to the third operation mode DMD3. When the first input 2000 is released (e.g., is not sensed) in the second operation mode DMD2, the sensor driver 200C may be switched to the first operation mode DMD1. When the second input 3000 is released (e.g., is not sensed) in the third operation mode DMD3, the sensor driver 200C may be switched to the first operation mode DMD1.

Figure 18:
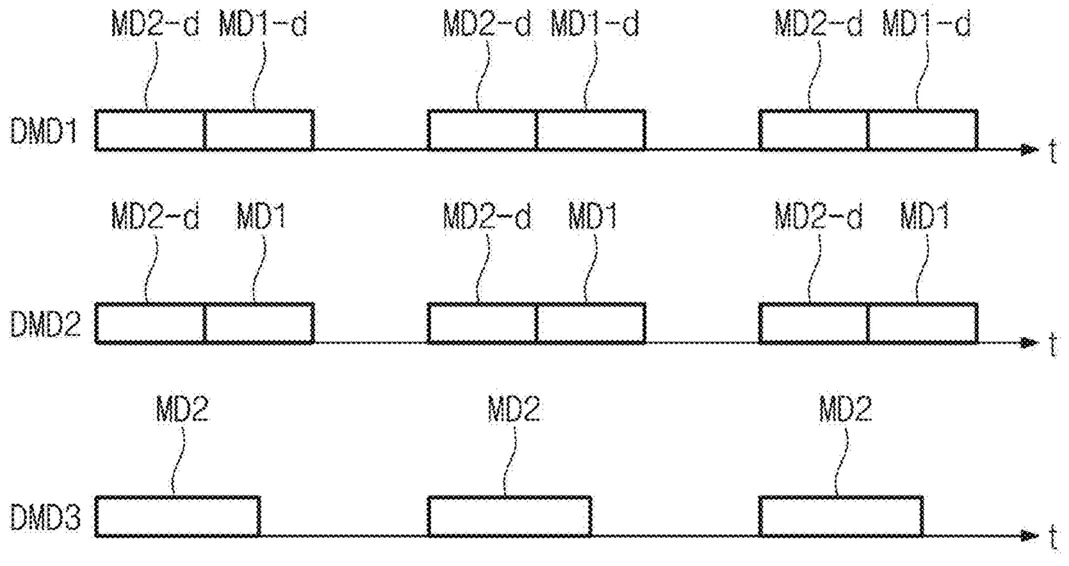
FIG. 18 is a view illustrating an operation of the sensor driver according to an embodiment of the present disclosure.

FIG. 18 is a view illustrating an operation of the sensor driver 200C according to an embodiment of the present disclosure.

Referring to FIGS. 5, 17, and 18, operations in the first to third operation modes DMD1, DMD2, and DMD3 are illustrated in the order of time (t).

In the first operation mode DMD1, the sensor driver 200C may be repeatedly driven in a second mode MD2-*d* and a first mode MD1-*d*. During the second mode MD2-*d*, the sensor layer 200 may be scan-driven to detect the second input 3000. During the first mode MD1-*d*, the sensor layer 200 may be scan-driven to detect the first input 2000. Although FIG. 18 illustrates an example in which the sensor driver 200C operates in the first mode MD1-*d* continuously after the second mode MD2-*d*, the sequence is not limited thereto.

In the second operation mode DMD2, the sensor driver 200C may be repeatedly driven in a second mode MD2-*d* and a first mode MD1. During the second mode MD2-*d*, the sensor layer 200 and the lower sensor layer 300 may be scan-driven to detect the second input 3000. During the first mode MD1, the sensor layer 200 may be scan-driven to detect the coordinates by the first input 2000.

In the third operation mode DMD3, the sensor driver 200C may be driven in a second mode MD2. During the second mode MD2, the sensor layer 200 and the lower sensor layer 300 may be scan-driven to detect the coordinates by the second input 3000. In the third operation mode DMD3, the sensor driver 200C may not operate in the first mode MD1-D or MD1 until the second input 3000 is released (e.g., is not sensed).

Figure 19:
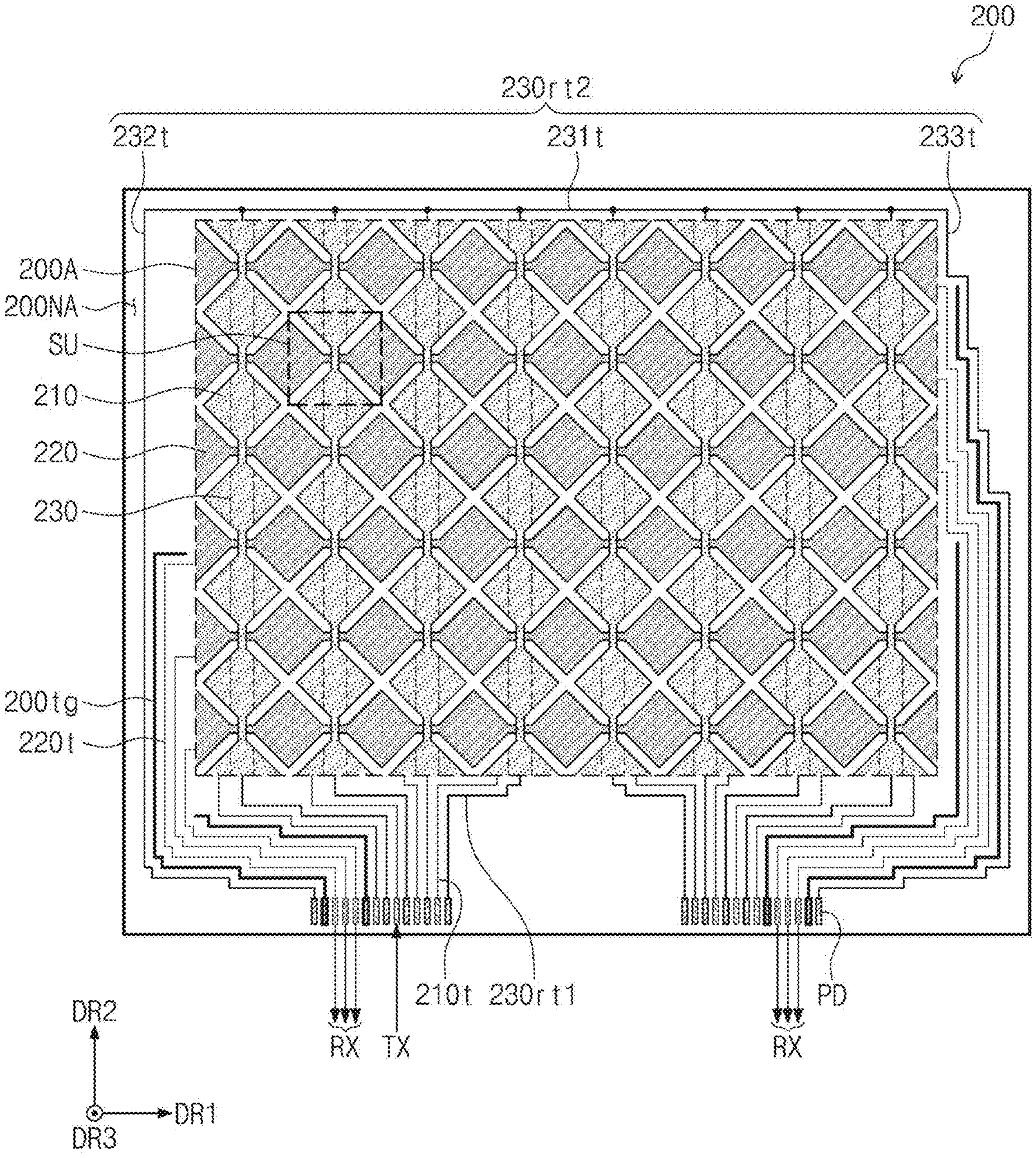
FIG. 19 is a view illustrating a first mode according to an embodiment of the present disclosure.

FIG. 19 is a view illustrating the first mode according to an embodiment of the present disclosure.

Referring to FIGS. 5, 18, and 19, the first mode MD1-*d* of the first operation mode DMD1 and the first mode MD1 of the second operation mode DMD2 may include a mutual-capacitance detection mode. FIG. 19 is a view illustrating the mutual-capacitance detection mode in the first mode MD1-*d* of the first operation mode DMD1 and the first mode MD1 of the second operation mode DMD2.

In the mutual-capacitance detection mode, the sensor driver 200C may sequentially provide a transmission signal Tx to the first electrodes 210, and may detect the coordinates for the first input 2000 using a reception signal Rx detected through the second electrodes 220. For example, the sensor driver 200C may sense a change in the mutual capacitance between the first electrodes 210 and the second electrodes 220, and may calculate input coordinates.

FIG. 19 illustrates an example in which the transmission signal TX is provided to one first electrode 210 and the reception signal RX is output from the second electrodes 220. The sensor driver 200C may sense a change in the capacitance between the first electrode 210 and each of the second electrodes 220, and may detect the input coordinates for the first input 2000.

In an embodiment of the present disclosure, at least one of the first mode MD1-*d* of the first operation mode DMD1 or the first mode MD1 of the second operation mode DMD2 may further include a self-capacitance detection mode. In the self-capacitance detection mode, the sensor driver 200C may calculate input coordinates by outputting driving signals to the first electrodes 210 and the second electrodes 220, and sensing a change in the capacitance of each of the first electrodes 210 and the second electrodes 220. In the self-capacitance detection mode, the third electrodes 230 may be grounded, and a signal that is the same as the signal provided to adjacent trace lines may be provided to the guard lines 200*tg*. Accordingly, a parasitic capacitance that may be formed between the trace lines may be reduced or eliminated by the guard lines 200*tg*.

In the first mode MD1-*d* of the first operation mode DMD1 and the first mode MD1 of the second operation mode DMD2, the third electrodes 230 and the guard lines 200*tg* may all be grounded. Accordingly, a touch noise may be prevented or substantially prevented from being introduced through the third electrodes 230.

Figure 20:
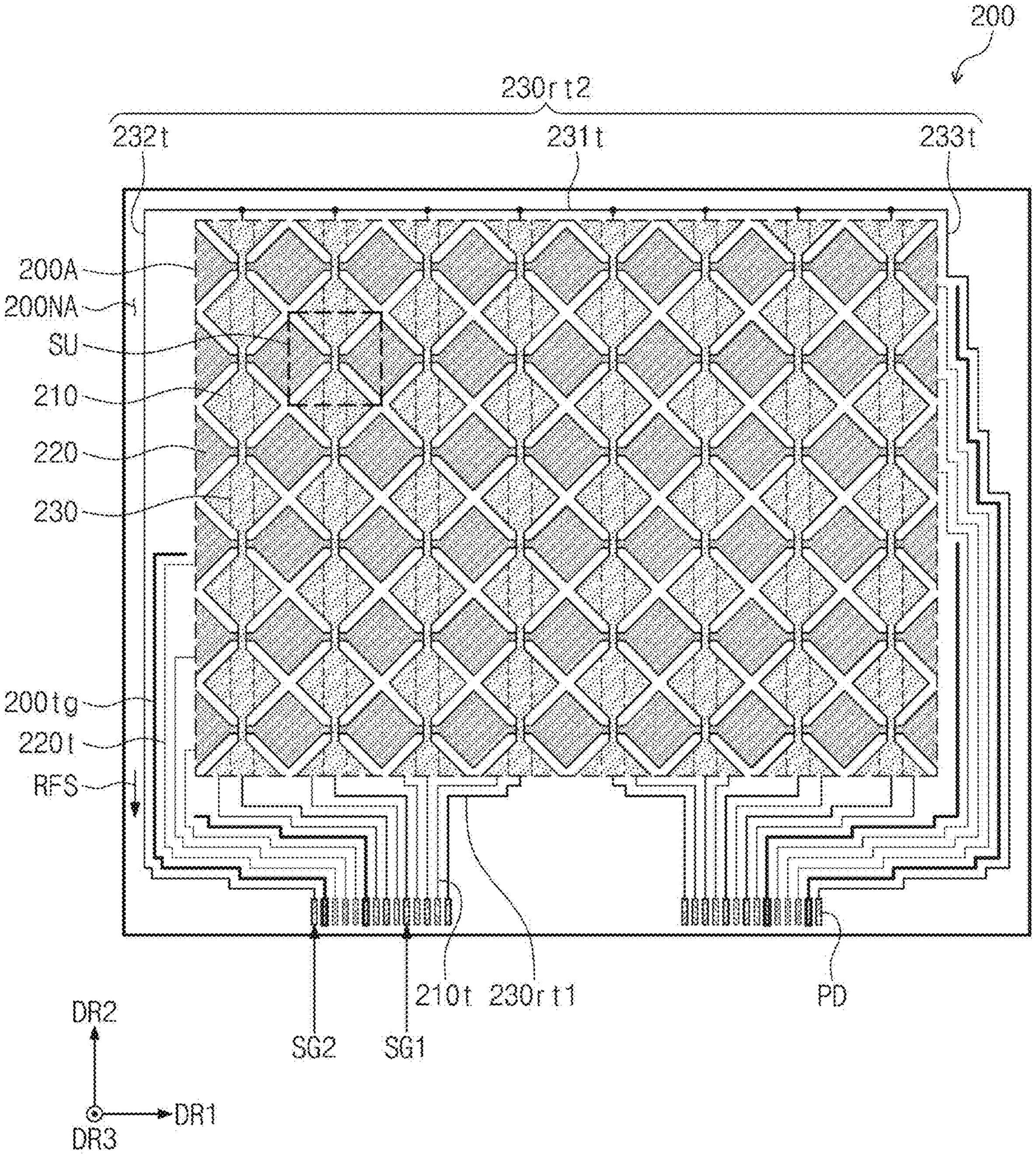
FIG. 20 is a view illustrating a second mode according to an embodiment of the present disclosure.
Figure 21A:
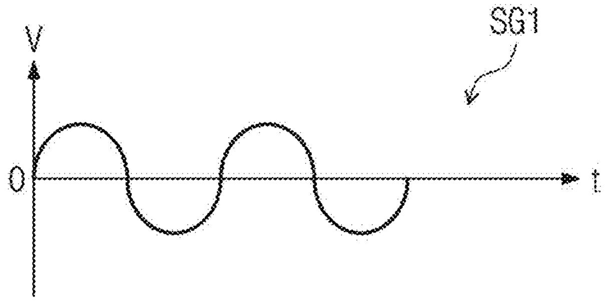
FIG. 21A is a graph depicting a waveform of a first signal according to an embodiment of the present disclosure.
Figure 21B:
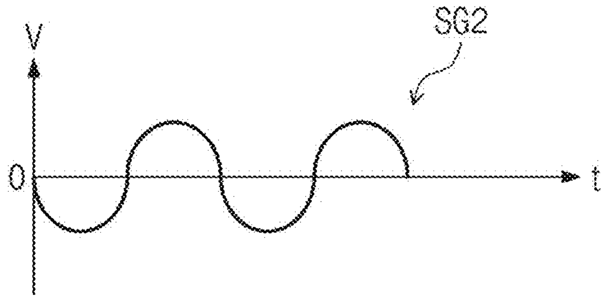
FIG. 21B is a graph depicting a waveform of a second signal according to an embodiment of the present disclosure.

FIG. 20 is a view illustrating the second mode according to an embodiment of the present disclosure. FIG. 21A is a graph depicting a waveform of a first signal SG1 according to an embodiment of the present disclosure. FIG. 21B is a graph depicting a waveform of a second signal SG2 according to an embodiment of the present disclosure.

Referring to FIGS. 20, 21A, and 21B, the second mode MD2 may include a charging driving mode. The charging driving mode may include a searching charging driving mode and a tracking charging driving mode.

The searching charging driving mode may be a driving mode before the position of the pen PN is sensed. Accordingly, the first signal SG1 or the second signal SG2 may be provided to all channels included in the sensor layer 200. In other words, in the searching charging driving mode, the entire area of the sensor layer 200 may be scanned. When the pen PN (e.g., refer to FIG. 5) is sensed in the searching charging driving mode, the sensor layer 200 may be driven in the tracking charging driving mode. For example, in the tracking charging driving mode, the sensor driver 200C may sequentially output the first signal SG1 and the second signal SG2 to an area overlapping with a point where the pen PN is sensed, rather than to the entire sensor layer 200.

In the charging driving mode, the sensor driver 200C may apply the first signal SG1 to one pad, and may apply the second signal SG2 to another pad. The second signal SG2 may be an inverse signal of the first signal SG1. For example, the first signal SG1 may be a sinusoidal signal.

Because the first signal SG1 and the second signal SG2 are applied to at least two pads, a current RFS may have a current path to flow through one pad to another pad. In addition, because the first signal SG1 and the second signal SG2 are sinusoidal signals having an inverse phase relationship, the direction of the current RFS may be periodically varied. In an embodiment of the present disclosure, the first signal SG1 and the second signal SG2 may be square-wave signals having an inverse phase relationship.

When the first signal SG1 and the second signal SG2 have an inverse phase relationship, a noise caused in the display layer 100 (e.g., refer to FIG. 4) by the first signal SG1 may be cancelled out by noise caused by the second signal SG2.

Accordingly, a flicker phenomenon may not occur in the display layer 100, and the display quality of the display layer 100 may be improved.

In an embodiment of the present disclosure, the first signal SG1 may be a sinusoidal signal. However, the present disclosure is not limited thereto, and the first signal SG1 may be a square-wave signal. The second signal SG2 may have a constant voltage (e.g., a certain or predetermined constant voltage). For example, the second signal SG2 may be a ground voltage. In other words, a pad to which the second signal SG2 is applied may be regarded as being grounded. Even in this case, the current RFS may flow from one pad to another pad. In addition, even though the other pad is grounded, the direction of the current RFS may be periodically varied, because the first signal SG1 is a sinusoidal signal or a square-wave signal.

Referring to FIG. 20, the first signal SG1 is provided to one pad connected with one first auxiliary trace line 230*rt*1, and the second signal SG2 is provided to one pad connected with the second auxiliary trace line 230*rt*2. The current RFS may flow along the current path defined by the one first auxiliary trace line 230*rt*1, one third electrode 230 connected to the one first auxiliary trace line 230*rt*1, and a portion of the second auxiliary trace line 230*rt*2. The current path may have a coil shape. Accordingly, in the charging driving mode of the second mode, the resonance circuit of the pen PN may be charged by a magnetic field formed by the current path.

According to some embodiments of the present disclosure, a current path having a loop coil pattern may be implemented by the components included in the sensor layer 200. Accordingly, the electronic device 1000 (e.g., refer to FIG. 1A) may charge the pen PN using the sensor layer 200. Thus, a component having a coil for charging the pen PN may not need to be separately added, so that an increase in the thickness and weight of the electronic device 1000 and a decrease in the flexibility of the electronic device 1000 due to the addition of the component may not occur.

In the charging driving mode, the first electrodes 210, the second electrodes 220, and the guard lines 200*tg* may be grounded or electrically floated, or may receive a constant or substantially constant voltage. In more detail, the first electrodes 210, the second electrodes 220, and the guard lines 200*tg* may be floated. In this case, the current RFS may not flow to the first electrodes 210, the second electrodes 220, and the guard lines 200*tg*.

Figure 22A:
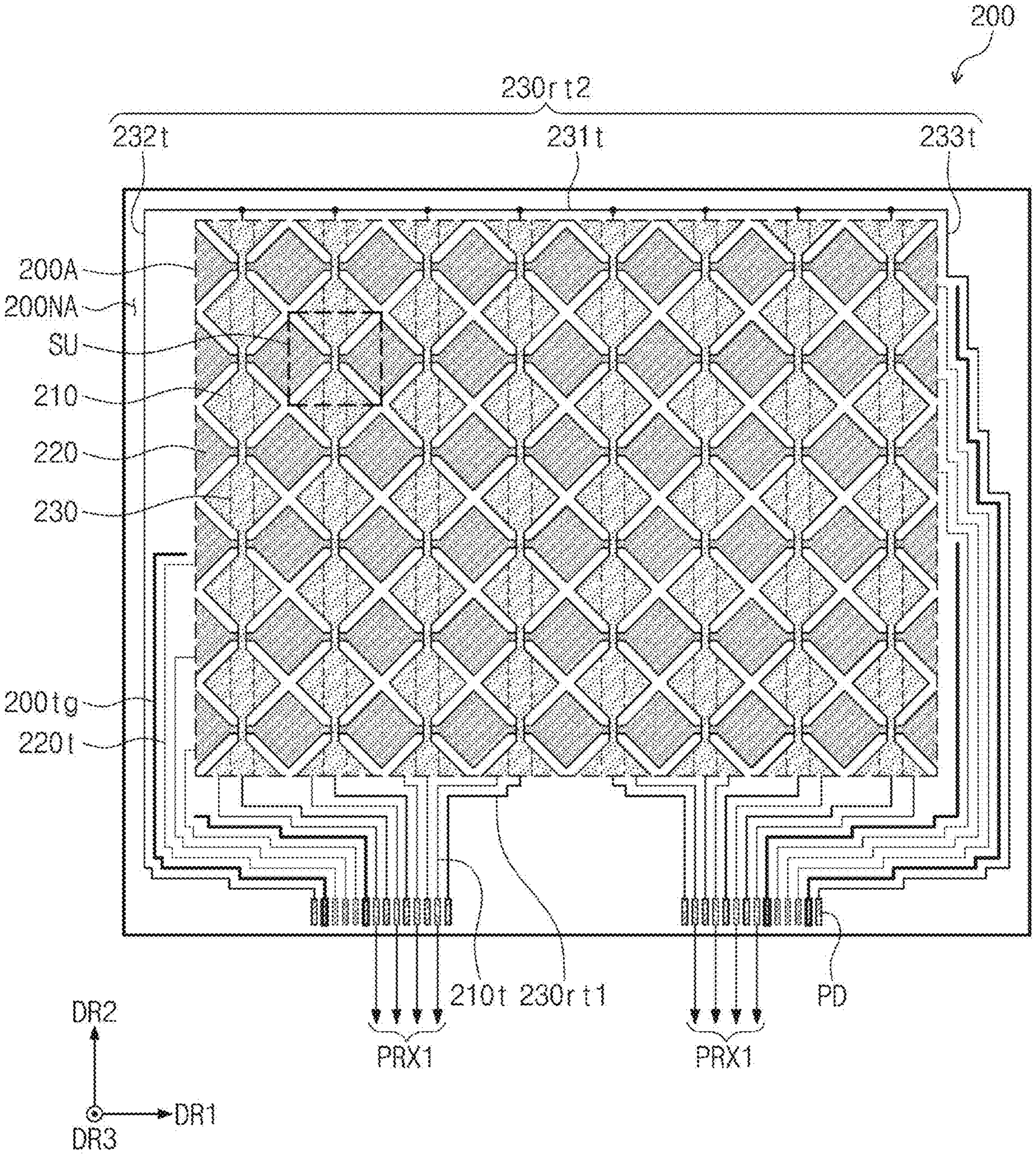
FIG. 22A is a view illustrating the second mode according to an embodiment of the present disclosure.
Figure 22B:
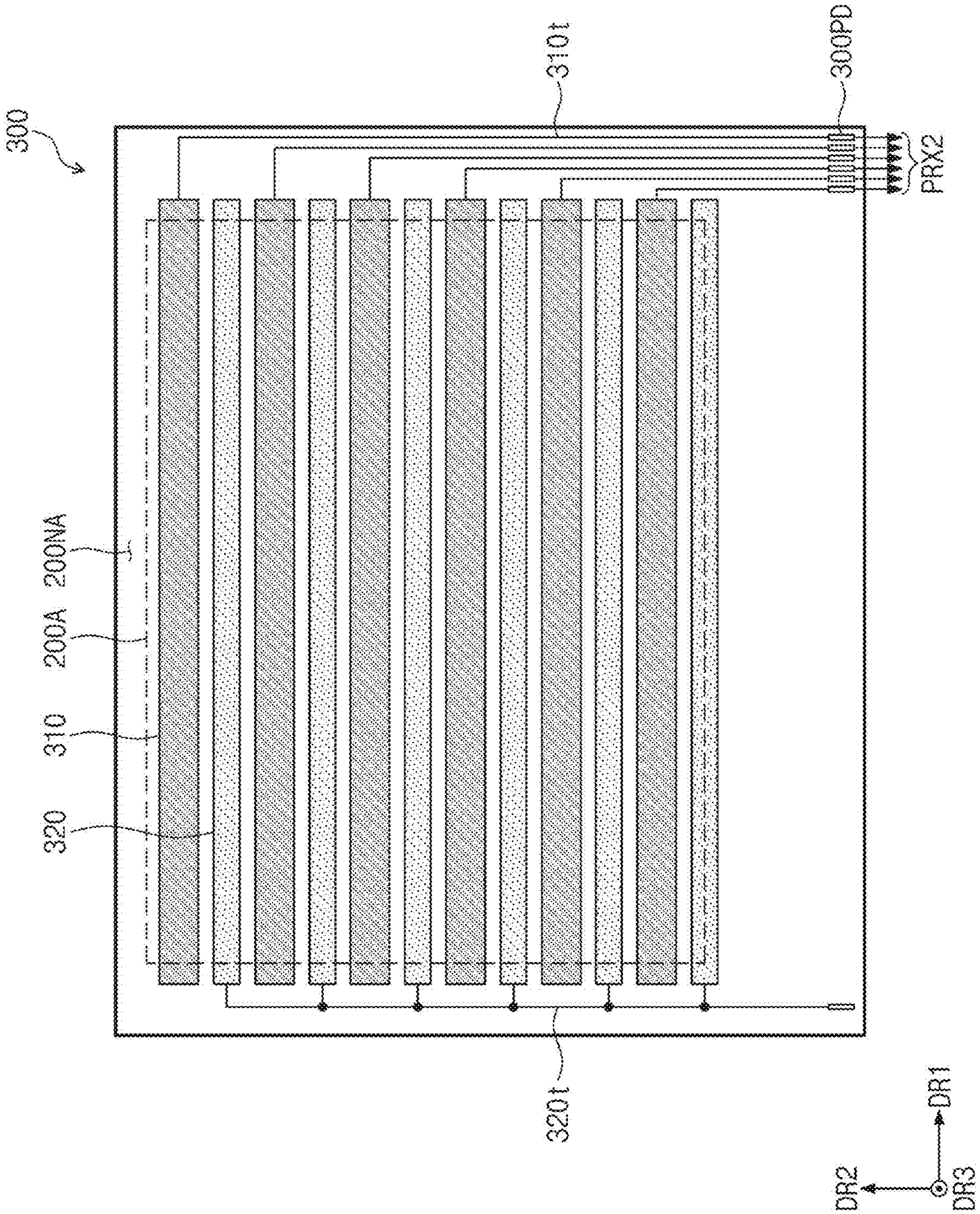
FIG. 22B is a view illustrating the second mode according to an embodiment of the present disclosure.
Figure 23:
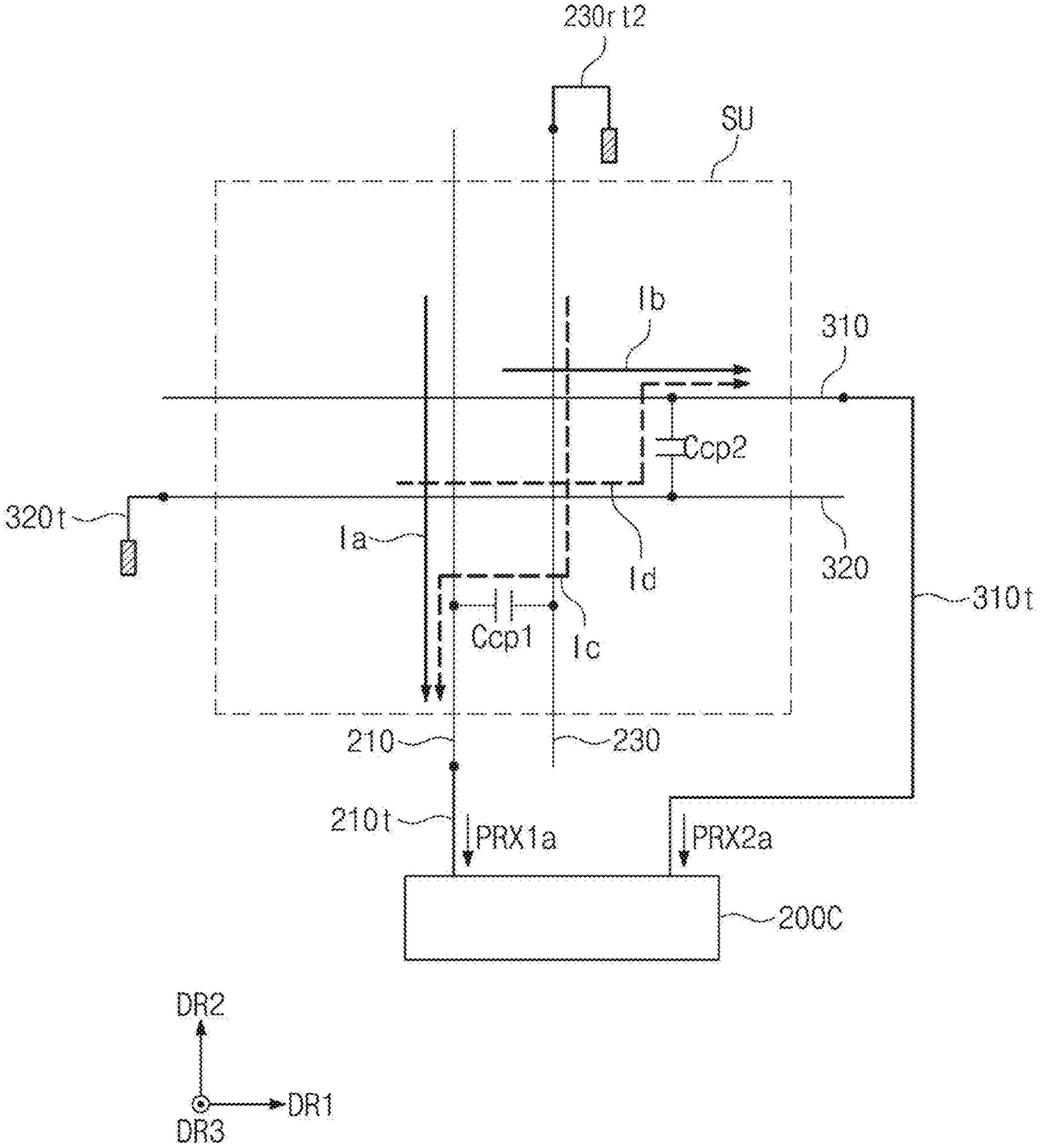
FIG. 23 is a view illustrating the second mode based on a sensor layer and a lower sensor layer according to an embodiment of the present disclosure.

FIG. 22A is a view illustrating the second mode according to an embodiment of the present disclosure. FIG. 22B is a view illustrating the second mode according to an embodiment of the present disclosure. FIG. 23 is a view illustrating the second mode based on the sensor layer 200 and the lower sensor layer 300 according to an embodiment of the present disclosure.

Referring to FIGS. 22A, 22B, and 23, the second mode may include a charging driving mode and a pen sensing driving mode. FIGS. 22A, 22B, and 23 are views illustrating the pen sensing driving mode. In FIG. 23, one sensing unit SU through which first to fourth induced currents Ia, Ib, Ic, and Id generated by the pen PN flow is illustrated.

In an embodiment of the present disclosure, in the pen sensing driving mode, the sensor driver 200C may receive first reception signals PRX1 from the first electrodes 210, and may receive second reception signals PRX2 from the pen sensing electrodes 310.

The routing directions of one electrode and another electrode that overlap with each other in each of the sensor layer 200 and the lower sensor layer 300 may be different from each other. For example, the routing direction of the first electrode 210 and the routing direction of the third electrode 230 may be different from each other. In addition, the routing direction of the pen sensing electrode 310 and the routing direction of the auxiliary electrode 320 may be different from each other. For example, in FIG. 23, the first electrode 210 and the first trace line 210*t* may be connected on the lower side of the sensing unit SU, and the third electrode 230 and the second auxiliary trace line 230*rt*2 may be connected on the upper side of the sensing unit SU. The pen sensing electrode 310 and the trace line 310*t* may be connected on the right side of the sensing unit SU, and the auxiliary electrode 320 and the auxiliary trace line 320*t* may be connected on the left side of the sensing unit SU.

The RLC resonance circuit of the pen PN may emit a magnetic field having a resonant frequency while discharging charged charges. Due to the magnetic field provided by the pen PN, the first induced current Ia may be generated in the first electrode 210, and the second induced current Ib may be generated in the pen sensing electrode 310. In addition, the third induced current Ic may be generated in the third electrode 230, and the fourth induced current Id may be generated in the auxiliary electrode 320.

A first coupling capacitance Ccp1 may be formed between the third electrode 230 and the first electrode 210, and a second coupling capacitance Ccp2 may be formed between the auxiliary electrode 320 and the pen sensing electrode 310. The third induced current Ic may be transferred to the first electrode 210 through the first coupling capacitance Ccp1, and the fourth induced current Id may be transferred to the pen sensing electrode 310 through the second coupling capacitance Ccp2.

The sensor driver 200*c* may receive a first reception signal PRX1*a* based on the first induced current Ia and the third induced current Ic from the first electrode 210, and may receive a second reception signal PRX2*a* based on the second induced current Ib and the fourth induced current Id from the pen sensing electrode 310. The sensor driver 200C may detect the input coordinates of the pen PN, based on the first reception signal PRX1*a* and the second reception signal PRX2*a*.

When the sensor driver 200C receives the first reception signal PRX1*a* from the first electrode 210 and receives the second reception signal PRX2*a* from the pen sensing electrode 310, first ends of the third electrode 230 and the auxiliary electrode 320 may all be floated. Accordingly, a compensation of a sensing signal may be maximized or improved by the coupling between the first electrode 210 and the third electrode 230 and the coupling between the pen sensing electrode 310 and the auxiliary electrode 320.

In addition, second ends of the third electrode 230 and the auxiliary electrode 320 may be grounded or floated. Accordingly, the third induced current Ic and the fourth induced current Id may be sufficiently transferred to the first electrode 210 and the pen sensing electrode 310 by the coupling between the first electrode 210 and the third electrode 230 and the coupling between the pen sensing electrode 310 and the auxiliary electrode 320. When the first and second ends of the third electrode 230 and the auxiliary electrode 320 are all floated, even though charges are charged to the third electrode 230 in the charging driving mode, the potential may not rapidly change during the pen sensing operation because of the floating. Accordingly, a noise that may be caused by a change in the driving mode may be minimized or reduced.

According to an embodiment of the present disclosure, the sensor driver 200C may calculate the coordinates for the first input 2000 (e.g., refer to FIG. 5), which causes a change in a capacitance, using the first electrodes 210 and the second electrodes 220, and may calculate the coordinates for the second input 3000, which emits a magnetic field, using the first electrodes 210 and the pen sensing electrodes 310.

Figure 24:
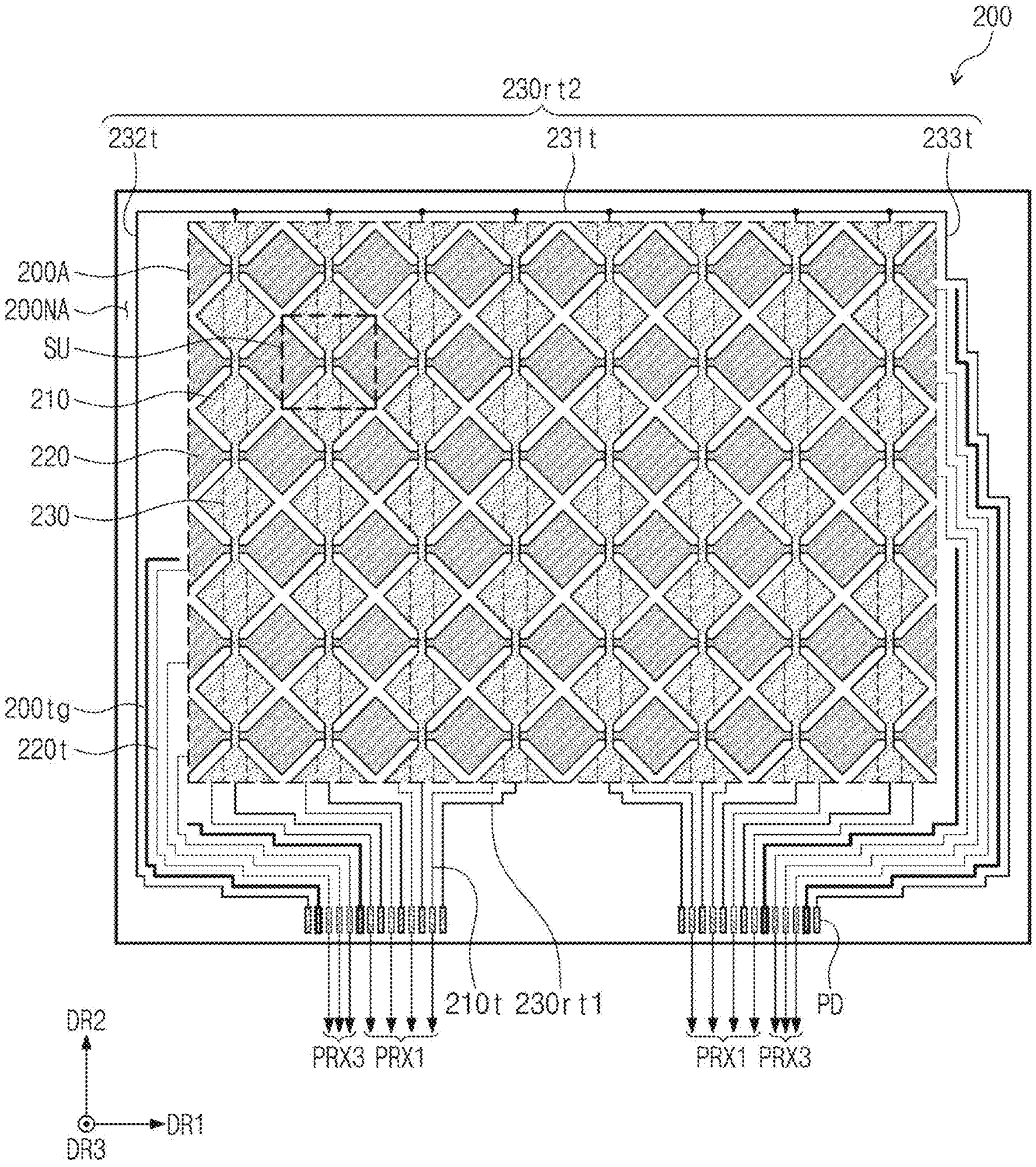
FIG. 24 is a view illustrating the second mode according to an embodiment of the present disclosure.
Figure 25:
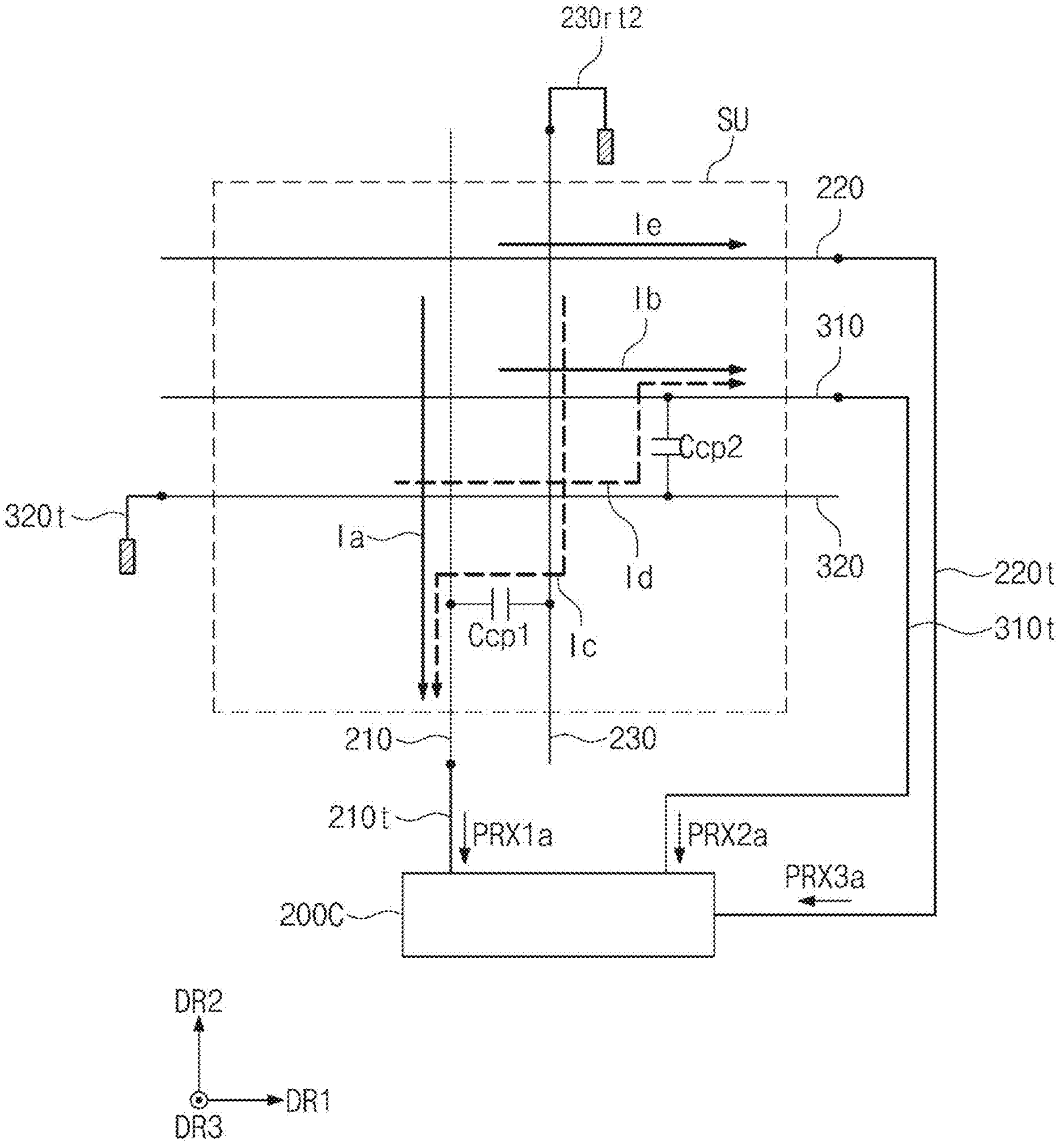
FIG. 25 is a view illustrating the second mode based on the sensor layer and the lower sensor layer according to an embodiment of the present disclosure.

FIG. 24 is a view illustrating the second mode according to an embodiment of the present disclosure. FIG. 25 is a view illustrating the second mode based on the sensor layer 200 and the lower sensor layer 300 according to an embodiment of the present disclosure.

Referring to FIGS. 22B, 24, and 25, in the pen sensing driving mode, the sensor driver 200C may receive first reception signals PRX1 from the first electrodes 210, may receive second reception signals PRX2 from the pen sensing electrodes 310, and may receive third reception signals PRX3 from the second electrodes 220.

The RLC resonance circuit of the pen PN may emit a magnetic field having a resonant frequency while discharging charged charges. Due to the magnetic field provided by the pen PN, the first induced current Ia may be generated in the first electrode 210, and the second induced current Ib may be generated in the pen sensing electrode 310. Furthermore, the third induced current Ic may be generated in the third electrode 230, and the fourth induced current Id may be generated in the auxiliary electrode 320. In addition, the fifth induced current Ie may be generated in the second electrode 220.

According to an embodiment of the present disclosure, the second electrodes 220 and the pen sensing electrodes 310 may be aligned with each other. In this case, the sensor driver 200C may calculate the coordinates for an input of the pen PN by performing an operation on a third reception signal PRX3*a* based on the fifth induced current Ie and a second reception signal PRX2*a* based on the second induced current Ib and the fourth induced current Id. Various suitable methods, such as a method of adding the second reception signal PRX2*a* and the third reception signal PRX3*a*, a method of assigning a certain weighting value to at least one of the second reception signal PRX2*a* or the third reception signal PRX3*a* and then adding them, and/or the like, may be applied to the operation.

As described above, the sensor layer may be disposed on the upper surface of the display layer, and the lower sensor layer may be disposed under the upper surface of the display layer. The sensor layer may include the first to third electrodes, and the lower sensor layer may include the pen sensing electrodes. The sensor driver may calculate the coordinates for the first input causing a change in a capacitance using the first electrodes and the second electrodes, and may calculate the coordinates for the second input emitting a magnetic field using the first electrodes and the pen sensing electrodes. In this case, the pen sensing electrodes may be spaced apart from the first to third electrodes by a certain gap or more, so that the coupling capacitance between the pen sensing electrodes and each of the first to third electrodes may be decreased. As a result, a phenomenon in which charges that may have to escape to the ground are reintroduced into the second electrode via the pen sensing electrodes may be reduced or eliminated. Accordingly, the touch performance of the electronic device may be improved. In addition, because the pen sensing electrodes may be provided in a separate layer rather than in the sensor layer, a degree of freedom in designing the shape of the pen sensing electrodes may be further improved.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising:

a display layer;

a sensor layer above an upper surface of the display layer; and a plurality of pen sensing electrodes under the upper surface of the display layer, wherein the sensor layer comprises:

a plurality of first electrodes along a first direction;

a plurality of second electrodes along a second direction crossing the first direction, the plurality of second electrodes crossing the plurality of first electrodes; and a plurality of third electrodes along the first direction, and overlapping with the plurality of first electrodes.

2. The electronic device of claim 1, wherein each of the plurality of pen sensing electrodes extends in the first direction, and the plurality of pen sensing electrodes are located along the second direction.

3. The electronic device of claim 1, further comprising:

a plurality of auxiliary electrodes adjacent to the plurality of pen sensing electrodes.

4. The electronic device of claim 3, wherein the plurality of pen sensing electrodes and the plurality of auxiliary electrodes are located at the same layer as each other.

5. The electronic device of claim 3, wherein the plurality of pen sensing electrodes overlap with the plurality of auxiliary electrodes in a plan view.

6. The electronic device of claim 1, wherein the plurality of pen sensing electrodes comprises a first pen sensing electrode, a second pen sensing electrode, and a third pen sensing electrode that are sequentially located along the second direction, and wherein a routing direction of the first pen sensing electrode is the same as a routing direction of the third pen sensing electrode, and a routing direction of the second pen sensing electrode is different from the routing direction of the first pen sensing electrode.

7. The electronic device of claim 1, wherein the plurality of pen sensing electrodes comprises a first pen sensing electrode and a second pen sensing electrode, wherein the first pen sensing electrode comprises a first electrode portion, a second electrode portion, and a first bridge portion connecting the first electrode portion and the second electrode portion to each other, wherein the second pen sensing electrode comprises a third electrode portion, a fourth electrode portion, and a second bridge portion connecting the third electrode portion and the fourth electrode portion to each other, wherein the first electrode portion and the third electrode portion are spaced from each other in the first direction, wherein the first electrode portion and the fourth electrode portion are spaced from each other in the second direction, wherein the third electrode portion and the second electrode portion are spaced from each other in the second direction, and wherein the fourth electrode portion and the second electrode portion are spaced from each other in the first direction.

8. The electronic device of claim 1, wherein a number of the plurality of pen sensing electrodes is greater than or equal to a number of the plurality of second electrodes.

9. The electronic device of claim 1, wherein the plurality of pen sensing electrodes are aligned with the plurality of second electrodes in a plan view.

10. The electronic device of claim 1, wherein the display layer comprises a base layer, a circuit layer on the base layer, a light emitting element layer on the circuit layer, and an encapsulation layer on the light emitting element layer, and wherein the upper surface of the display layer is an upper surface of the encapsulation layer.

11. The electronic device of claim 10, wherein the plurality of pen sensing electrodes are located on a lower surface of the base layer.

12. The electronic device of claim 11, wherein the lower surface of the base layer has a depressed shape corresponding to a location of the plurality of pen sensing electrodes.

13. The electronic device of claim 10, wherein the base layer comprises a first sub-base layer, and a second sub-base layer on the first sub-base layer, and wherein the plurality of pen sensing electrodes are located between the first sub-base layer and the second sub-base layer.

14. The electronic device of claim 10, wherein the plurality of pen sensing electrodes are located in the circuit layer.

15. The electronic device of claim 1, further comprising:

a plurality of trace lines electrically connected with the plurality of pen sensing electrodes in a one-to-one correspondence, wherein routing directions of the plurality of trace lines are the same as each other.

16. The electronic device of claim 1, wherein each of the plurality of first electrodes, the plurality of second electrodes, and the plurality of third electrodes has a mesh structure having a plurality of openings, and wherein the plurality of pen sensing electrodes have a solid structure that does not have a plurality of openings.

17. The electronic device of claim 1, wherein the sensor layer further comprises a plurality of trace lines electrically connected to the plurality of first electrodes, the plurality of second electrodes, and the plurality of third electrodes, wherein the sensor layer comprises a sensing area in which the plurality of first electrodes, the plurality of second electrodes, and the plurality of third electrodes are located, and a peripheral area adjacent to the sensing area, wherein the peripheral area comprises a trace area in which the plurality of trace lines are located, and an edge area adjacent to the trace area, and wherein the plurality of pen sensing electrodes overlap with the sensing area.

18. The electronic device of claim 17, wherein the plurality of pen sensing electrodes overlap with the trace area.

19. The electronic device of claim 17, wherein the plurality of pen sensing electrodes overlap with the trace area and the edge area.

20. The electronic device of claim 1, further comprising:

a sensor driver configured to drive the sensor layer, and selectively operate in a first mode to sense a touch input and in a second mode to sense a pen input, wherein the second mode comprises a pen sensing driving mode, and wherein in the pen sensing driving mode, the sensor driver is configured to receive a first reception signal based on a first induced current flowing through each of the plurality of first electrodes, and receive a second reception signal based on a second induced current flowing through each of the plurality of pen sensing electrodes.

21. The electronic device of claim 20, wherein in the pen sensing driving mode, the sensor driver is configured to additionally receive a third reception signal based on a third induced current flowing through each of the plurality of second electrodes.

22. The electronic device of claim 20, wherein the plurality of third electrodes is configured to be grounded in the first mode, and wherein the second mode further comprises a charging driving mode, and the plurality of first electrodes and the plurality of second electrodes are configured to be floated in the charging driving mode.

23. An electronic device comprising:

a display layer;

a plurality of first electrodes along a first direction above an upper surface of the display layer;

a plurality of second electrodes along a second direction crossing the first direction above the upper surface of the display layer;

a plurality of pen sensing electrodes along the second direction under the upper surface of the display layer; and a sensor driver configured to drive the plurality of first electrodes, the plurality of second electrodes, and the plurality of pen sensing electrodes, and selectively operate in a first mode to sense a touch input and in a second mode to sense a pen input, wherein the second mode comprises a pen sensing driving mode, and wherein in the pen sensing driving mode, the sensor driver is configured to receive a first reception signal based on a first induced current flowing through each of the plurality of first electrodes, and receive a second reception signal based on a second induced current flowing through each of the plurality of pen sensing electrodes.

24. The electronic device of claim 23, wherein in the pen sensing driving mode, the sensor driver is configured to additionally receive a third reception signal based on a third induced current flowing through each of the plurality of second electrodes.

25. The electronic device of claim 23, further comprising:

a plurality of third electrodes on the upper surface of the display layer along the first direction, wherein the plurality of third electrodes are configured to be grounded in the first mode, wherein in the pen sensing driving mode, the first reception signal is a signal based on the first induced current and an auxiliary induced current flowing from the plurality of third electrodes toward the plurality of first electrodes, and wherein the second mode further comprises a charging driving mode, and the plurality of first electrodes and the plurality of second electrodes are configured to be floated in the charging driving mode.

26. The electronic device of claim 23, further comprising:

a plurality of auxiliary electrodes adjacent to the plurality of pen sensing electrodes, wherein the plurality of pen sensing electrodes and the plurality of auxiliary electrodes are located at the same layer as each other, or the plurality of pen sensing electrodes overlap with the plurality of auxiliary electrodes in a plan view.

27. The electronic device of claim 23, wherein the plurality of pen sensing electrodes comprises a first pen sensing electrode, a second pen sensing electrode, and a third pen sensing electrode that are sequentially located along the second direction, and wherein a routing direction of the first pen sensing electrode is the same as a routing direction of the third pen sensing electrode, and a routing direction of the second pen sensing electrode is different from the routing direction of the first pen sensing electrode.

28. The electronic device of claim 23, wherein the plurality of pen sensing electrodes comprises a first pen sensing electrode and a second pen sensing electrode, wherein the first pen sensing electrode comprises a first electrode portion, a second electrode portion, and a first bridge portion connecting the first electrode portion and the second electrode portion to each other, wherein the second pen sensing electrode comprises a third electrode portion, a fourth electrode portion, and a second bridge portion connecting the third electrode portion and the fourth electrode portion to each other, wherein the first electrode portion and the third electrode portion are spaced from each other in the first direction, wherein the first electrode portion and the fourth electrode portion are spaced from each other in the second direction, wherein the third electrode portion and the second electrode portion are spaced from each other in the second direction, and wherein the fourth electrode portion and the second electrode portion are spaced from each other in the first direction.

29. An electronic device comprising:

a display layer;

a plurality of first electrodes above an upper surface of the display layer along a first direction;

a plurality of second electrodes above the upper surface of the display layer along a second direction crossing the first direction;

a plurality of third electrodes above the upper surface of the display layer along the first direction, and overlapping with the plurality of first electrodes;

a plurality of pen sensing electrodes under the upper surface of the display layer along the second direction; and a sensor driver configured to calculate coordinates for a first input that causes a change in a capacitance by utilizing the plurality of first electrodes and the plurality of second electrodes, and calculate coordinates for a second input that emits a magnetic field by utilizing the plurality of first electrodes and the plurality of pen sensing electrodes.

30. The electronic device of claim 29, wherein the plurality of third electrodes are configured to be grounded when the sensor driver operates in a first mode to sense the coordinates for the first input, and wherein the plurality of first electrodes and the plurality of second electrodes are configured to be floated when the sensor driver operates in a charging driving mode to charge an input device configured to provide the second input.

31. The electronic device of claim 29, wherein the electronic device is one of a television, a mobile phone, a tablet computer, a notebook computer, a car navigation, or a game machine.

* * * * *